US011265448B2

(12) United States Patent
Imamura

(10) Patent No.: US 11,265,448 B2
(45) Date of Patent: Mar. 1, 2022

(54) CAMERA SYSTEM, CAMERA, LENS, ACCESSORY, AND ACCESSORY DETECTION METHOD OF CAMERA SYSTEM

(71) Applicant: FUJIFILM Corporation, Tokyo (JP)

(72) Inventor: Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 48 days.

(21) Appl. No.: 16/447,444

(22) Filed: Jun. 20, 2019

(65) Prior Publication Data
US 2019/0306392 A1    Oct. 3, 2019

Related U.S. Application Data

(63) Continuation of application No. PCT/JP2017/047320, filed on Dec. 28, 2017.

(30) Foreign Application Priority Data

Jan. 27, 2017 (JP) .............................. JP2017-013511

(51) Int. Cl.
*H04N 5/225* (2006.01)
*G03B 17/14* (2021.01)
(Continued)

(52) U.S. Cl.
CPC ............. *H04N 5/2254* (2013.01); *G02B 7/02* (2013.01); *G03B 17/14* (2013.01); *G03B 17/56* (2013.01);
(Continued)

(58) Field of Classification Search
CPC .. H04N 5/2254; H04N 5/225; H04N 5/23212; H04N 5/23241; H04N 5/23209;
(Continued)

(56) References Cited

U.S. PATENT DOCUMENTS 6,518,714 B2    2/2003 Inoue et al.
8,515,271 B2 *  8/2013 Tanaka .................. G03B 17/18
                                                396/49
(Continued)

FOREIGN PATENT DOCUMENTS

CA    1122455 A    4/1982
CN    1494367 A    5/2004
(Continued)

OTHER PUBLICATIONS

JP 2002341424 Translation (Year: 2002).*
(Continued)

*Primary Examiner* — Twyler L Haskins
*Assistant Examiner* — Angel L Garces-Rivera
(74) *Attorney, Agent, or Firm* — Birch, Stewart, Kolasch & Birch, LLP

(57) ABSTRACT

Provided are a camera system, a camera, a lens, an accessory, and an accessory detection method of a camera system capable of simply and quickly detect presence or absence of an attachment of the accessory and a type of the accessory. Data for accessory detection is transmitted from the lens to the camera. In a case where the accessory is attached between the lens and the camera, the accessory relays the data for accessory detection. At the time of relaying the data for accessory detection, the accessory adds own accessory information to update the data for accessory detection. The camera detects the presence or absence of the attachment of the accessory and the number of attachments of the accessory based on the received data for accessory detection. Further, in a case where the attachment is detected, the camera acquires information on the attached accessory.

26 Claims, 25 Drawing Sheets

(51) Int. Cl.
*H04N 5/232* (2006.01)
*G02B 7/02* (2021.01)
*G03B 17/56* (2021.01)

(52) U.S. Cl.
CPC ......... *H04N 5/225* (2013.01); *H04N 5/23212* (2013.01)

(58) Field of Classification Search
CPC .......... G02B 7/02; G03B 17/56; G03B 17/14; G03B 2206/00; G03B 17/565
See application file for complete search history.

(56) References Cited

U.S. PATENT DOCUMENTS

| | | | |
|---|---|---|---|
| 2002/0118963 | A1 | 8/2002 | Uenaka et al. |
| 2013/0028590 | A1 | 1/2013 | Hasuda et al. |
| 2015/0070521 | A1 | 3/2015 | Yasuda |
| 2016/0227084 | A1 | 8/2016 | Imamura et al. |

FOREIGN PATENT DOCUMENTS

| | | | |
|---|---|---|---|
| CN | 102890391 A | 1/2013 | |
| CN | 105705995 A | 6/2016 | |
| JP | 7-92539 A | 4/1995 | |
| JP | 2002-258380 A | 9/2002 | |
| JP | 2002-341424 A | 11/2002 | |
| JP | 2006-171392 A | 6/2006 | |
| JP | 2010-54629 A | 3/2010 | |

OTHER PUBLICATIONS

International Preliminary Report on Patentability and Written Opinion of the International Searching Authority (Forms PCT/IPEA/409 and PCT/ISA/237) for Application No. PCT/JP2017/047320, dated Sep. 3, 2018, with an English translation.

International Search Report (Form PCT/ISA/210), dated Mar. 27, 2018, for International Application No. PCT/JP2017/047320, with an English translation.

German Office Action for corresponding German Application No. 112017006942.4, dated May 19, 2020, with an English translation.

Machine translation of JP-2002-341424-A, published on Nov. 27, 2002.

Li, Zhiyong, et al. "Implementation of the Control to the Camera Link Protocol Camera Based on TMS320C6711" Chinese Journal of Electron Devices, vol. 30, No. 3, Jun. 2007, 4 pages.

Office Action dated Oct. 12, 2020 in counterpart Chinese Patent Application No. 201780084801.2, with English translation.

* cited by examiner

FIG. 22

| SUPPORT SITUATION TO ACCESSORY DETECTION FUNCTION | | POLARITIES OF ELEVENTH CONTACTS |
|---|---|---|
| CAMERA | LENS | |
| NON-SUPPORT<br>OUTPUT SETTING: LOW LEVEL | NON-SUPPORT<br>OUTPUT SETTING: LOW LEVEL | DETECTED POLARITIES: LOW LEVEL<br>NO COMPATIBILITY |
| NON-SUPPORT<br>OUTPUT SETTING: LOW LEVEL | SUPPORT<br>OUTPUT SETTING: HIGH LEVEL | DETECTED POLARITIES: LOW LEVEL<br>NO COMPATIBILITY |
| SUPPORT<br>OUTPUT SETTING: HIGH LEVEL | NON-SUPPORT<br>OUTPUT SETTING: LOW LEVEL | DETECTED POLARITIES: LOW LEVEL<br>NO COMPATIBILITY |
| SUPPORT<br>OUTPUT SETTING: HIGH LEVEL | SUPPORT<br>OUTPUT SETTING: HIGH LEVEL | DETECTED POLARITIES: HIGH LEVEL<br>WITH COMPATIBILITY |

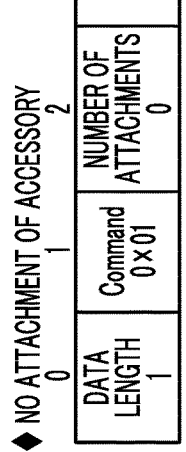
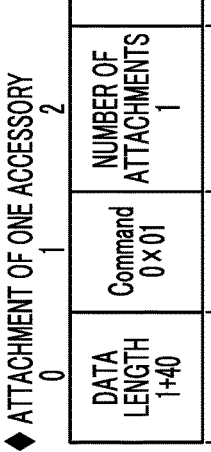
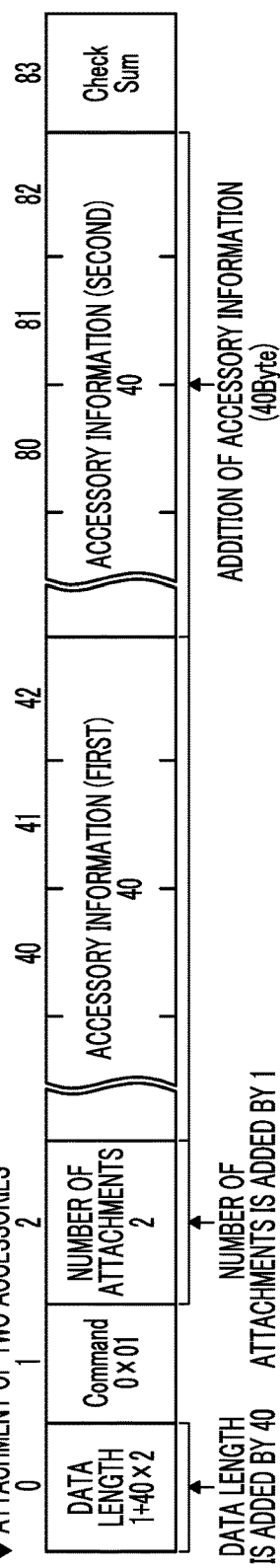
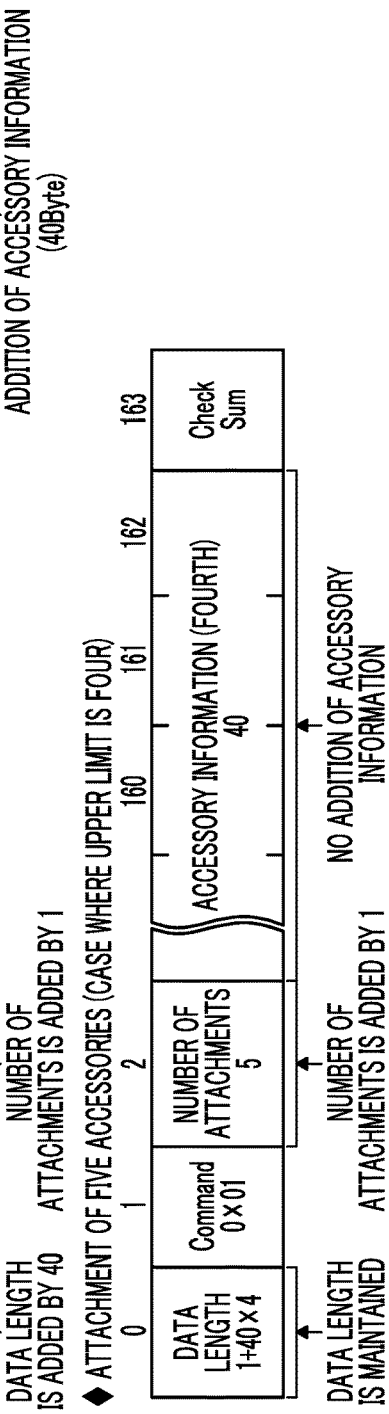
FIG. 24A
FIG. 24B
FIG. 24C
FIG. 24D ial Application No. PCT/JP2017/047320 filed on Dec. 28, 2017 claiming priority under 35 U.S.C. § 119(a) to Japanese Patent Application No. 2017-013511 filed on Jan. 27, 2017. Each of the above applications is hereby expressly incorporated by reference, in their entirety, into the present application.

BACKGROUND OF THE INVENTION

1. Field of the Invention

The present invention relates to a technique of acquiring information on an accessory attached to a camera in a lens-interchangeable camera system comprising the accessory.

2. Description of the Related Art

There is a known lens-interchangeable camera system comprising an accessory such as an extender or an extension tube. In this type of camera system, the presence or absence of an attachment of the accessory and a type of the accessory are detected at the time of activating the system. In the related art, a camera and the accessory mutually exchange information by communication to detect the presence or absence of the attachment of the accessory and the type of the accessory (for example, JP2010-054629A and the like).

SUMMARY OF THE INVENTION

However, there is a disadvantage that it takes time to activate the system due to a time required for a setting for establishing the communication or the like in the method in which the camera and the accessory mutually exchange information by communication to detect the presence or absence of the attachment of the accessory and the type of the accessory.

The invention is made in consideration of such circumstances, and an object of the invention is to provide a camera system, a camera, a lens, an accessory, and an accessory detection method of a camera system capable of simply and quickly detect the presence or absence of the attachment of the accessory and the type of the accessory.

Means for solving the above problem is as follows.

(1) A camera system comprises a camera, a lens to be attachably and detachably attached to the camera, and an accessory to be attachably and detachably attached between the camera and the lens. The camera comprises a camera control unit, a camera-side main signal line to be connected to the camera control unit, and a camera-side sub-signal line to be connected to the camera control unit. The lens comprises a lens control unit, a lens-side main signal line to be connected to the lens control unit and to be connected to the camera-side main signal line in a case where the lens is attached to the camera, and a lens-side sub-signal line to be connected to the lens control unit and to be connected to the camera-side sub-signal line in the case where the lens is attached to the camera. The accessory comprises an accessory control unit, an accessory-side main signal line to be connected to the camera-side main signal line and the lens-side main signal line in a case where the accessory is attached between the camera and the lens, an accessory-side first sub-signal line to be connected to the accessory control unit and to be connected to the camera-side sub-signal line in a case where the accessory is attached to the camera, and an accessory-side second sub-signal line to be connected to the accessory control unit and to be connected to the lens-side sub-signal line in a case where the lens is attached to the accessory. The lens control unit transmits data for accessory detection to the camera through the lens-side sub-signal line. In a case where the data for accessory detection is received through the accessory-side second sub-signal line, the accessory control unit adds accessory information to the received data for accessory detection to update the data for accessory detection and transmits the updated data for accessory detection to the camera through the accessory-side first sub-signal line. In a case where the data for accessory detection is received through the camera-side sub-signal line, the camera control unit detects presence or absence of the attachment of the accessory and the number of attachments of the accessory and acquires information on the attached accessory based on the received data for accessory detection.

According to this aspect, the sub-signal lines (camera-side sub-signal line, lens-side sub-signal line, accessory-side first sub-signal line, and accessory-side second signal line) are provided in addition to the main signal lines (camera-side main signal line, lens-side main signal line, and accessory-side main signal line). The lens control unit transmits the data for accessory detection to the camera through the lens-side sub-signal line. In a case where the accessory is attached, the data for accessory detection transmitted from the lens control unit is received by the accessory control unit. The accessory control unit adds the accessory information to the received data for accessory detection to update the data for accessory detection. The updated data for accessory detection is transmitted to the camera. In a case where a plurality of accessories are attached, the accessory information is added for each accessory and the data for accessory detection is updated. The data for accessory detection is finally received by the camera control unit. The camera control unit detects the presence or absence of the attachment of the accessory and the number of attachments of the accessory based on the received data for accessory detection. Specifically, it is determined whether the accessory information is included in the data for accessory detection to detect the presence or absence of the attachment of the accessory. In the case where the accessory is attached, the accessory information is always included in the data for accessory detection. Therefore, it is possible to determine the presence or absence of the attachment of the accessory from the presence or absence of the accessory information. Further, in a case where the accessory information is included, it is possible to determine the number of attached accessories from the number of pieces of accessory information. In a case where the attachment of the accessory is detected, the camera control unit extracts the accessory information from the data for accessory detection to acquire the information on the attached accessory. Accordingly, it is possible to determine a type of the attached accessory. In this manner, in this aspect, the data for accessory detection is transmitted from the lens to the camera, and the accessory information is added to the data for accessory detection by the accessory of a relay destination. The presence or absence of the attachment of the accessory and the type of the accessory are detected from the data for accessory detection finally to be received by the camera. Accordingly, it is possible to simply and quickly detect the presence or absence of the attachment of the accessory and the type of the accessory.

(2) In the camera system according to (1) described above, the data for accessory detection to be transmitted from the lens control unit includes lens information.

According to this aspect, the lens information is included in the data for accessory detection to be transmitted by the lens control unit. Accordingly, the lens information can be acquired simultaneously with accessory detection.

(3) In the camera system according to (1) or (2) described above, the camera control unit and the lens control unit perform an initial setting of synchronous serial communication by using the camera-side main signal line and the lens-side main signal line in parallel with processing of transmitting and receiving the data for accessory detection.

According to this aspect, the initial setting of the synchronous serial communication by using the camera-side main signal lines and the lens-side main signal line is performed in parallel with the processing of transmitting and receiving the data for accessory detection, that is, the processing of detecting the accessory. Accordingly, it is possible to speed up activation.

(4) In the camera system according to any one of (1) to (3) described above, the camera-side main signal line and the lens-side main signal line are composed of a plurality number of signal lines. The camera control unit and the lens control unit perform the synchronous serial communication by using the camera-side main signal lines and the lens-side main signal lines.

According to this aspect, the camera-side main signal line and the lens-side main signal line are composed of the plurality number of signal lines, and the synchronous serial communication is performed by using the camera-side main signal lines and the lens-side main signal lines.

(5) In the camera system according to any one of (1) to (4) described above, the camera-side sub-signal line and the lens-side sub-signal line are composed of a single signal line. The camera control unit and the lens control unit perform start-stop synchronous serial communication by using the camera-side sub-signal line and the lens-side sub-signal line.

According to this aspect, the camera-side sub-signal line and the lens-side sub-signal line are composed of the single signal line, and the start-stop synchronous serial communication is performed by using the camera-side sub-signal line and the lens-side sub-signal line.

(6) In the camera system according to any one of (1) to (5) described above, in a case where a plurality of the accessories are attached, the accessory control unit adds the accessory information after existing information included in the data for accessory detection to update the data for accessory detection in the case where the data for accessory detection is received, and the camera control unit acquires information on an attachment order of the accessory based on an order of the accessory information included in the data for accessory detection.

According to this aspect, in a case where the data for accessory detection is updated by the accessory of the relay destination, the accessory information is added after the existing information included in the data for accessory detection, and the data for accessory detection is updated. Accordingly, it is possible to acquire the information on the attachment order of the accessory from the data for accessory detection. That is, since the order of the accessory information included in the data for accessory detection matches an actual attachment order of the accessory, it is possible to determine the attachment order of the accessory from the order of the accessory information included in the data for accessory detection.

(7) In the camera system according to (6) described above, the camera control unit further determines validity of the accessory based on the accessory information included in the data for accessory detection to determine attachment appropriateness of the accessory.

According to this aspect, the validity of the accessory is determined based on the accessory information included in the data for accessory detection, and the attachment appropriateness of the accessory is determined based on the determination result. Specifically, it is determined whether the attached accessory is a regular accessory. In a case where the attached accessory is not the regular accessory, the attachment of the accessory is determined to be inappropriate. Accordingly, it is possible to appropriately attach the accessory.

(8) In the camera system according to (6) or (7) described above, the camera control unit further determines appropriateness of the number of attachments of the accessory based on the detected number of attachments of the accessory to determine attachment appropriateness of the accessory.

According to this aspect, the appropriateness of the number of attachments is determined based on the detected number of attachments of the accessory, and the attachment appropriateness of the accessory is determined based on the determination result. Specifically, it is determined whether the detected number of attachments exceeds an upper limit of the number of attachments set in advance. In a case where the detected number of attachments exceeds the upper limit thereof, the attachment of the accessory is determined to be inappropriate. Accordingly, it is possible to appropriately attach the accessory.

(9) In the camera system according to any one of (6) to (8) described above, the camera control unit further determines appropriateness of an attachment order of the accessory based on the acquired information on the attachment order of the accessory to determine attachment appropriateness of the accessory.

According to this aspect, the appropriateness of the attachment order is determined based on the acquired information on the attachment order of the accessory, and the attachment appropriateness of the accessory is determined based on the determination result. Specifically, it is determined whether the attachment order is appropriate in a case where the attachment of the plurality of accessories is detected. In a case where the attachment order is inappropriate, the attachment of the accessory is determined to be inappropriate. Accordingly, it is possible to appropriately attach the accessory.

(10) In the camera system according to any one of (7) to (9) described above, the camera further comprises a notification unit that gives a notification of a warning. In a case where the attachment of the accessory is determined to be inappropriate, the camera control unit causes the notification unit to give a notification of the warning.

According to this aspect, in the case where the attachment of the accessory is determined to be inappropriate, the warning is notified. Accordingly, it is possible to prevent the inappropriate attachment of the accessory.

(11) In the camera system according to any one of (7) to (10) described above, in the case where the attachment of the accessory is determined to be inappropriate, the camera control unit stops or changes a control with respect to the lens.

According to this aspect, in the case where the attachment of the accessory is determined to be inappropriate, the control with respect to the lens is stopped or changed. Accordingly, it is possible to prevent inappropriate imaging in advance.

(12) In the camera system according to any one of (1) to (11) described above, the accessory further comprises a bypass signal line that bypasses the accessory control unit and directly connects the accessory-side first sub-signal line and the accessory-side second sub-signal line and a communication path switching switch that switches a communication path to the bypass signal line.

According to this aspect, the bypass signal line that bypasses the accessory control unit and directly connects the accessory-side first sub-signal line and the accessory-side second sub-signal line and the communication path switching switch that switches the communication path to the bypass signal line are provided. The camera and the lens can directly communicate by switching the communication path to the bypass signal line.

(13) In the camera system according to (12) described above, the accessory control unit transmits the data for accessory detection and then switches the communication path to the bypass signal line by the communication path switching switch.

According to this aspect, the data for accessory detection is transmitted and then the communication path is switched to the bypass signal line. That is, the sub-signal line is used for the communication between the lens and the camera after the detection processing of the accessory. Accordingly, it is possible to effectively use the sub-signal line in addition to the detection of the accessory.

(14) In the camera system according to (13) described above, in a case where the communication path of the accessory is switched to the bypass signal line, the lens control unit transmits operation information of the lens by using the camera-side sub-signal line and the lens-side sub-signal line.

According to this aspect, in the case where the communication path of the accessory is switched to the bypass signal line, the sub-signal line is used for giving a notification of the operation information of the lens.

(15) A camera for which an accessory is attachable between the camera and a lens comprises a camera control unit, a camera-side main signal line to be connected to the camera control unit, and a camera-side sub-signal line to be connected to the camera control unit. The lens comprises a lens control unit, a lens-side main signal line to be connected to the lens control unit and to be connected to the camera-side main signal line in a case where the lens is attached to the camera, and a lens-side sub-signal line to be connected to the lens control unit and to be connected to the camera-side sub-signal line in the case where the lens is attached to the camera. The accessory comprises an accessory control unit, an accessory-side main signal line to be connected to the camera-side main signal line and the lens-side main signal line in a case where the accessory is attached between the camera and the lens, an accessory-side first sub-signal line to be connected to the accessory control unit and to be connected to the camera-side sub-signal line in a case where the accessory is attached to the camera, and an accessory-side second sub-signal line to be connected to the accessory control unit and to be connected to the lens-side sub-signal line in a case where the lens is attached to the accessory. The lens control unit transmits data for accessory detection to the camera through the lens-side sub-signal line. In a case where the data for accessory detection is received through the accessory-side second sub-signal line, the accessory control unit adds accessory information to the received data for accessory detection to update the data for accessory detection and transmits the updated data for accessory detection to the camera through the accessory-side first sub-signal line. In a case where the data for accessory detection is received through the camera-side sub-signal line, the camera control unit detects presence or absence of the attachment of the accessory and the number of attachments of the accessory and acquires information on the attached accessory based on the received data for accessory detection.

According to this aspect, it is possible to detect the presence or absence of the attachment of the accessory and the type of the accessory from the data for accessory detection finally to be received by the camera.

(16) A lens for which an accessory is attachable between the lens and a camera comprises a lens control unit, a lens-side main signal line to be connected to the lens control unit and to be connected to a camera-side main signal line provided in the camera in a case where the lens is attached to the camera, and a lens-side sub-signal line to be connected to the lens control unit and to be connected to a camera-side sub-signal line provided in the camera in the case where the lens is attached to the camera. The camera comprises a camera control unit to which the camera-side main signal line and the camera-side sub-signal line are connected. The accessory comprises an accessory control unit, an accessory-side main signal line to be connected to the camera-side main signal line and the lens-side main signal line in a case where the accessory is attached between the camera and the lens, an accessory-side first sub-signal line to be connected to the accessory control unit and to be connected to the camera-side sub-signal line in a case where the accessory is attached to the camera, and an accessory-side second sub-signal line to be connected to the accessory control unit and to be connected to the lens-side sub-signal line in a case where the lens is attached to the accessory. The lens control unit transmits data for accessory detection to the camera through the lens-side sub-signal line. In a case where the data for accessory detection is received through the accessory-side second sub-signal line, the accessory control unit adds accessory information to the received data for accessory detection to update the data for accessory detection and transmits the updated data for accessory detection to the camera through the accessory-side first sub-signal line. In a case where the data for accessory detection is received through the camera-side sub-signal line, the camera control unit provided in the camera detects presence or absence of the attachment of the accessory and the number of attachments of the accessory and acquires information on the attached accessory based on the received data for accessory detection.

According to this aspect, it is possible to detect the presence or absence of the attachment of the accessory and the type of the accessory from the data for accessory detection finally to be received by the camera.

(17) An accessory to be attachably and detachably attached between a camera and a lens comprises an accessory control unit, an accessory-side main signal line to be connected to a camera-side main signal line provided in the camera and a lens-side main signal line provided in the lens in a case where the accessory is attached between the camera and the lens, an accessory-side first sub-signal line to be connected to the accessory control unit and to be connected to a camera-side sub-signal line provided in the camera in a case where the accessory is attached to the camera, and an accessory-side second sub-signal line to be connected to the accessory control unit and to be connected to a lens-side sub-signal line provided in the lens in a case where the lens is attached to the accessory. The camera comprises a camera control unit to which the camera-side main signal line and the camera-side sub-signal line are connected. The lens comprises a lens control unit to which the lens-side main signal line and the lens-side sub-signal line are connected. The lens control unit transmits data for accessory detection to the camera through the lens-side sub-signal line. In a case where the data for accessory detection is received through the accessory-side second sub-signal line, the accessory control unit adds accessory information to the received data for accessory detection to update the data for accessory detection and transmits the updated data for accessory detection to the camera through the accessory-side first sub-signal line. In a case where the data for accessory detection is received through the camera-side sub-signal line, the camera control unit detects presence or absence of the attachment of the accessory and the number of attachments of the accessory and acquires information on the attached accessory based on the received data for accessory detection.

According to this aspect, it is possible to detect the presence or absence of the attachment of the accessory and the type of the accessory from the data for accessory detection finally to be received by the camera.

(18) An accessory detection method that detects an accessory attached between a camera and a lens in a camera system comprising the camera, the lens to be attachably and detachably attached to the camera, and the accessory to be attachably and detachably attached between the camera and the lens comprises a step of transmitting data for accessory detection from the lens to the camera, a step of relaying the data for accessory detection in a case where the accessory is attached between the camera and the lens, a step of adding accessory information to the data for accessory detection and of updating the data for accessory detection in the case where the accessory relays the data for accessory detection, and a step of detecting presence or absence of the attachment of the accessory and the number of attachments of the accessory and of acquiring information on the attached accessory based on the data for accessory detection in a case where the camera receives the data for accessory detection.

According to this aspect, the data for accessory detection transmitted from the lens is sequentially relayed by the accessory and is received by the camera. Each accessory adds own accessory information to the data for accessory detection in a process of relaying the data for accessory detection. The accessory information of all the attached accessories is included in the data for accessory detection finally to be received by the camera. Therefore, in a case where the data for accessory detection received by the camera is analyzed, it is possible to detect the presence or absence of the attachment of the accessory and the number of attachments of the accessory. Further, it is possible to acquire the information on the attached accessory by extracting the accessory information included in the data for accessory detection.

(19) In the accessory detection method of a camera system according to (18) described above, in the step of transmitting the data for accessory detection from the lens to the camera, the data for accessory detection is transmitted by including lens information.

According to this aspect, the lens information is included in the data for accessory detection to be transmitted from the lens to the camera. Accordingly, the lens information can be acquired simultaneously with the accessory detection.

(20) In the accessory detection method of a camera system according to (18) or (19) described above, a main signal line for performing synchronous serial communication and a sub-signal line for performing start-stop synchronous serial communication are provided. The data for accessory detection is transmitted through the sub-signal line. The accessory detection method further comprises a step of performing an initial setting of the synchronous serial communication by using the main signal line in parallel with processing of transmitting and receiving the data for accessory detection.

According to this aspect, the initial setting of the synchronous serial communication by using the main signal line is performed in parallel with the processing of transmitting and receiving the data for accessory detection, that is, the processing of detecting the accessory. Accordingly, it is possible to speed up the activation.

(21) In the accessory detection method of a camera system according to any one of (18) to (20) described above, in the step of updating the data for accessory detection, the accessory information is added after existing information and the data for accessory detection is updated. In the step of detecting the presence or absence of the attachment of the accessory and the number of attachments of the accessory and of acquiring the information on the attached accessory, information on an attachment order of the accessory is acquired based on an order of the accessory information included in the data for accessory detection.

According to this aspect, in a case where the data for accessory detection is updated by the accessory of the relay destination, the accessory information is added after the existing information included in the data for accessory detection, and the data for accessory detection is updated. Accordingly, it is possible to acquire the information on the attachment order of the accessory from the data for accessory detection. That is, since the order of the accessory information included in the data for accessory detection matches an actual attachment order of the accessory, it is possible to determine the attachment order of the accessory from the order of the accessory information included in the data for accessory detection.

(22) The accessory detection method of a camera system according to (21) described above further comprises a step of determining validity of the accessory based on the accessory information included in the data for accessory detection to determine attachment appropriateness of the accessory.

According to this aspect, the validity of the accessory is determined based on the accessory information included in the data for accessory detection, and the attachment appropriateness of the accessory is determined based on the determination result. Specifically, it is determined whether the attached accessory is a regular accessory. In a case where the attached accessory is not the regular accessory, the attachment of the accessory is determined to be inappropriate. Accordingly, it is possible to appropriately attach the accessory.

(23) The accessory detection method of a camera system according to (21) or (22) described above further comprises a step of determining the appropriateness of the number of attachments of the accessory based on the detected number of attachments of the accessory to determine the attachment appropriateness of the accessory.

According to this aspect, the appropriateness of the number of attachments is determined based on the detected number of attachments of the accessory, and the attachment appropriateness of the accessory is determined based on the determination result. Specifically, it is determined whether the detected number of attachments exceeds an upper limit of the number of attachments set in advance. In a case where the detected number of attachments exceeds the upper limit thereof, the attachment of the accessory is determined to be inappropriate. Accordingly, it is possible to appropriately attach the accessory.

(24) The accessory detection method of a camera system according to any one of (21) to (23) described above further comprises a step of determining the appropriateness of the attachment order of the accessory based on the acquired information on the attachment order of the accessory to determine the attachment appropriateness of the accessory.

According to this aspect, the appropriateness of the attachment order is determined based on the acquired information on the attachment order of the accessory, and the attachment appropriateness of the accessory is determined based on the determination result. Specifically, it is determined whether the attachment order is appropriate in a case where the attachment of the plurality of accessories is detected. In a case where the attachment order is inappropriate, the attachment of the accessory is determined to be inappropriate. Accordingly, it is possible to appropriately attach the accessory.

(25) The accessory detection method of a camera system according to any one of (22) to (24) described above further comprises a step of warning in a case where the attachment of the accessory is determined to be inappropriate.

According to this aspect, in the case where the attachment of the accessory is determined to be inappropriate, the warning is notified. Accordingly, it is possible to prevent the inappropriate attachment of the accessory.

(26) The accessory detection method of a camera system according to any one of (22) to (25) described above further comprises a step of stopping or changing a control with respect to the lens in the case where the attachment of the accessory is determined to be inappropriate.

According to this aspect, in the case where the attachment of the accessory is determined to be inappropriate, the control with respect to the lens is stopped or changed. Accordingly, it is possible to prevent inappropriate imaging in advance.

According to the invention, it is possible to simply and quickly detect the presence or absence of the attachment of the accessory and the type of the accessory.

BRIEF DESCRIPTION OF THE DRAWINGS

FIG. 22 is a table showing a relationship between output settings of eleventh contacts of the camera and the lens according to a support situation to an accessory detection function and detected polarities.
FIGS. 24A to 24D are diagrams showing an example of a data structure of the data for accessory detection.

DESCRIPTION OF THE PREFERRED EMBODIMENTS

Hereinafter, preferable embodiments for implementing the invention will be described with reference to accompanying drawings.

First Embodiment

[Configuration of Camera System]
A lens-interchangeable camera system is configured to comprise at least one camera, at least one lens, and at least one accessory.

Figure 1:
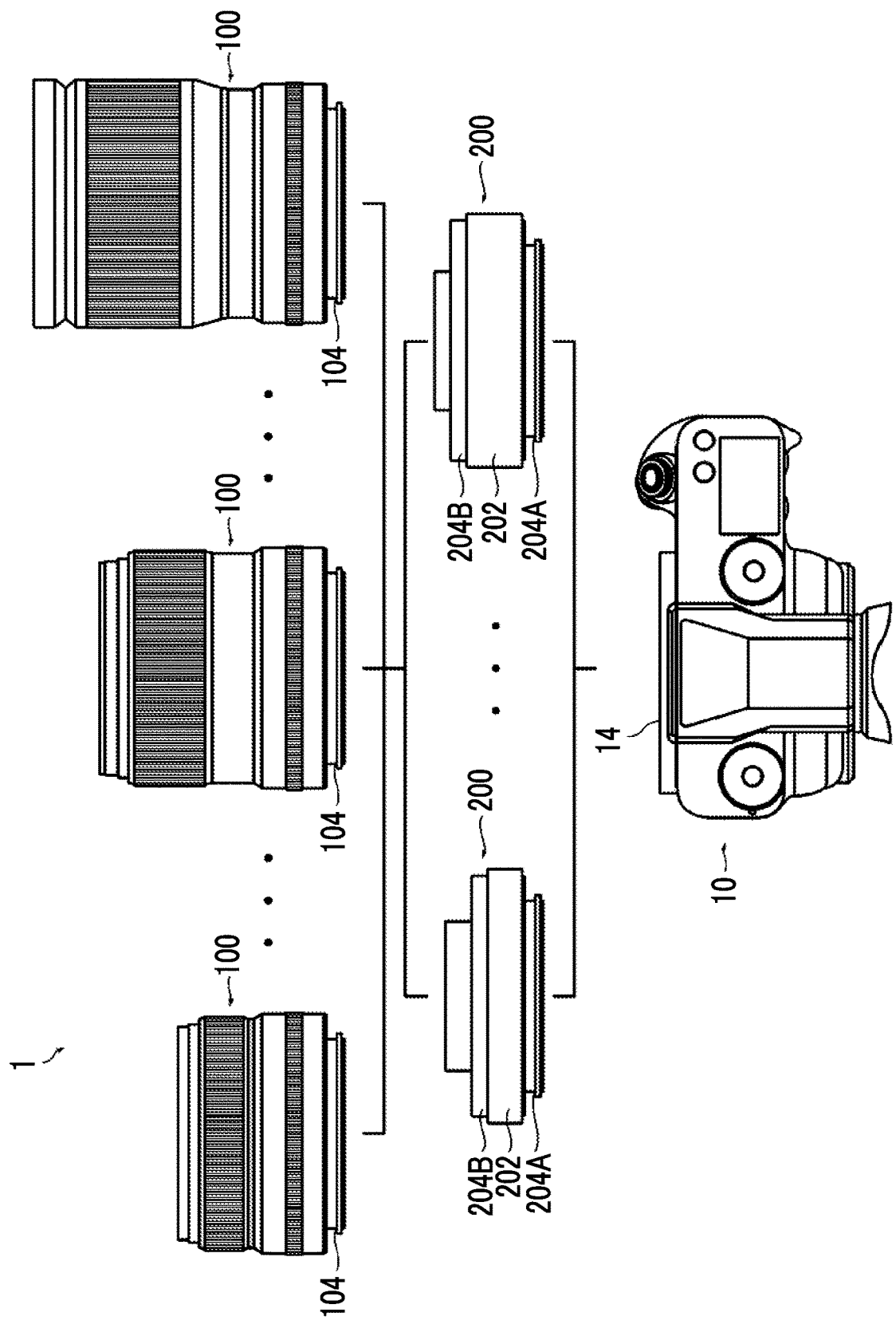
FIG. 1 is a system configuration diagram showing an example of a lens-interchangeable camera system.

FIG. 1 is a system configuration diagram showing an example of the lens-interchangeable camera system.

A camera system 1 shown in FIG. 1 is configured to comprise one camera 10, a plurality of lenses 100, and a plurality of accessories 200.

The camera 10 is composed of a digital camera. In particular, the camera 10 of the embodiment is composed of a non-reflex digital camera. The non-reflex digital camera refers to a digital camera having no reflex mirror for guiding incident light from the lens into an optical viewfinder. The non-reflex digital camera is also referred to as a mirrorless digital camera.

The plurality of lenses 100 are respectively composed of lenses having different specifications. For example, there is a difference in a focal length, the presence or absence of a camera shake correction function, or the like. Each lens 100 comprises a common lens-side mount 104. The lens-side mount 104 has a structure corresponding to a camera-side mount 14. Therefore, each lens 100 can be attached to the camera 10.

The plurality of accessories 200 are composed of, for example, an extender, an extension tube, or the like. In a case where the accessory 200 is the extender, an extender lens is provided in a barrel 202. Each accessory 200 comprises a common accessory-side first mount 204A and a common accessory-side second mount 204B. The accessory-side first mount 204A is a mount for attaching the accessory 200 to the camera 10. Therefore, the accessory-side first mount 204A has the same structure as the lens-side mount 104. The accessory-side second mount 204B is a mount for attaching the lens 100 to the accessory 200. Therefore, the accessory-side second mount 204B has the same structure as the camera-side mount 14. The accessory-side first mount 204A is provided on a base end side of the barrel 202, and the accessory-side second mount 204B is provided on a front end side of the barrel 202.

<<Camera-Side Mount>>

Figure 2:
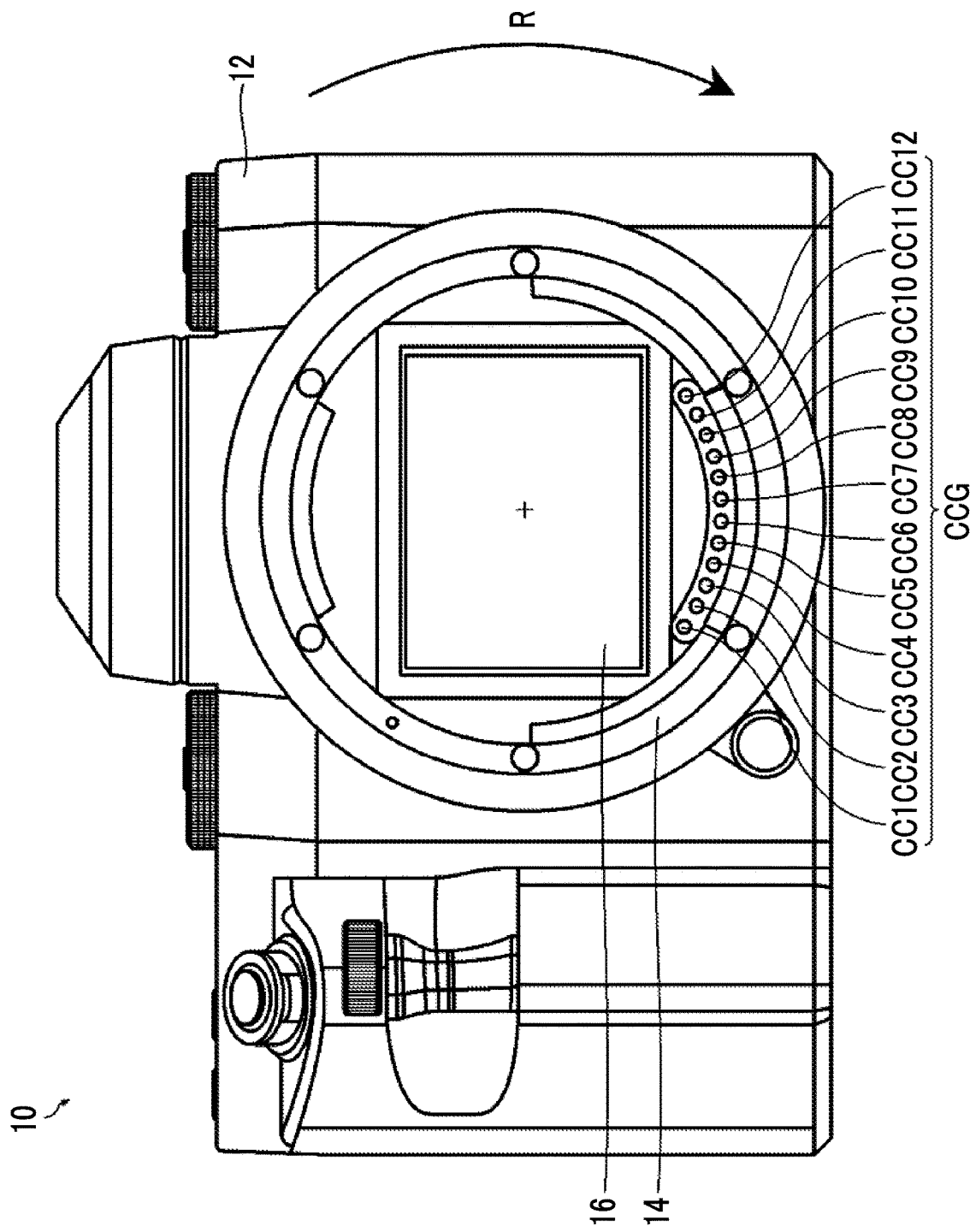
FIG. 2 is a front view of a camera-side mount.

FIG. 2 is a front view of the camera-side mount. FIG. 2 corresponds to a view of the camera viewed from a front side (front view of camera).

The camera 10 comprises the camera-side mount 14 on a front portion of a camera body 12 of the camera. The camera-side mount 14 is an attachment part of the lens 100. The camera-side mount 14 is composed of a known bayonet mount. In FIG. 2, a direction indicated by an arrow R (clockwise direction) is a rotation direction of the lens 100 in a case where the lens 100 is attached to the camera 10.

The camera-side mount 14 is provided with a camera-side contact group CCG composed of a plurality of contacts CC1 to CC12. The plurality of contacts CC1 to CC12 constituting the camera-side contact group CCG are disposed at a constant interval on the circumference of one circle with an imaging optical axis as the center. A function of each of the contacts CC1 to CC12 will be described below.

<<Lens-Side Mount>>

Figure 3:
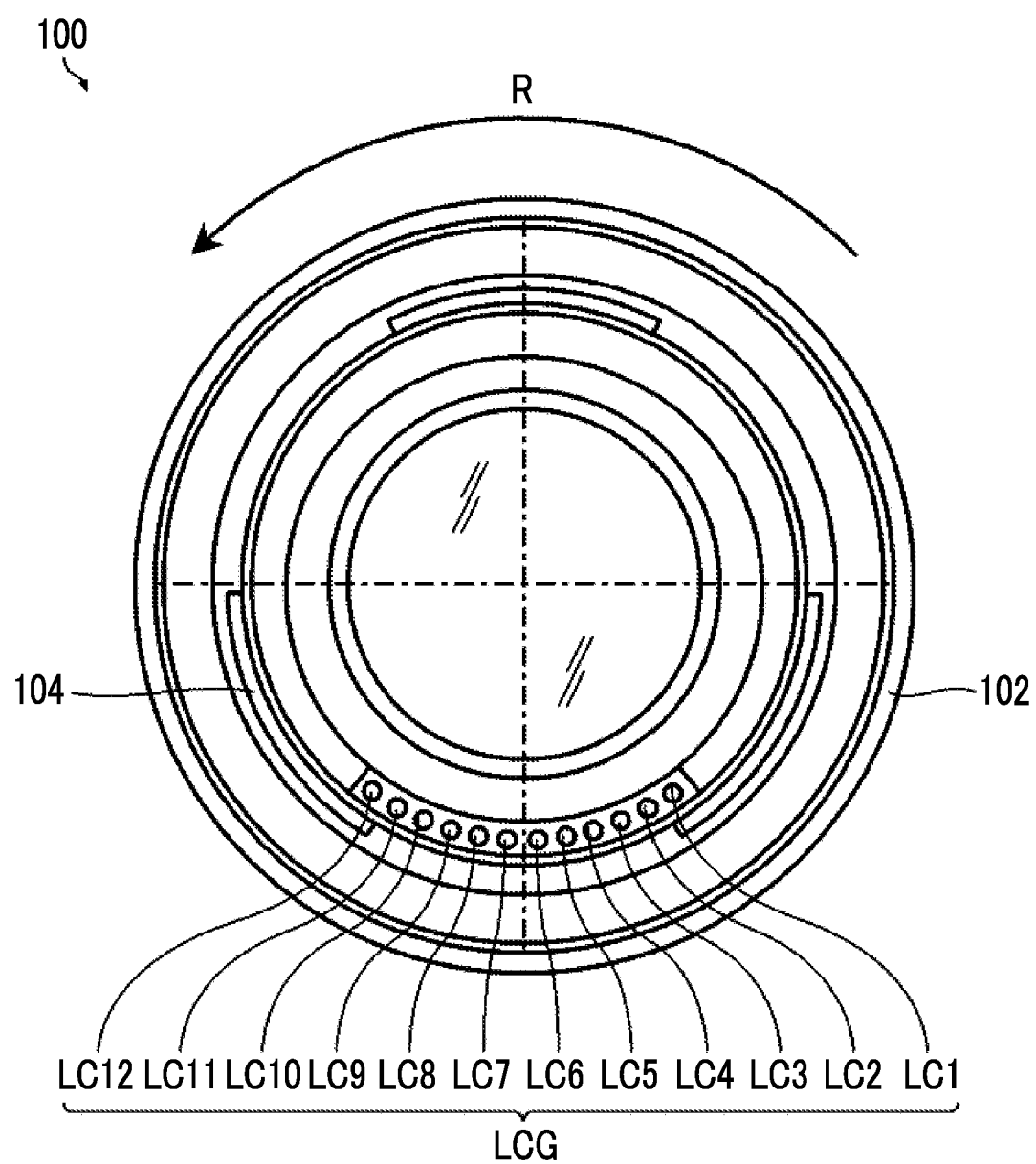
FIG. 3 is a front view of a lens-side mount.

FIG. 3 is a front view of the lens-side mount. FIG. 3 corresponds to a view of the lens viewed from a base end portion side (back view of lens).

The lens 100 comprises the lens-side mount 104 on the base end portion of a lens barrel 102 of the lens 100. The lens-side mount 104 is composed of a bayonet mount corresponding to the camera-side mount 14 provided in the camera 10. In FIG. 3, a direction indicated by an arrow R (counterclockwise direction) is the rotation direction of the lens 100 in the case where the lens 100 is attached to the camera 10 (rotation direction of lens-side mount 104 in case where the lens-side mount 104 is attached to camera-side mount 14).

The lens-side mount 104 is provided with a lens-side contact group LCG composed of a plurality of contacts LC1 to LC12. The lens-side contact group LCG is provided corresponding to the camera-side contact group CCG. Therefore, the lens-side contact group LCG is configured to have the same number of contacts as the contacts constituting the camera-side contact group CCG, and each of the contacts LC1 to LC12 is disposed at the same interval as the contacts CC1 to CC12 constituting the camera-side contact group CCG.

In the case where the lens 100 is attached to the camera 10, each of the contacts LC1 to LC12 of the lens-side contact group LCG is connected to the corresponding contacts CC1 to CC12 of the camera-side contact group CCG. That is, the first contact LC1 of the lens-side contact group LCG is connected to the first contact CC1 of the camera-side contact group CCG, the second contact LC2 of the lens-side contact group LCG is connected to the second contact CC2 of the camera-side contact group CCG, . . . , and the twelfth contact LC12 of the lens-side contact group LCG is connected to the twelfth contact CC12 of the camera-side contact group CCG.

A function of each of the contacts LC1 to LC12 constituting the lens-side contact group LCG will be described below.

<<Accessory-Side First Mount and Accessory-Side Second Mount>>

<Accessory-Side First Mount>

Figure 4:
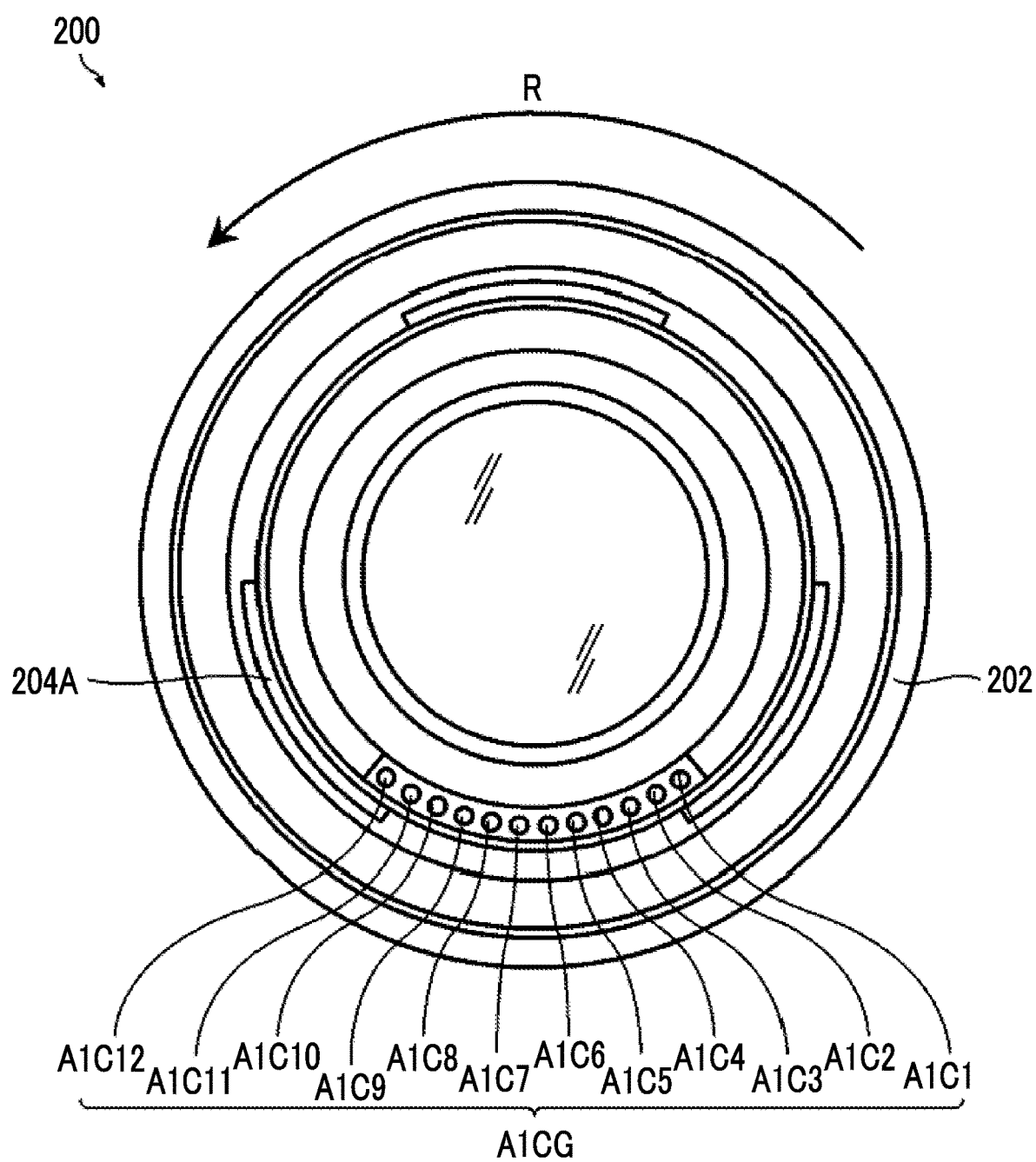
FIG. 4 is a front view of an accessory-side first mount.

FIG. 4 is a front view of the accessory-side first mount. FIG. 4 corresponds to a view of the accessory viewed from the base end portion side (back view of accessory).

The accessory 200 comprises the accessory-side first mount 204A on the base end portion of the barrel 202 of the accessory. As described above, the structure of the accessory-side first mount 204A is the same as the structure of the lens-side mount 104. In FIG. 4, the direction indicated by an arrow R (counterclockwise direction) is the rotation direction of the accessory 200 in a case where the accessory 200 is attached to the camera 10.

The accessory-side first mount 204A is provided with an accessory-side first contact group A1CG composed of a plurality of contacts A1C1 to A1C12. The accessory-side first contact group A1CG is provided corresponding to the camera-side contact group CCG. Therefore, the accessory-side first contact group A1CG is configured to have the same number of contacts as the contacts constituting the camera-side contact group CCG, and each of the contacts A1C1 to A1C12 is disposed at the same interval as the contacts CC1 to CC12 constituting the camera-side contact group CCG.

In the case where the accessory 200 is attached to the camera 10, each of the contacts A1C1 to A1C12 of the accessory-side first contact group A1CG is connected to the corresponding contacts CC1 to CC12 of the camera-side contact group CCG. That is, the first contact A1C1 of the accessory-side first contact group A1CG is connected to the first contact CC1 of the camera-side contact group CCG, the second contact A1C2 of the accessory-side first contact group A1CG is connected to the second contact CC2 of the camera-side contact group CCG, . . . , and the twelfth contact A1C12 of the accessory-side first contact group A1CG is connected to the twelfth contact CC12 of the camera-side contact group CCG.

A function of each of the contacts A1C1 to A1C12 constituting the accessory-side first contact group A1CG will be described below.

<Accessory-Side Second Mount>

Figure 5:
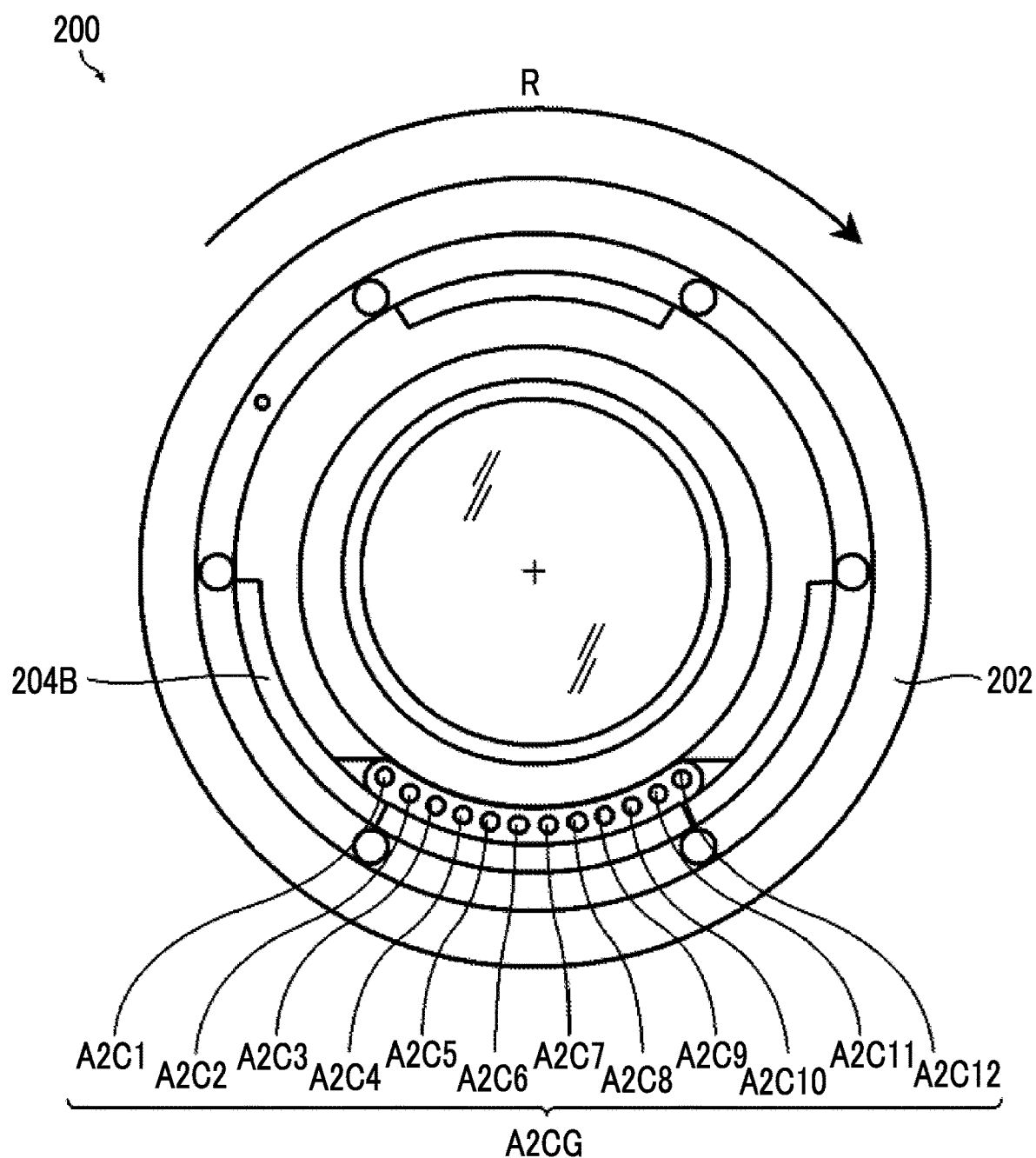
FIG. 5 is a front view of an accessory-side second mount.

FIG. 5 is a front view of the accessory-side second mount. FIG. 5 corresponds to a view of the accessory viewed from the front end side (front view of accessory).

The accessory 200 comprises the accessory-side second mount 204B on the front end portion of the barrel 202 of the accessory. As described above, the structure of the accessory-side second mount 204B is the same as the structure of the camera-side mount 14. In FIG. 5, the direction indicated by an arrow R (clockwise direction) is the rotation direction of the lens 100 in a case where the lens 100 is attached to the accessory 200.

The accessory-side second mount 204B is provided with an accessory-side second contact group A2CG composed of a plurality of contacts A2C1 to A2C12. The accessory-side second contact group A2CG is provided corresponding to the lens-side contact group LCG. Therefore, the accessory-side second contact group A2CG is configured to have the same number of contacts as the contacts constituting the lens-side contact group LCG, and each of the contacts A2C1 to A2C12 is disposed at the same interval as the contacts CC1 to CC12 constituting the lens-side contact group LCG.

In the case where the lens 100 is attached to the accessory 200, each of the contacts LC1 to LC12 of the lens-side contact group LCG is connected to the corresponding contacts A2C1 to A2C12 of the accessory-side second contact group A2CG. That is, the first contact LC1 of the lens-side contact group LCG is connected to the first contact A2C1 of the accessory-side second contact group A2CG, the second contact LC2 of the lens-side contact group LCG is connected to the second contact A2C2 of the accessory-side second contact group A2CG, . . . , and the twelfth contact LC12 of the lens-side contact group LCG is connected to the twelfth contact A2C12 of the accessory-side second contact group A2CG.

It is also possible to connect the accessories. In this case, the accessory-side first mount 204A of the other accessory 200 is connected to the accessory-side second mount 204B of one accessory 200. Further, each contact of one accessory 200 is connected to the corresponding contact of the other accessory 200 by connecting the accessories.

A function of each of the contacts A2C1 to A2C12 constituting the accessory-side second contact group A2CG will be described below.

<<Electric Configuration of Camera>>

Here, a main electric configuration of the camera 10 as the digital camera will be described.

Figure 6:
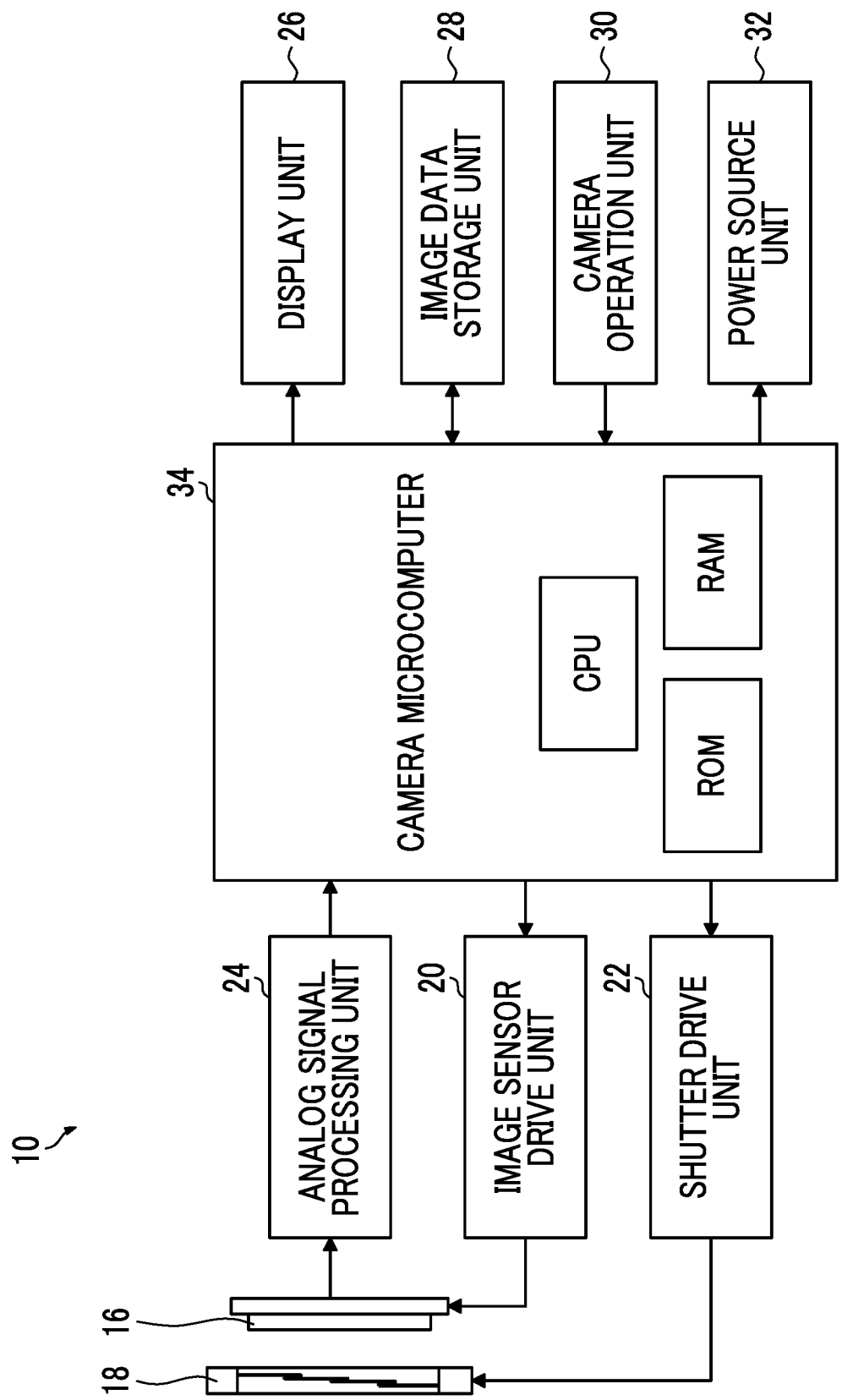
FIG. 6 is a block diagram showing a main electric configuration of the camera.

FIG. 6 is a block diagram showing the main electric configuration of the camera.

As shown in FIG. 6, the camera 10 comprises an image sensor 16, a shutter 18, an image sensor drive unit 20, a shutter drive unit 22, an analog signal processing unit 24, a display unit 26, an image data storage unit 28, a camera operation unit 30, a power source unit 32, and a camera microcomputer 34.

<Image Sensor>

The image sensor 16 converts an optical image of a subject formed through the lens into an electric signal and outputs the converted signal. A known image sensor such as a charged coupled device (CCD) image sensor or a complementary metal oxide semiconductor (CMOS) image sensor is used as the image sensor 16.

<Image Sensor Drive Unit>

The image sensor drive unit 20 is composed of a drive circuit of the image sensor 16. The image sensor drive unit 20 drives the image sensor 16 in response to an instruction from the camera microcomputer 34.

<Shutter>

The shutter 18 is an optical path opening and closing apparatus that adjusts an exposure time to the image sensor 16. The shutter 18 is composed of, for example, a square focal plane shutter and is disposed right before the image sensor 16.

<Shutter Drive Unit>

The shutter drive unit 22 is composed of a drive circuit that drives a charging motor, an electromagnetic, or the like provided in the shutter 18. The shutter drive unit 22 drives the charging motor, the electromagnetic, or the like in response to the instruction from the camera microcomputer 34.

<Analog Signal Processing Unit>

The analog signal processing unit 24 takes in an analog image signal output from the image sensor 16, performs predetermined signal processing (for example, correlative double sampling processing, amplifying processing, or the like), and then converts the analog image signal into a digital image signal and outputs the digital image signal.

<Display Unit>

The display unit 26 is composed of a monitor and a drive circuit of the monitor. The monitor is composed of, for example, a liquid crystal display (LCD) and is provided on a back surface of the camera body.

<Image Data Storage Unit>

The image data storage unit 28 is a storage unit of captured image data. The image data storage unit 28 comprises a memory card and a socket for attaching the memory card. Reading and writing of the image data with respect to the memory card are controlled by the camera microcomputer 34.

<Camera Operation Unit>

The camera operation unit 30 is an operation unit of the camera 10 and is composed of various operation buttons and a circuit that detects operation of the operation buttons and outputs operation signals to the camera microcomputer 34. The operation buttons provided in the camera 10 include a power button, a release button, and the like.

<Power Source Unit>

The power source unit 32 generates and supplies pieces of power required for operations of the camera 10 and the lens 100 under the control of the camera microcomputer 34.

Figure 7:
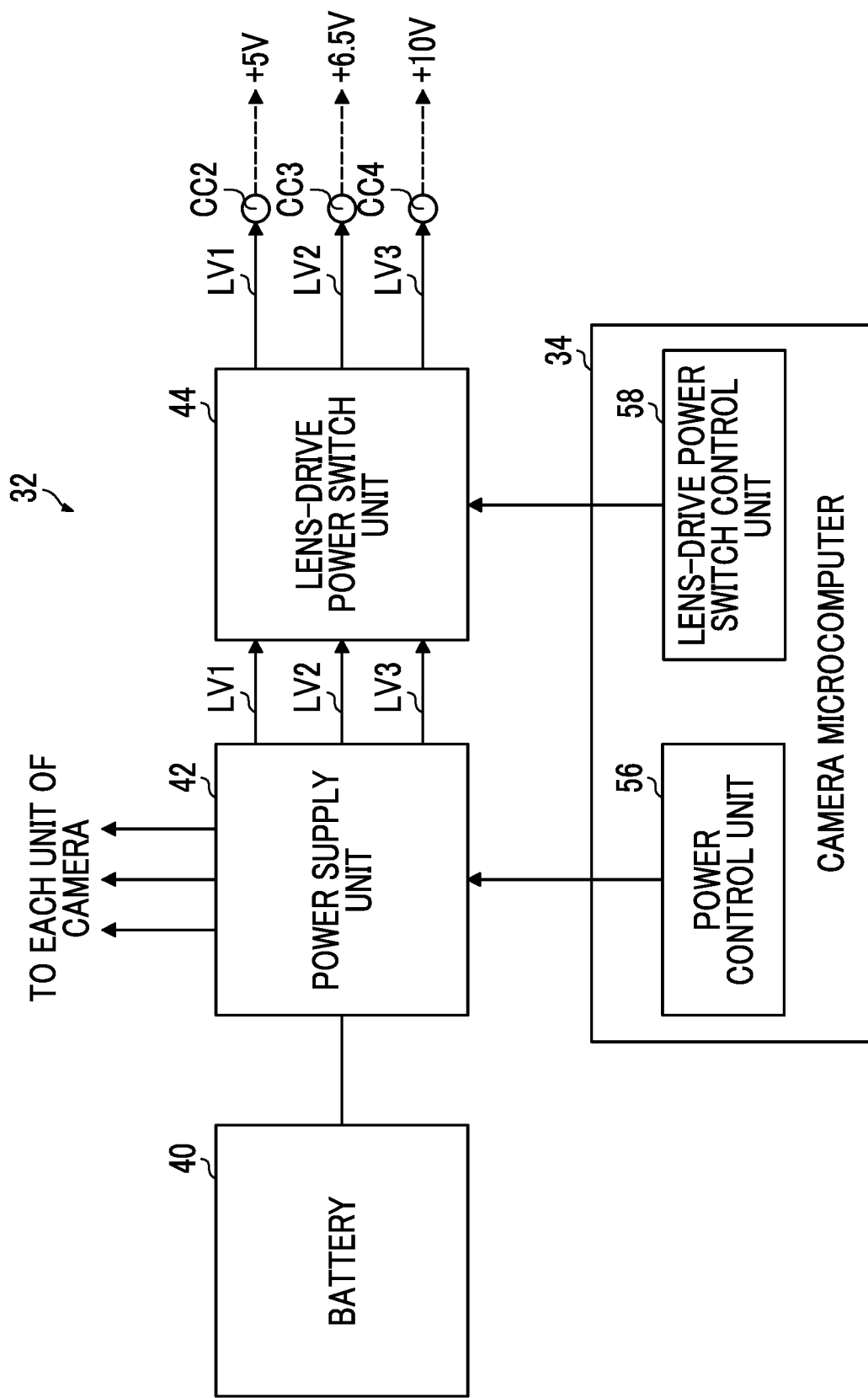
FIG. 7 is a block diagram showing an electric configuration of a power source unit.

FIG. 7 is a block diagram showing an electric configuration of the power source unit.

As shown in FIG. 7, the power source unit 32 comprises a battery 40, a power supply unit 42, and a lens-drive power switch unit 44.

The battery 40 is power of the camera 10 and the lens 100. The battery 40 is attachably and detachably mounted on a battery chamber (not shown) provided in the camera body.

The power supply unit 42 generates various pieces of power required for the operations of the camera 10 and the lens 100 from the battery 40 and supplies the pieces of power to each unit under the control of the camera microcomputer 34. The power supply unit 42 is composed of, for example, a DC-DC converter (DC: direct current).

In the camera 10 of the embodiment, a plurality of pieces of lens-drive power having different voltages are generated as the power supplied to the lens 100. In the camera 10 of the embodiment, first lens-drive power LV1 having the voltage of +5 V, second lens-drive power LV2 having the voltage of +6.5 V, and third lens-drive power LV3 having the voltage of +10 V are generated.

As described below, the first lens-drive power LV1 having the lowest voltage is supplied to the second contact CC2 of the camera-side contact group CCG. The second lens-drive power LV2 is supplied to the third contact CC3 of the camera-side contact group CCG. The third lens-drive power LV3 having the highest voltage is supplied to the fourth contact CC4 of the camera-side contact group CCG.

The lens-drive power switch unit 44 individually turns on and off the supplying of the plurality of pieces of lens-drive power LV1, LV2, and LV3 to be supplied from the power supply unit 42 in response to the instruction from the camera microcomputer 34. Accordingly, it is possible to individually turn on and off the supplying of the pieces of lens-drive power LV1, LV2, and LV3 to be supplied from the power supply unit 42 to the plurality of contacts CC2, CC3, and CC4 of the camera-side contact group CCG.

<Camera Microcomputer>

The camera microcomputer 34 is an example of a camera control unit and integrally controls the operation of the camera 10. The camera microcomputer 34 comprises a central processing unit (CPU), a read only memory (ROM), and a random access memory (RAM/memory capable of writing and reading data), and executes a prescribed program to provide various functions. The ROM stores various pieces of data and the like required for the control in addition to various programs executed by the CPU.

Figure 8:
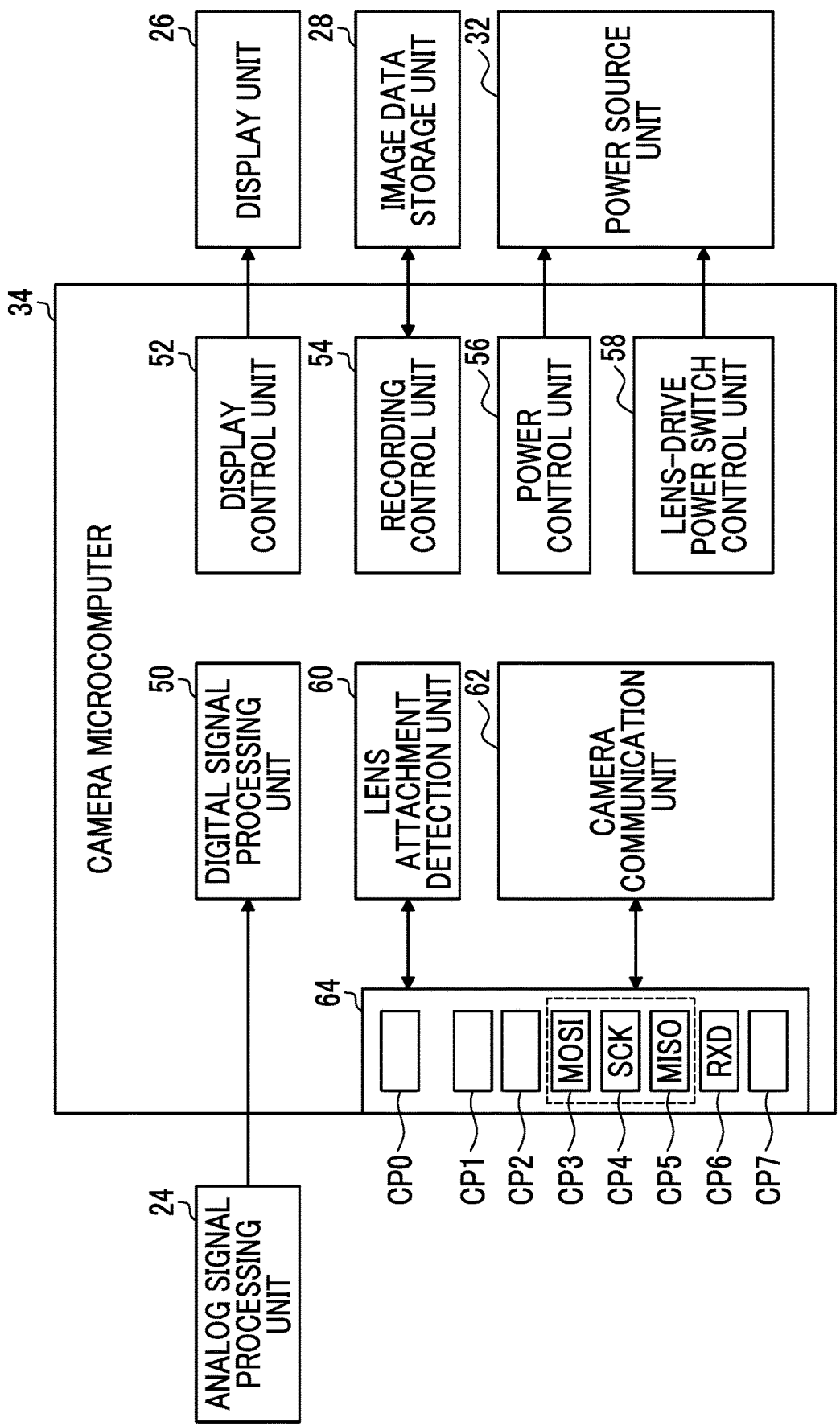
FIG. 8 is a block diagram showing an example of a function realized by a camera microcomputer.

FIG. 8 is a block diagram showing an example of a function realized by the camera microcomputer.

As shown in FIG. 8, the camera microcomputer 34 executes the prescribed program to function as a digital signal processing unit 50, a display control unit 52, a recording control unit 54, a power control unit 56, a lens-drive power switch control unit 58, a lens attachment detection unit 60, a camera communication unit 62, and the like.

The digital signal processing unit 50 takes in the digital image signal output from the analog signal processing unit 24 and performs predetermined signal processing to generate the image data.

The display control unit 52 displays predetermined information on the monitor provided in the display unit 26. For example, in a case where a playback mode is set, an image read from the memory card is displayed on the monitor. Further, in a case where an imaging mode is set, an image captured by the image sensor 16 is displayed in real time. Furthermore, in a case where various settings are performed, a setting screen is displayed on the monitor.

The recording control unit 54 performs the reading and writing of the image data with respect to the memory card attached to the socket of the image data storage unit 28.

The power control unit 56 controls the power supply unit 42 to control the supplying of the power to each unit.

The lens-drive power switch control unit 58 controls the lens-drive power switch unit 44 to control the supplying of the lens-drive power. Specifically, the lens-drive power switch control unit 58 individually turns on and off the supplying of the pieces of lens-drive power LV1, LV2, and LV3 to be supplied from the power supply unit 42 to the plurality of power contacts (second contact CC2, third contact CC3, and fourth contact CC4) of the camera-side contact group CCG to control the supplying of the lens-drive power. Accordingly, it is possible to selectively supply the lens-drive power.

The lens attachment detection unit 60 detects the attachment of the lens 100. The lens attachment detection unit 60 detects a polarity of a lens detection port CP0 provided in a camera microcomputer input and output port 64 to determine the presence or absence of the attachment of the lens 100.

The camera communication unit 62 communicates with the lens 100 attached to the camera 10. The communication is performed through the camera microcomputer input and output port 64. The camera microcomputer input and output port 64 is provided with a plurality of communication ports CP1 to CP7 for communicating with the lens 100.

Here, the first communication port CP1 is a communication port for notifying the camera 10 of a state from the lens 100. In particular, the first communication port CP1 is used as a port for giving a notification that a specific function of the lens 100 is in operation in the camera system 1 of the embodiment. For example, the first communication port CP1 is used as a port for giving a notification that a stop motor is in operation.

The second communication port CP2 is a communication port for transmitting a vertical synchronizing (VSYNC) signal from the camera 10 to the lens 100.

The third communication port CP3, the fourth communication port CP4, and the fifth communication port CP5 are communication ports for performing synchronous serial communication by three lines (hereinafter referred to as three-line serial communication) with the lens 100. That is, the third communication port CP3, the fourth communication port CP4, and the fifth communication port CP5 are the communication ports constituting a serial peripheral interface (SPI) which is a synchronous serial communication interface.

The third communication port CP3 is a communication port (master out slave in (MOSI) port) for transmitting a signal from the camera 10 as an SPI master to the lens 100 as an SPI slave.

Further, the fourth communication port CP4 is a communication port (serial clock (SCK) port) for transmitting a clock signal for synchronization from the camera 10 as the SPI master to the lens 100 as the SPI slave.

Further, the fifth communication port CP5 is a communication port (master in slave out (MISO) port) for transmitting a signal from the lens 100 as an SPI slave to the camera 10 as an SPI master.

The sixth communication port CP6 is a communication port for performing serial communication (start-stop synchronous serial communication by a single line (for example, serial communication by a universal asynchronous receiver transmitter (UART))) between the lens 100 and the accessory 200. In particular, in the camera system 1 of the embodiment, the sixth communication port CP6 functions as a received exchange data (RXD/data reception) port and is used as a communication port for receiving a signal transmitted from the lens 100 or the accessory 200. Hereinafter, the start-stop synchronous serial communication by the single line is simply referred to as single-line serial communication.

The seventh communication port CP7 is a communication port for notifying the camera 10 of the state from the lens 100.

In a case where the camera communication unit 62 performs the three-line serial communication with the lens 100 using the third communication port CP3, the fourth communication port CP4, and the fifth communication port CP5, the camera communication unit 62 performs a setting required for establishing the communication. That is, the camera communication unit 62 functions as a camera-side communication setting unit.

The main electric configuration of the camera 10 as the digital camera is described. The camera 10 may further comprise other configurations.

Further, the communication between the lens 100 and the accessory 200 and an electric connection between the lens 100 and the accessory 200 through the mount will be described below in detail.

<<Electric Configuration of Lens>>

Here, a main electric configuration commonly provided in each lens 100 will be described.

Figure 9:
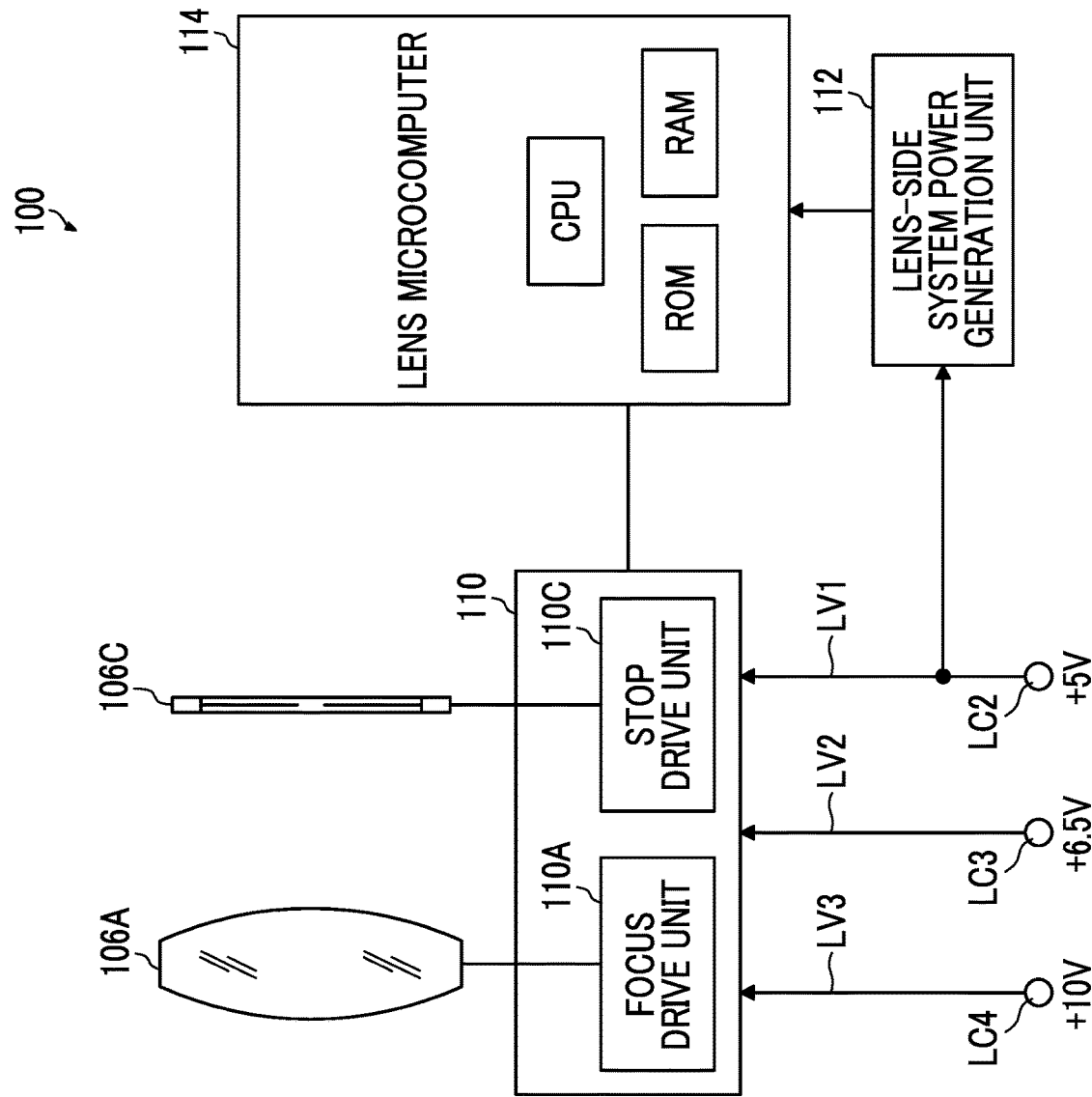
FIG. 9 is a block diagram showing a main electric configuration of the lens.

FIG. 9 is a block diagram showing the main electric configuration of the lens. FIG. 9 shows the electric configuration of the lens comprising an auto focus (AF) mechanism and the stop.

As shown in FIG. 9, the lens 100 comprises a lens drive unit 110, a lens-side system power generation unit 112, and a lens microcomputer 114.

<Lens Drive Unit>

The lens drive unit 110 drives optical members constituting the lens 100 in response to an instruction from the lens microcomputer 114.

As described above, the lens 100 shown in FIG. 9 comprises the AF function and the stop. Therefore, the lens 100 of this example is provided with a focus drive unit 110A and a stop drive unit 110C as the lens drive unit 110.

The focus drive unit 110A drives a focus lens 106A which is the optical member for focusing. The focus drive unit 110A is configured to comprise a focus motor (for example, ultrasonic motor) for driving the focus lens and a drive circuit of the focus motor. The focus drive unit 110A drives the focus motor in response to the instruction from the lens microcomputer 114 to operate the focus lens 106A.

The stop drive unit 110C drives the stop which is the optical member for light amount adjustment. The stop drive unit 110C is configured to comprise the stop motor for driving a stop 106C and a drive circuit of the stop motor. The stop drive unit 110C drives the stop motor in response to the instruction from the lens microcomputer 114 to operate the stop 106C.

As described below, the plurality of pieces of lens-drive power LV1 (+5 V), LV2 (+6.5 V), and LV3 (+10 V) having different voltages are supplied from a plurality of contacts LC2 to LC4 (power contacts) of the lens-side contact group LCG to the lens drive unit 110. Any of the plurality of supplied pieces of lens-drive power LV1, LV2, and LV3 is supplied to each drive unit of the lens drive unit 110. For example, the third lens-drive power LV3 having the highest voltage is supplied to the focus drive unit 110A, and the first lens-drive power LV1 having the lowest voltage is supplied to the stop drive unit 110C.

<Lens-Side System Power Generation Unit>

The lens-side system power generation unit 112 generates system power for operating the lens microcomputer 114. The lens-side system power generation unit 112 generates the system power by using the lens-drive power to be supplied from the camera 10.

Here, the lens microcomputer 114 is configured to operate at a voltage lower than each drive unit constituting the lens drive unit 110. For example, the lens microcomputer 114 is configured to operate at +3.3 V.

The lens-side system power generation unit 112 generates the system power (+3.3 V) by using the lens-drive power LV1 (+5 V) having the lowest voltage among the plurality of pieces of lens-drive power LV1 to LV3 to be supplied from the camera 10, and supplies the generated system power to the lens microcomputer 114. In this case, the lens-side system power generation unit 112 generates the system power by a voltage drop caused by a resistor. Accordingly, it is possible to prevent the occurrence of noise accompanied by the generation of the system power.

An LDO regulator may be exemplified as an apparatus that generates the system power by the voltage drop caused by the resistor. The LDO regulator is one of a linear regulator and converts an input voltage into a desired output voltage by consuming input power using on-resistance of a switching element such as a power MOSFET or power transistor.

<Lens Microcomputer>

The lens microcomputer 114 is an example of a lens control unit and integrally controls the operation of the lens 100. The lens microcomputer 114 controls the operation of the lens 100 based on the instruction from the camera microcomputer 34.

The lens microcomputer 114 comprises a CPU, a ROM, and a RAM, and executes a prescribed program to provide various functions. The ROM stores various pieces of data and the like required for the control in addition to various programs executed by the CPU.

Figure 10:
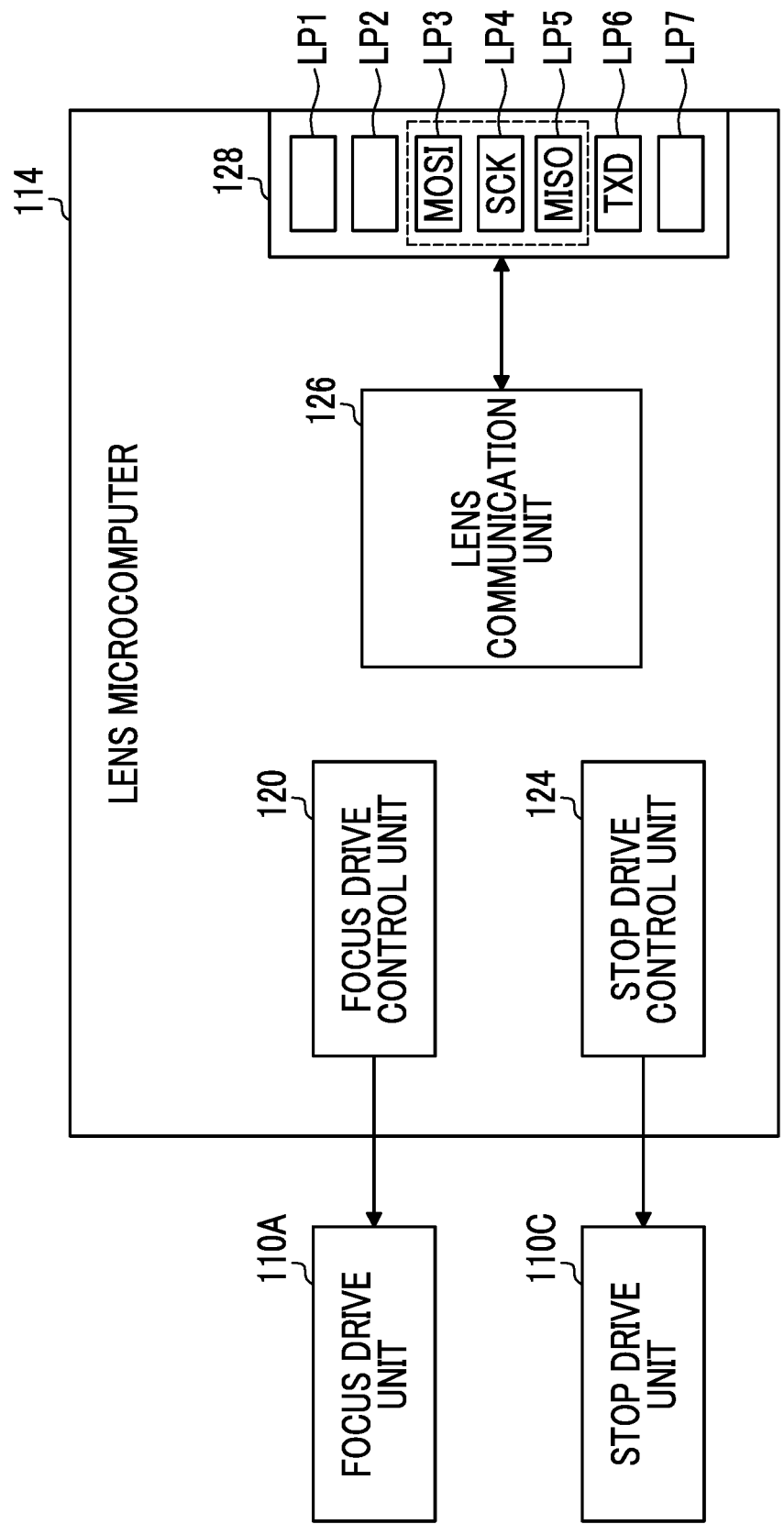
FIG. 10 is a block diagram showing an example of a function realized by a lens microcomputer.

FIG. 10 is a block diagram showing an example of a function realized by the lens microcomputer.

As shown in FIG. 10, the lens microcomputer 114 executes the prescribed program to function as a focus drive control unit 120, a stop drive control unit 124, a lens communication unit 126, and the like.

The focus drive control unit 120 controls the focus drive unit 110A in response to the instruction from the camera microcomputer 34 to operate the focus lens 106A.

The stop drive control unit 124 controls the stop drive unit 110C in response to the instruction from the camera microcomputer 34 to operate the stop 106C.

The lens communication unit 126 communicates with the camera 10 to which the lens 100 is attached. The communication is performed through a lens microcomputer input and output port 128. The lens microcomputer input and output port 128 is provided with a plurality of communication ports LP1 to LP7 for communicating with the lens 100. The communication ports LP1 to LP7 are provided corresponding to the plurality of communication ports CP1 to CP7 provided in the camera microcomputer input and output port 64 of the camera microcomputer 34.

Therefore, the first communication port LP1 is used for giving a notification of the state of the camera 10, and the second communication port LP2 is used for receiving the VSYNC signal transmitted from the camera 10.

Further, the third communication port LP3, the fourth communication port LP4, and the fifth communication port LP5 are used for the three-line serial communication with the camera 10.

Further, the sixth communication port LP6 is used for the single-line serial communication between the camera 10 and the accessory 200 and is used as a transmit exchange data (TXD/data transmission) port. That is, the sixth communication port LP6 is used as a communication port for transmitting the signal to the camera 10 or the accessory 200.

Further, the seventh communication port LP7 is used for notifying the camera 10 of the state.

In a case where the lens communication unit 126 performs the three-line serial communication with the camera 10 using the third communication port LP3, the fourth communication port LP4, and the fifth communication port LP5, the lens communication unit 126 performs a setting required for establishing the communication. That is, the lens communication unit 126 functions as a lens-side communication setting unit.

The main electric configuration of each lens 100 is described. Each lens 100 may individually comprise a further configuration such as a camera shake correction mechanism.

Further, the communication between the camera 10 and the accessory 200 and an electric connection between the camera 10 and the accessory 200 through the mount will be described below in detail.

<<Electric Configuration of Accessory>>

Here, a main electric configuration commonly provided in each accessory 200 will be described.

Figure 11:
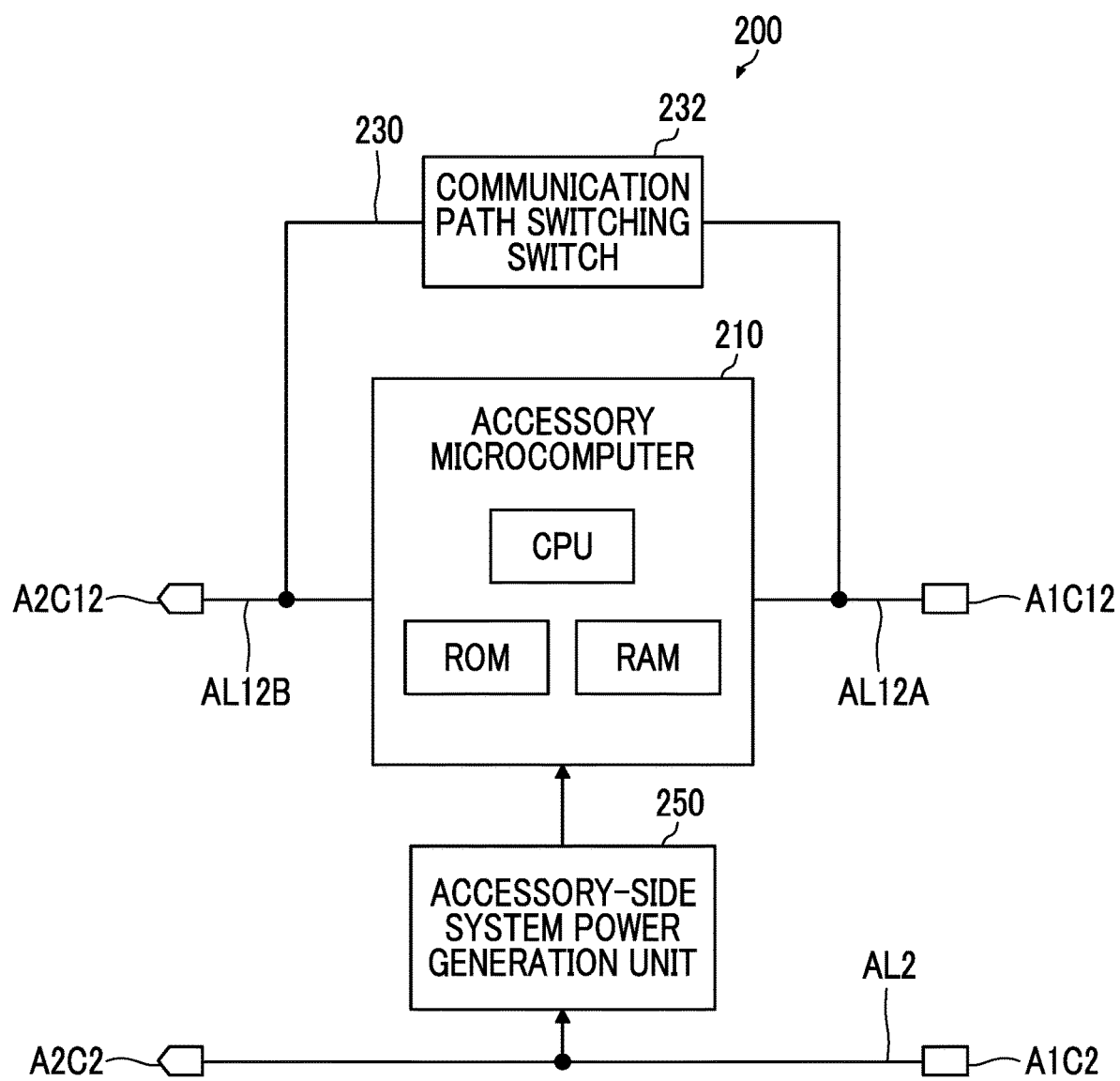
FIG. 11 is a block diagram showing a main electric configuration of the accessory.

FIG. 11 is a block diagram showing the main electric configuration of the accessory.

As shown in FIG. 11, the accessory 200 comprises an accessory microcomputer 210, a bypass signal line 230, a communication path switching switch 232, and an accessory-side system power generation unit 250.

<Accessory Microcomputer>

The accessory microcomputer 210 is an example of an accessory control unit. The accessory microcomputer 210 integrally controls the operation of the accessory 200.

The accessory microcomputer 210 comprises a CPU, a ROM, and a RAM, and executes a prescribed program to provide various functions. The ROM stores various pieces of data and the like required for the control in addition to various programs executed by the CPU.

Figure 12:
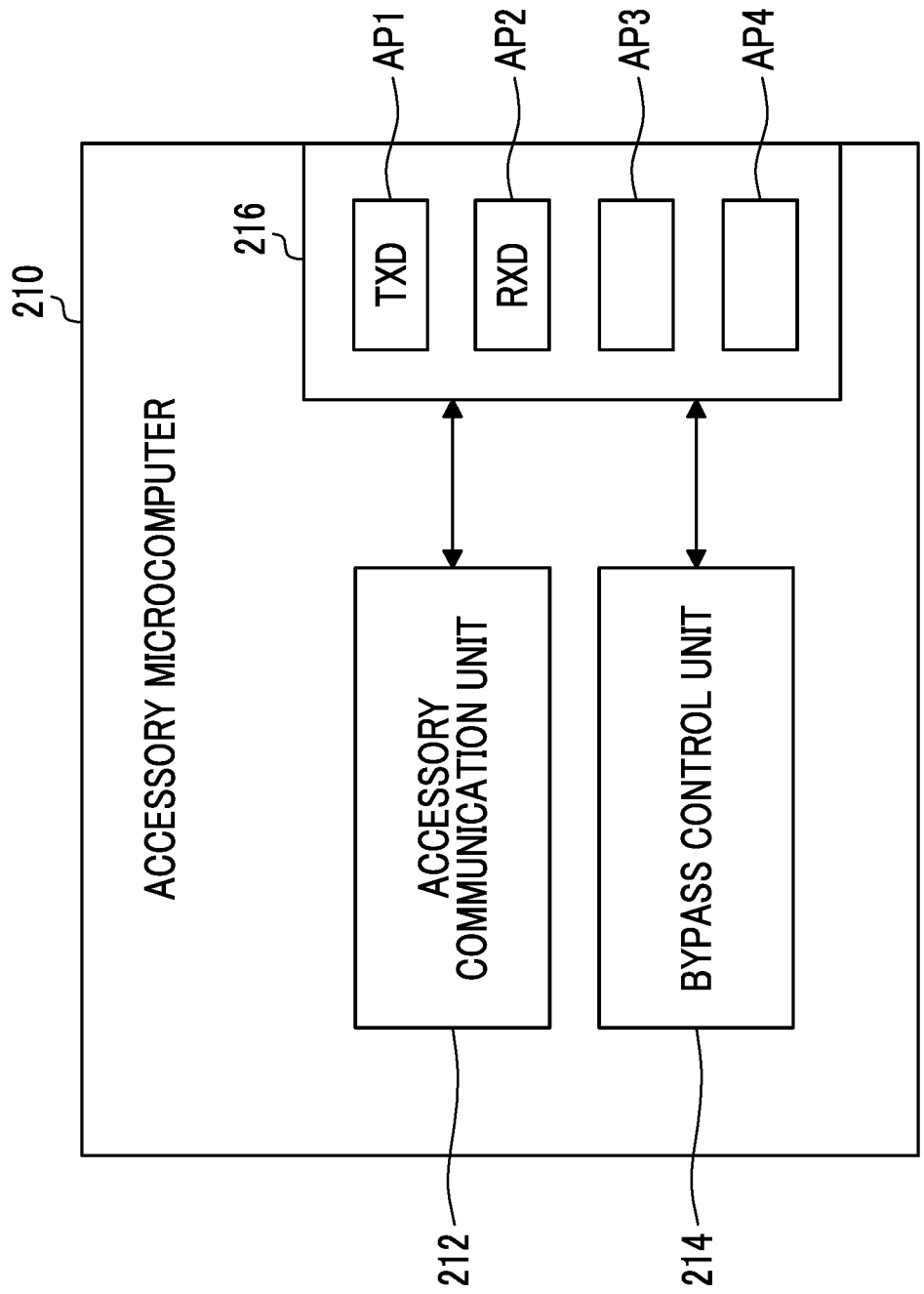
FIG. 12 is a block diagram showing an example of a function realized by an accessory microcomputer.

FIG. 12 is a block diagram showing an example of a function realized by the accessory microcomputer.

As shown in FIG. 12, the accessory microcomputer 210 executes the prescribed program to function as an accessory communication unit 212, a bypass control unit 214, and the like.

The accessory communication unit 212 communicates with the camera 10 and the lens 100 to which the accessory 200 is attached. The communication is performed through an accessory microcomputer input and output port 216. The accessory microcomputer input and output port 216 comprises a first port AP1 and a second port AP2 for performing the single-line serial communication between the camera 10 and the lens 100. The first port AP1 functions as the TXD port that outputs the data. The second port AP2 functions as the RXD port that receives the data.

As described below, the first port AP1 is connected to the twelfth contact A1C12 of the accessory-side first contact group A1CG through an accessory-side first sub-signal line AL12A. Further, the second port AP2 is connected to the twelfth contact A2C12 of the accessory-side second contact group A2CG through an accessory-side second sub-signal line AL12B. Therefore, in a case where the camera 10 performs the single-line serial communication with the accessory 200, the camera 10 communicates through the twelfth contact A1C12. Further, in a case where the lens 100 performs the single-line serial communication with the accessory 200, the lens 100 communicates through the twelfth contact A2C12.

Further, the accessory microcomputer input and output port 216 is provided with a third port AP3 and a fourth port AP4.

As described below, a gate contact of a third FET 240 is connected to the third port AP3 through a line 244 (refer to FIG. 15).

Figure 15:
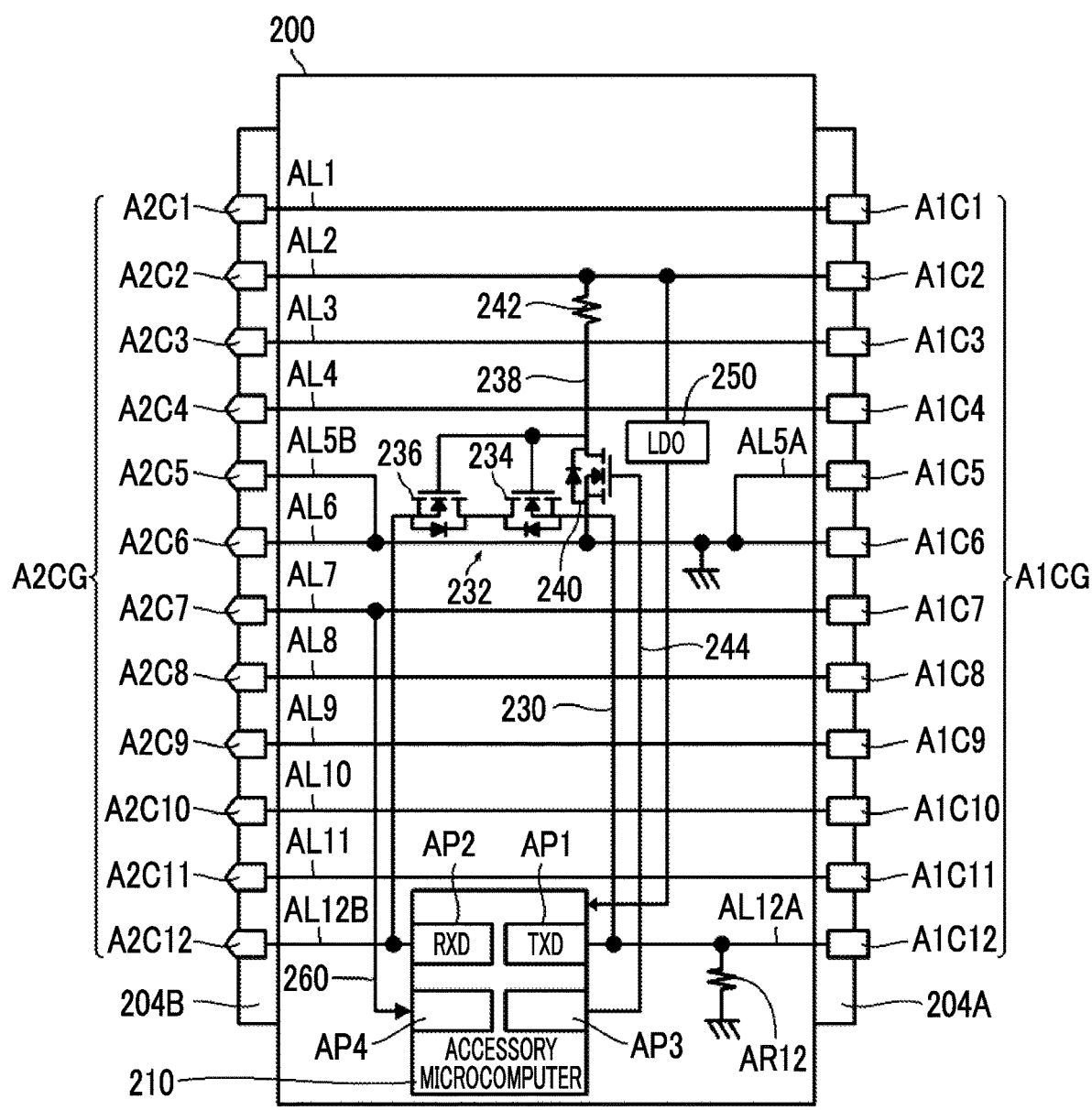
FIG. 15 is a diagram showing a connection structure of a line of each contact provided in the accessory.

Further, the fourth port AP4 functions as an input communication port and is connected to a seventh connection line AL7 through a line 260 (refer to FIG. 15). Accordingly, the accessory microcomputer 210 can receive information transmitted through the seventh connection line AL7.

The bypass control unit 214 is a control unit that controls on and off of a bypass mechanism for the camera microcomputer 34 and the lens microcomputer 114 to communicate without passing through the accessory microcomputer 210. The bypass control unit 214 controls the communication path switching switch 232 to control the on and off of the bypass mechanism. Specifically, the bypass control unit 214 controls the polarity (HIGH level or LOW level) of the third port AP3 to control the on and off of the bypass mechanism. This point will be described below in detail.

<Bypass Signal Line>

The bypass signal line 230 is a signal line for the camera microcomputer 34 and the lens microcomputer 114 to communicate without passing through the accessory microcomputer 210. One end of the bypass signal line 230 is connected to the accessory-side first sub-signal line AL12A, and the other end of the bypass signal line 230 is connected to the accessory-side second sub-signal line AL12B. That is, the bypass signal line 230 functions as a signal line that directly connects the accessory-side first sub-signal line AL12A and the accessory-side second sub-signal line AL12B by bypassing the accessory microcomputer 210.

<Communication Path Switching Switch>

The communication path switching switch 232 is provided in the bypass signal line 230 and makes the bypass signal line 230 conductive or nonconductive. A specific configuration of the communication path switching switch 232 will be described in detail.

<Accessory-Side System Power Generation Unit>

The accessory-side system power generation unit 250 generates system power for operating the accessory microcomputer 210. The accessory-side system power generation unit 250 generates the system power of the accessory microcomputer 210 by using the lens-drive power to be supplied from the camera 10 similarly to the lens-side system power generation unit 112 provided in the lens 100.

Here, the accessory microcomputer 210 is configured to operate at a voltage lower than each drive unit constituting the lens drive unit 110 provided in the lens 100. For example, the accessory microcomputer 210 is configured to operate at +3.3 V.

The accessory-side system power generation unit 250 generates the system power (+3.3 V) of the accessory microcomputer 210 by using the lens-drive power LV1 (+5 V) having the lowest voltage among the plurality of pieces of lens-drive power LV1 to LV3 to be supplied from the camera 10. Therefore, the accessory-side system power generation unit 250 is connected to a second connection line AL2 connected to a second contact which is the power contact (refer to FIG. 15).

The accessory-side system power generation unit 250 generates the system power by the voltage drop caused by the resistor similarly to the lens-side system power generation unit 112. Accordingly, it is possible to prevent the occurrence of the noise accompanied by the generation of the system power. The accessory-side system power generation unit 250 is composed of, for example, the LDO regulator.

The main electric configuration of each accessory 200 is described. Each lens 100 may individually comprise a further configuration.

Further, the communication between the camera 10 and the lens 100, an electric connection between the camera 10 and the lens 100 through the mount, and a bypass mechanism will be described below in detail.

<<Function of Each Contact Provided in Camera>>

Figure 13:
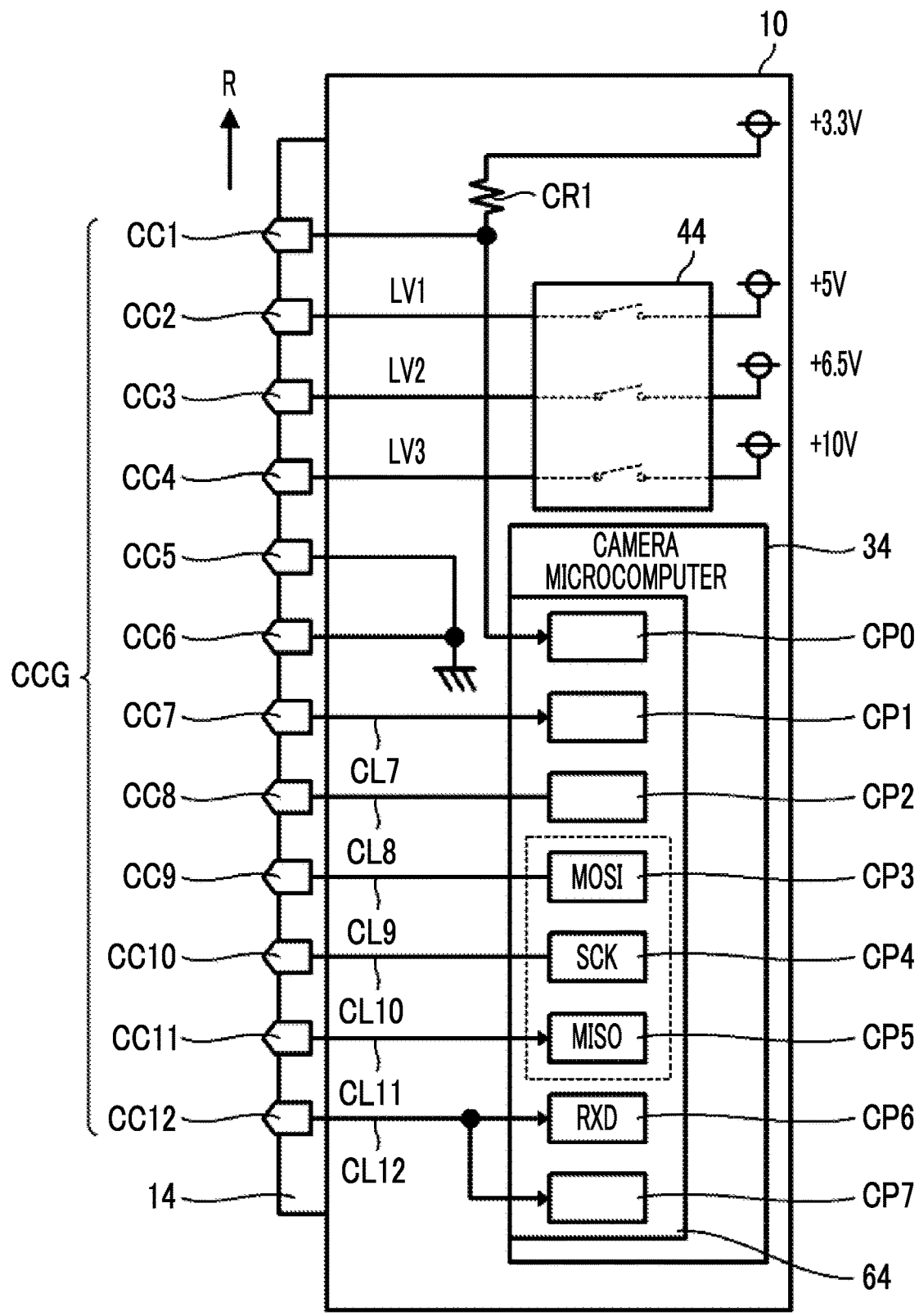
FIG. 13 is a diagram showing a connection structure of a line of each contact provided in the camera.

FIG. 13 is a diagram showing a connection structure of a line of each contact provided in the camera.

As described above, the camera-side mount 14 of the camera 10 is provided with the camera-side contact group CCG. The camera-side contact group CCG is composed of the twelve contacts CC1 to CC12. Each of the contacts CC1 to CC12 has the same shape and is disposed at a constant interval on the same circumference. Functions of each of the contacts CC1 to CC12 are as follows.

(A) First Contact CC1

The first contact CC1 is a lens detection contact for detecting the attachment of the lens 100. The first contact CC1 is connected to the lens detection port CP0 of the camera microcomputer 34. Further, the first contact CC1 is connected to the power supply unit 42 (refer to FIG. 7)

through a pull-up resistor CR1 and is pulled up to predetermined potential (for example, +3.3 V).

(B) Second Contact CC2 to Fourth Contact CC4

The second contact CC2, the third contact CC3, and the fourth contact CC4 are a plurality of power contacts for supplying the plurality of pieces of lens-drive power LV1, LV2, and LV3 to the lens 100.

Here, the second contact CC2 is a first power contact for supplying the first lens-drive power LV1 to the lens. The second contact CC2 is connected to the power supply unit 42 through the lens-drive power switch unit 44 (refer to FIG. 7). The first lens-drive power LV1 having the lowest voltage from the power supply unit 42 is supplied to the second contact CC2. The lens-drive power switch unit 44 turns on and off the supplying of the first lens-drive power LV1 to the second contact CC2 in response to the instruction from the camera microcomputer 34.

Further, the third contact CC3 is a second power contact for supplying the second lens-drive power LV2 to the lens. The third contact CC3 is connected to the power supply unit 42 through the lens-drive power switch unit 44 (refer to FIG. 7). The second lens-drive power LV2 is supplied from the power supply unit 42 to the third contact CC3. The lens-drive power switch unit 44 turns on and off the supplying of the second lens-drive power LV2 to the third contact CC3 in response to the instruction from the camera microcomputer 34.

Further, the fourth contact CC4 is a third power contact for supplying the third lens-drive power LV3 to the lens. The fourth contact CC4 is connected to the power supply unit 42 through the lens-drive power switch unit 44 (refer to FIG. 7). The third lens-drive power LV3 having the highest voltage from the power supply unit 42 is supplied to the fourth contact CC4. The lens-drive power switch unit 44 turns on and off the supplying of the third lens-drive power LV3 to the fourth contact CC4 in response to the instruction from the camera microcomputer 34.

(C) Fifth Contact CC5 and Sixth Contact CC6

The fifth contact CC5 and the sixth contact CC6 are respectively ground contacts and are both grounded.

(D) Seventh Contact CC7 to Twelfth Contact CC12

The seventh contact CC7 to the twelfth contact CC12 are communication contacts for communicating with the lens 100.

Here, the seventh contact CC7 is the communication contact for giving a notification of the state from the lens 100 to the camera 10. The seventh contact CC7 is connected to the first communication port CP1 of the camera microcomputer 34 through a seventh signal line CL7. As described above, the first communication port CP1 of the camera microcomputer 34 is used for giving a notification that the specific function of the lens 100 is in operation.

The eighth contact CC8 is a communication contact for transmitting the VSYNC signal from the camera 10 to the lens 100. The eighth contact CC8 is connected to the second communication port CP2 of the camera microcomputer 34 through an eighth signal line CL8.

The ninth contact CC9, the tenth contact CC10, and the eleventh contact CC11 are communication contacts for respectively performing the three-line serial communication with the lens 100. The ninth contact CC9 is connected to the third communication port CP3 (MOSI port) of the camera microcomputer 34 through a ninth signal line CL9. The tenth contact CC10 is connected to the fourth communication port CP4 (SCK port) of the camera microcomputer 34 through a tenth signal line CL10. The eleventh contact CC11 is connected to the fifth communication port CP5 (MISO port) of the camera microcomputer 34 through an eleventh signal line CL11.

The ninth signal line CL9, the tenth signal line CL10, and the eleventh signal line CL11 are a plurality number of signal lines for performing the three-line serial communication with the lens 100 and constitute camera-side main signal lines.

The twelfth contact CC12 is a contact for performing the single-line serial communication with the lens 100 and is a contact for notifying the camera 10 of the state from the lens 100. The twelfth contact CC12 is connected to the sixth communication port CP6 and the seventh communication port CP7 of the camera microcomputer 34 through a twelfth signal line CL12 having two branches. The twelfth signal line CL12 is an example of a camera-side sub-signal line.

The plurality of contacts CC1 to CC12 constituting the camera-side contact group CCG are disposed in an order of the first contact CC1, the second contact CC2, . . . , the eleventh contact CC11, and the twelfth contact CC12 with respect to the rotation direction R of the lens 100 in the case where the lens 100 is attached to the camera 10. Therefore, the camera-side contact group CCG is disposed in the order of the lens detection contact (first contact CC1), the plurality of power contacts (second contact CC2 to fourth contact CC4), the plurality of ground contacts (fifth contact CC5 and sixth contact CC6), and the plurality of communication contacts (seventh contact CC7 to twelfth contact CC12).

<<Function of Each Contact Provided in Lens>>

Figure 14:
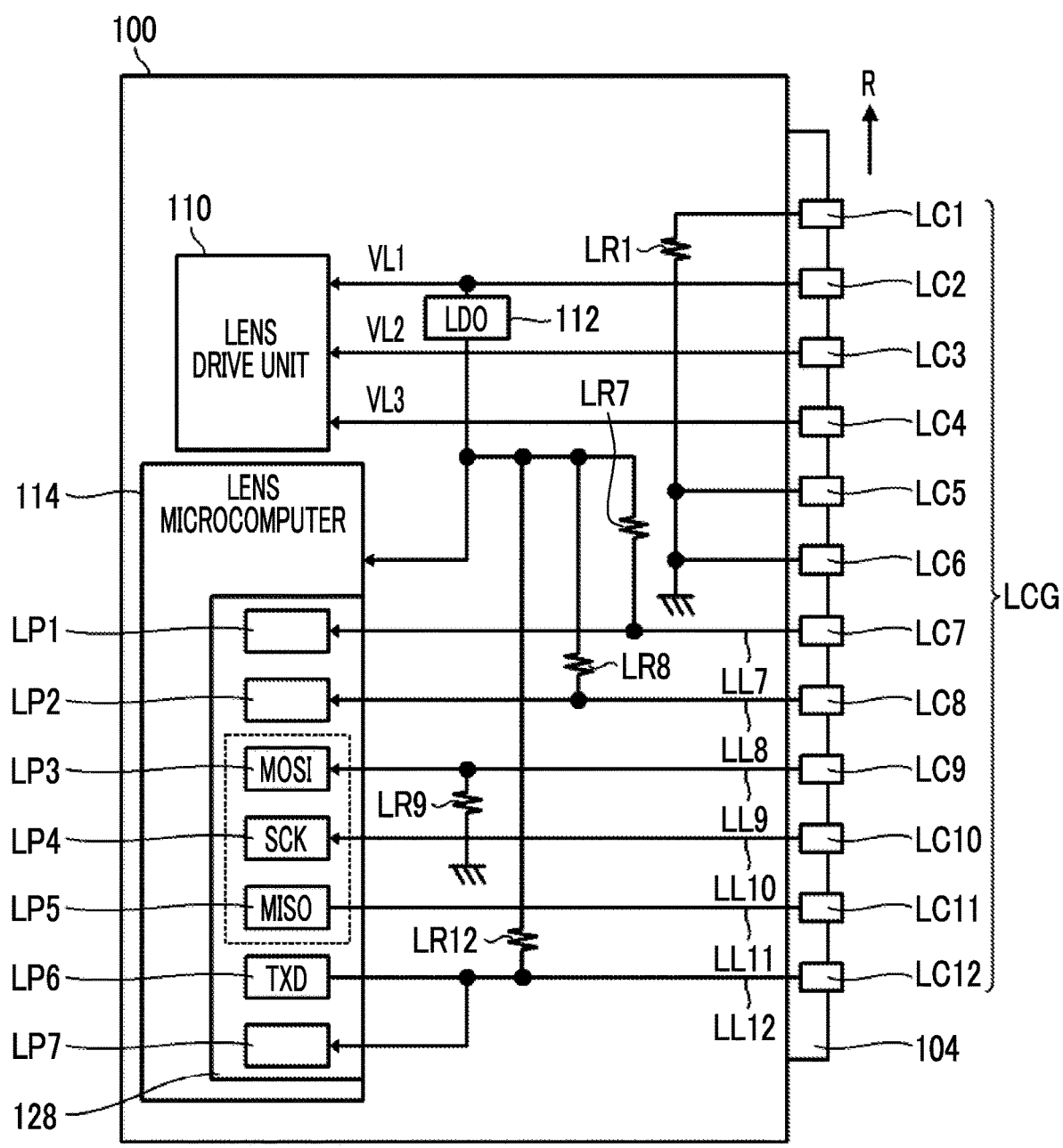
FIG. 14 is a diagram showing a connection structure of a line of each contact provided in the lens.

FIG. 14 is a diagram showing a connection structure of a line of each contact provided in the lens.

As described above, the lens-side mount 104 of the lens 100 is provided with the lens-side contact group LCG. The lens-side contact group LCG corresponds to the camera-side contact group CCG. Therefore, the lens-side contact group LCG is configured to have the same number of contacts as the contacts constituting the camera-side contact group CCG, and each of the contacts LC1 to LC12 is disposed at the same interval as the contacts CC1 to CC12 constituting the camera-side contact group CCG.

(A) First Contact LC1

The first contact LC1 is a lens detection contact corresponding to the lens detection contact (first contact CC1) on the camera-side. Therefore, in the case where the lens 100 is attached to the camera 10, the first contact LC1 is connected to the first contact CC1 on the camera-side. The first contact LC1 is grounded through a pull-down resistor LR1 and is pulled down to ground potential.

(B) Second Contact LC2, Third Contact LC3, and Fourth Contact LC4

The second contact LC2, the third contact LC3, and the fourth contact LC4 are the plurality of power contacts corresponding to the plurality of power contacts (second contact CC2, third contact CC3, and fourth contact CC4) on the camera-side. Therefore, in the case where the lens 100 is attached to the camera 10, the second contact LC2 is connected to the second contact CC2 on the camera-side and the third contact LC3 is connected to the third contact CC3 on the camera-side. Further, the fourth contact LC4 is connected to the fourth contact CC4 on the camera-side.

As described above, the second contact CC2 on the camera-side is the first power contact for supplying the first lens-drive power LV1 (+5 V) having the lowest voltage. Therefore, in the case where the lens 100 is attached to the camera 10, the first lens-drive power LV1 having the lowest voltage is supplied to the second contact LC2.

The lens-side system power generation unit 112 is connected to the second contact LC2 in the lens. The lens-side system power generation unit 112 generates the system power (+3.3 V) by using the first lens-drive power LV1 (+5 V) to be supplied from the second contact LC2 and supplies the generated system power to the lens microcomputer 114.

Further, the third contact CC3 on the camera-side is the second power contact for supplying the second lens-drive power LV2 (+6.5 V). Therefore, in the case where the lens 100 is attached to the camera 10, the second lens-drive power LV2 is supplied to the third contact LC3.

Further, the fourth contact CC4 on the camera-side is the third power contact for supplying the lens-drive power LV3 (+10 V) having the highest voltage. Therefore, in the case where the lens 100 is attached to the camera 10, the third lens-drive power LV3 having the highest voltage is supplied to the fourth contact CC4 on the camera-side.

(C) Fifth Contact LC5 and Sixth Contact LC6

The fifth contact LC5 and the sixth contact LC6 are two ground contacts respectively corresponding to the two ground contacts (fifth contact CC5 and sixth contact CC6) on the camera-side. Therefore, in the case where the lens 100 is attached to the camera 10, the fifth contact LC5 is connected to the fifth contact CC5 on the camera-side and the sixth contact LC6 is connected to the sixth contact CC6 on the camera-side.

(D) Seventh Contact LC7 to Twelfth Contact LC12

The seventh contact LC7 to the twelfth contact LC12 are the plurality of communication contacts corresponding to the plurality of communication contacts (seventh contact CC7 to twelfth contact CC12) on the camera-side. Therefore, in the case where the lens 100 is attached to the camera 10, the seventh contact LC7 is connected to the seventh contact CC7 on the camera-side, and the eighth contact LC8 is connected to the eighth contact CC8 on the camera-side. Further, the ninth contact LC9 is connected to the ninth contact CC9 on the camera-side, and the tenth contact LC10 is connected to the tenth contact CC10 on the camera-side. Furthermore, the eleventh contact LC11 is connected to the eleventh contact CC11 on the camera-side, and the twelfth contact LC12 is connected to the twelfth contact CC12 on the camera-side.

As described above, the seventh contact CC7 on the camera-side is the communication contact for giving the notification of the state from the lens 100 to the camera 10. Therefore, the seventh contact LC7 is also used as the communication contact for giving the notification of the state from the lens 100 to the camera 10. The seventh contact LC7 is connected to the first communication port LP1 of the lens microcomputer 114 through a seventh signal line LL7.

Further, the eighth contact CC8 on the camera-side is a communication contact for transmitting the VSYNC signal from the camera 10 to the lens 100. Therefore, the eighth contact LC8 is used as a communication contact for receiving the VSYNC signal transmitted from the camera-side. The eighth contact LC8 is connected to the second communication port LP2 of the lens microcomputer 114 through an eighth signal line LL8.

Further, the ninth contact CC9, the tenth contact CC10, and the eleventh contact CC11 on the camera-side are communication contacts for respectively performing the three-line serial communication with the lens 100. Therefore, the ninth contact LC9, the tenth contact LC10, and the eleventh contact LC11 are also used as the communication contacts for performing the three-line serial communication with the camera 10. The ninth contact LC9 is connected to the third communication port LP3 of the lens microcomputer 114 through a ninth signal line LL9. The tenth contact LC10 is connected to the fourth communication port LP4 of the lens microcomputer 114 through a tenth signal line LL10. The eleventh contact LC11 is connected to the fifth communication port LP5 of the lens microcomputer 114 through an eleventh signal line LL11.

The ninth signal line LL9, the tenth signal line LL10, and the eleventh signal line LL11 are signal lines for performing the three-line serial communication with the camera 10 and constitute lens-side main signal lines.

Further, the twelfth contact CC12 on the camera-side is a contact for performing the single-line serial communication with the lens 100 and a contact for notifying the camera 10 of the state from the lens 100. Therefore, the twelfth contact LC12 also functions as the contact for performing the single-line serial communication with the camera 10 and the contact for notifying the camera 10 of the state. The twelfth contact LC12 is connected to the sixth communication port LP6 and the seventh communication port LP7 of the lens microcomputer 114. A twelfth signal line LL12 is an example of a lens-side sub-signal line.

As shown in FIG. 14, the seventh contact LC7, the eighth contact LC8, and the twelfth contact LC12 among the plurality of contacts (seventh contact LC7 to twelfth contact LC12) constituting the communication contact are respectively connected to the lens-side system power generation unit 112 through pull-up resistors LR7, LR8, and LR12, and are pulled up to potential (for example, +3.3 V) of the system power to be supplied from the lens-side system power generation unit 112.

Further, the ninth contact LC9 among the plurality of contacts (seventh contact LC7 to twelfth contact LC12) constituting the communication contact is grounded through a pull-down resistor LR9 and is pulled down to the ground potential.

The plurality of contacts LC1 to LC12 constituting the lens-side contact group LCG are also disposed in the same arrangement as the plurality of contacts CC1 to CC12 constituting the camera-side contact group CCG. That is, the plurality of contacts LC1 to LC12 are disposed in an order of the first contact LC1, the second contact LC2, . . . , the eleventh contact LC11, and the twelfth contact LC12 with respect to the rotation direction R of the lens 100 in the case where the lens 100 is attached to the camera 10. Therefore, the lens-side contact group LCG is also disposed in the order of the lens detection contact (first contact LC1), the plurality of power contacts (second contact LC2 to fourth contact LC4), the plurality of ground contacts (fifth contact LC5 and sixth contact LC6), and the plurality of communication contacts (seventh contact LC7 to twelfth contact LC12).

<<Function of Each Contact Provided in Accessory>>

FIG. 15 is a diagram showing a connection structure of a line of each contact provided in the accessory.

As described above, the accessory 200 is provided with the accessory-side first mount 204A and the accessory-side second mount 204B. The accessory-side first mount 204A is the mount for attaching the accessory 200 to the camera 10, and the accessory-side second mount 204B is the mount for attaching the lens 100 to the accessory 200. The accessory-side first mount 204A is provided with the accessory-side first contact group A1CG, and the accessory-side second mount 204B is provided with the accessory-side second contact group A2CG.

<Accessory-Side First Contact Group>

As described above, the accessory-side first mount 204A is the mount for attaching the accessory 200 to the camera 10. In the case where the accessory 200 is attached to the camera 10, each of the contacts A1C1 to A1C12 of the accessory-side first contact group A1CG is connected to the corresponding contacts CC1 to CC12 of the camera-side contact group CCG. That is, the first contact A1C1 of the accessory-side first contact group A1CG is connected to the first contact CC1 of the camera-side contact group CCG, the second contact A1C2 of the accessory-side first contact group A1CG is connected to the second contact CC2 of the camera-side contact group CCG, . . . , and the twelfth contact A1C12 of the accessory-side first contact group A1CG is connected to the twelfth contact CC12 of the camera-side contact group CCG. Therefore, each of the contacts A1C1 to A1C12 of the accessory-side first contact group A1CG has the functions of the corresponding contacts CC1 to CC12 of the camera-side contact group CCG.

(A) First Contact A1C1

Since the first contact CC1 of the camera-side contact group CCG constitutes the lens detection contact, the first contact A1C1 of the accessory-side first contact group A1CG also constitutes the lens detection contact.

(B) Second Contact A1C2, Third Contact A1C3, and Fourth Contact A1C4

Since the second contact CC2, the third contact CC3, and the fourth contact CC4 of the camera-side contact group CCG respectively constitute the power contacts, the second contact A1C2, the third contact A1C3, and the fourth contact A1C4 of the accessory-side first contact group A1CG also respectively constitute the corresponding power contacts.

The second contact A1C2 is a contact that supplies the lens-drive power LV1 having the lowest voltage, and the fourth contact A1C4 is a contact that supplies the lens-drive power LV3 having the highest voltage. Further, the third contact A1C3 is a contact that supplies the lens-drive power LV2 having the intermediate voltage.

(C) Fifth Contact A1C5 and Sixth Contact A1C6

Since the fifth contact CC5 and the sixth contact CC6 of the camera-side contact group CCG respectively constitute the ground contacts, the fifth contact A1C5 and the sixth contact A1C6 of the accessory-side first contact group A1CG also respectively constitute the corresponding ground contacts.

(D) Seventh Contact A1C7 to Twelfth Contact A1C12

Since the seventh contact CC7 to the twelfth contact CC12 of the camera-side contact group CCG respectively constitute the communication contacts, the seventh contact A1C7 to the twelfth contact A1C12 of the accessory-side first contact group A1CG also respectively constitute the corresponding communication contacts.

The twelfth contact A1C12 is grounded through a pull-down resistor AR12 and is pulled down to the ground potential. Accordingly, in the case where the accessory 200 is attached to the camera 10, the twelfth contact CC12 of the camera 10 is set to the LOW level (second polarity). The camera microcomputer 34 can detect that the accessory 200 is attached to the camera 10 by detecting that the twelfth contact CC12 is at the LOW level (second polarity). However, the camera microcomputer 34 can detect only the presence or absence of the attachment of the accessory 200. In a case where a plurality of accessories 200 are attached, it is impossible to detect the number of the accessories 200.

A resistance value of the pull-down resistor AR12 to be connected to the twelfth contact A1C12 is set to a resistance value larger than a pull-up resistor LR12 connected to the twelfth contact LC12 of the lens 100. For example, the pull-up resistor LR12 connected to the twelfth contact LC12 of the lens 100 is configured to be 2.2 kΩ, and the pull-down resistor AR12 connected to the twelfth contact A1C12 of the accessory-side first contact group A1CG is configured to be 220 kΩ. Accordingly, for example, even in a case where a mode of the accessory 200 is set to a bypass mode, it is possible to set the twelfth contact CC12 of the camera 10 to the LOW level (second polarity).

<Accessory-Side Second Contact Group>

As described above, the accessory-side second mount 204B is the mount for attaching the lens 100 to the accessory 200. In the case where the lens 100 is attached to the accessory 200, each of the contacts LC1 to LC12 of the lens-side contact group LCG is connected to the corresponding contacts A2C1 to A2C12 of the accessory-side second contact group A2CG. That is, the first contact LC1 of the lens-side contact group LCG is connected to the first contact A2C1 of the accessory-side second contact group A2CG, the second contact LC2 of the lens-side contact group LCG is connected to the second contact A2C2 of the accessory-side second contact group A2CG, . . . , and the twelfth contact LC12 of the lens-side contact group LCG is connected to the twelfth contact A2C12 of the accessory-side second contact group A2CG. Therefore, each of the contacts A2C1 to A2C12 of the accessory-side second contact group A2CG has the functions of the corresponding contacts LC1 to LC12 of the lens-side contact group LCG.

(A) First Contact A2C1

Since the first contact LC1 of the lens-side contact group LCG constitutes the lens detection contact, the first contact A2C1 of the accessory-side second contact group A2CG also constitutes the lens detection contact.

(B) Second Contact LC2, Third Contact LC3, and Fourth Contact LC4

Since the second contact LC2, the third contact LC3, and the fourth contact LC4 of the lens-side contact group LCG respectively constitute the power contacts, the second contact A2C2, the third contact A2C3, and the fourth contact A2C4 of the accessory-side second contact group A2CG also respectively constitute the corresponding power contacts.

The second contact A2C2 is a contact that supplies the lens-drive power LV1 having the lowest voltage, and the fourth contact A2C4 is a contact that supplies the lens-drive power LV3 having the highest voltage. Further, the third contact A2C3 is a contact that supplies the lens-drive power LV2 having the intermediate voltage.

(C) Fifth Contact A2C5 and Sixth Contact A2C6

Since the fifth contact LC5 and the sixth contact LC6 of the lens-side contact group LCG respectively constitute the ground contacts, the fifth contact A2C5 and the sixth contact A2C6 of the accessory-side second contact group A2CG also respectively constitute the corresponding ground contacts.

(D) Seventh Contact A2C7 to Twelfth Contact A2C12

Since the seventh contact LC7 to the twelfth contact LC12 of the lens-side contact group LCG respectively constitute the communication contacts, the seventh contact A2C7 to the twelfth contact A2C12 of the accessory-side second contact group A2CG also respectively constitute the corresponding communication contacts.

<Connection Relationship Between Accessory-Side First Contact Group and Accessory-Side Second Contact Group>

Each of the contacts A1C1 to A1C12 of the accessory-side first contact group A1CG and each of the contacts A2C1 to A2C12 of the accessory-side second contact group A2CG are connected as follows in the accessory.

(A) First Contact

The first contact A1C1 constituting the lens detection contact in the accessory-side first contact group A1CG and the first contact A2C1 constituting the lens detection contact in the accessory-side second contact group A2CG are connected to each other by a first connection line AL1 in the accessory. Accordingly, it is possible to electrically connect the first contact CC1 of the camera 10 and the first contact LC1 of the lens 100 also in a case where the accessory 200 is attached between the camera 10 and the lens 100.

(B) Second Contact to Fourth Contact

The second contact A1C2 constituting the first power contact in the accessory-side first contact group A1CG and the second contact A2C2 constituting the first power contact in the accessory-side second contact group A2CG are connected to each other by the second connection line AL2 constituting an accessory-side power line in the accessory. Accordingly, it is possible to electrically connect the second contact CC2 of the camera 10 and the second contact LC2 of the lens 100 also in the case where the accessory 200 is attached between the camera 10 and the lens 100. In this case, the second connection line AL2 functions as a line that supplies the first lens-drive power LV1 having the lowest voltage from the camera 10 to the lens 100.

The third contact A1C3 constituting the second power contact in the accessory-side first contact group A1CG and the third contact A2C3 constituting the second power contact in the accessory-side second contact group A2CG are connected to each other by a third connection line AL3 constituting the accessory-side power line in the accessory. Accordingly, it is possible to electrically connect the third contact CC3 of the camera 10 and the third contact LC3 of the lens 100 also in the case where the accessory 200 is attached between the camera 10 and the lens 100. In this case, the third connection line AL3 functions as a line that supplies the second lens-drive power LV2 having the intermediate voltage from the camera 10 to the lens 100.

The fourth contact A1C4 constituting the third power contact in the accessory-side first contact group A1CG and the fourth contact A2C4 constituting the third power contact in the accessory-side second contact group A2CG are connected to each other by a fourth connection line AL4 constituting the accessory-side power line in the accessory. Accordingly, it is possible to electrically connect the fourth contact CC4 of the camera 10 and the fourth contact LC4 of the lens 100 also in the case where the accessory 200 is attached between the camera 10 and the lens 100. In this case, the fourth connection line AL4 functions as a line that supplies the third lens-drive power LV3 having the highest voltage from the camera 10 to the lens 100.

(C) Fifth Contact and Sixth Contact

The sixth contact A1C6 constituting a second ground contact in the accessory-side first contact group A1CG and the sixth contact A2C6 constituting the second ground contact in the accessory-side second contact group A2CG are connected to each other by a sixth connection line AL6 constituting an accessory-side ground line in the accessory. Accordingly, it is possible to electrically connect the sixth contact CC6 of the camera 10 and the sixth contact LC6 of the lens 100 also in the case where the accessory 200 is attached between the camera 10 and the lens 100.

The fifth contact A1C5 constituting a first ground contact in the accessory-side first contact group A1CG and the fifth contact A2C5 constituting the first ground contact in the accessory-side second contact group A2CG are connected to the sixth connection line AL6 respectively through fifth connection lines AL5A and AL5B in the accessory. Accordingly, it is possible to electrically connect the fifth contact CC5 of the camera 10 and the fifth contact LC5 of the lens 100 also in the case where the accessory 200 is attached between the camera 10 and the lens 100.

(D) Seventh Contact to Twelfth Contact

The seventh contact A1C7 constituting the communication contact in the accessory-side first contact group A1CG and the seventh contact A2C7 constituting the communication contact in the accessory-side second contact group A2CG are connected to each other by the seventh connection line AL7 in the accessory. Accordingly, it is possible to electrically connect the seventh contact CC7 of the camera 10 and the seventh contact LC7 of the lens 100 also in the case where the accessory 200 is attached between the camera 10 and the lens 100.

An eighth contact A1C8 constituting the communication contact in the accessory-side first contact group A1CG and an eighth contact A2C8 constituting the communication contact in the accessory-side second contact group A2CG are connected to each other by an eighth connection line AL8 in the accessory. Accordingly, it is possible to electrically connect the eighth contact CC8 of the camera 10 and the eighth contact LC8 of the lens 100 also in the case where the accessory 200 is attached between the camera 10 and the lens 100.

A ninth contact A1C9 constituting the communication contact in the accessory-side first contact group A1CG and a ninth contact A2C9 constituting the communication contact in the accessory-side second contact group A2CG are connected to each other by a ninth connection line AL9 in the accessory. Accordingly, it is possible to electrically connect the ninth contact CC9 of the camera 10 and the ninth contact LC9 of the lens 100 also in the case where the accessory 200 is attached between the camera 10 and the lens 100.

A tenth contact A1C10 constituting the communication contact in the accessory-side first contact group A1CG and a tenth contact A2C10 constituting the communication contact in the accessory-side second contact group A2CG are connected to each other by a tenth connection line AL10 in the accessory. Accordingly, it is possible to electrically connect the tenth contact CC10 of the camera 10 and the tenth contact LC10 of the lens 100 also in the case where the accessory 200 is attached between the camera 10 and the lens 100.

An eleventh contact A1C11 constituting the communication contact in the accessory-side first contact group A1CG and an eleventh contact A2C11 constituting the communication contact in the accessory-side second contact group A2CG are connected to each other by an eleventh connection line AL11 in the accessory. Accordingly, it is possible to electrically connect the eleventh contact CC11 of the camera 10 and the eleventh contact CC11 of the lens 100 also in the case where the accessory 200 is attached between the camera 10 and the lens 100.

Here, since the ninth contact, the tenth contact, and the eleventh contact are the contacts used for the three-line serial communication, the ninth connection line AL9, the tenth connection line AL10, and the eleventh connection line AL11 are used for the three-line serial communication. That is, the ninth connection line AL9, the tenth connection line AL10, and the eleventh connection line AL11 constitute accessory-side main signal lines. In the case where the accessory 200 is attached to the camera 10, the ninth connection line AL9, the tenth connection line AL10, and the eleventh connection line AL11 are connected to the ninth signal line CL9, the tenth signal line CL10, and the eleventh signal line CL11 on the camera-side which are the camera-side main signal lines. Further, in the case where the lens 100 is attached to the accessory 200, the ninth connection line AL9, the tenth connection line AL10, and the eleventh connection line AL11 are connected to the ninth signal line LL9, the tenth signal line LL10, and the eleventh signal line LL11 on the lens side which are the lens-side main signal lines.

The twelfth contact A1C12 of the accessory-side first contact group A1CG is connected to the accessory microcomputer 210 through the accessory-side first sub-signal line AL12A in the accessory. Further, the twelfth contact A2C12 of the accessory-side second contact group A2CG is connected to the accessory microcomputer 210 through the accessory-side second sub-signal line AL12B in the accessory.

<<Bypass Mechanism Provided in Accessory>>

As described above, the accessory 200 is provided with the bypass mechanism for communicating without passing through the accessory microcomputer 210 in the case where the camera microcomputer 34 and the lens microcomputer 114 communicate through the twelfth contacts CC12 and LC12. Hereinafter, a configuration of this bypass mechanism will be described.

<Configuration of Bypass Mechanism>

As shown in FIG. 15, the bypass signal line 230 is connected between the twelfth contact A1C12 of the accessory-side first contact group A1CG and the twelfth contact A2C12 of the accessory-side second contact group A2CG so as to bypass the accessory microcomputer 210.

A first field-effect transistor (FET) 234 as a first switch and a second FET 236 as a second switch are connected to the bypass signal line 230.

A source contact of the first FET 234 is connected to the twelfth contact A1C12 of the accessory-side first contact group A1CG through the bypass signal line 230. Further, a drain contact of the first FET 234 is connected to a drain contact of the second FET 236 through the bypass signal line 230.

Further, a source contact of the second FET 236 is connected to the twelfth contact A2C12 of the accessory-side second contact group A2CG through the bypass signal line 230.

Gate contacts of the first FET 234 and the second FET 236 are respectively connected to a line 238 that connects the second connection line AL2 and the sixth connection line AL6.

The third FET 240 as a third switch and a pull-up resistor 242 are connected to the line 238.

As described above, since the second connection line AL2 functions as the line that supplies the first lens-drive power LV1 having the lowest voltage, the gate contacts of the first FET 234 and the second FET 236 connected to the line 238 are respectively pulled up to potential of the first lens-drive power LV1.

A drain contact of the third FET 240 is connected to the pull-up resistor 242 through the line 238. Further, a source contact of the third FET 240 is connected to the sixth connection line AL6 through the line 238. Since the sixth connection line AL6 functions as the ground line, the source contact of the third FET 240 is grounded.

Further, the gate contact of the third FET 240 is connected to the third port AP3 of the accessory microcomputer 210 through the line 244. The accessory microcomputer 210 functioning as the bypass control unit 214 controls the polarity (HIGH level or LOW level) of the third port AP3 to control the on and off of the bypass mechanism.

The first FET 234, the second FET 236, and the third FET 240 constitute the communication path switching switch 232.

<Operation of Bypass Mechanism>

In the case where the accessory 200 is attached, a mode in which the camera microcomputer 34 and the lens microcomputer 114 communicate with passing through the accessory microcomputer 210 is set as a normal communication mode, and a mode in which the camera microcomputer 34 and the lens microcomputer 114 communicate without passing through the accessory microcomputer 210 is set as the bypass mode. The bypass mechanism is turned off in the normal communication mode, and the bypass mechanism is turned on in the bypass mode.

(1) Normal Communication Mode

The bypass mechanism is turned off in the normal communication mode. In this case, the accessory microcomputer 210 sets the polarity of the third port AP3 of the accessory microcomputer input and output port 216 thereof to the HIGH level. Accordingly, the gate contact of the third FET 240 is set to the HIGH level, and the third FET 240 as the switch is turned on.

On the other hand, the third FET 240 as the switch is turned on to respectively set the gate contacts of the first FET 234 and the second FET 236 to the LOW level. Accordingly, the first FET 234 and the second FET 236 as the switch are turned off. As a result, the bypass signal line 230 is disconnected, and the bypass mechanism is turned off.

Accordingly, the camera microcomputer 34 and the lens microcomputer 114 are communicable through the accessory microcomputer 210. More specifically, the accessory microcomputer 210 and the camera microcomputer 34 are connected in a communicable manner, and the accessory microcomputer 210 and the lens microcomputer 114 are connected in a communicable manner.

The communication herein is the single-line serial communication. In this case, the data is transmitted from the lens microcomputer 114 to the accessory microcomputer 210, and the data is transmitted from the accessory microcomputer 210 to the camera microcomputer 34.

(2) Bypass Mode

The bypass mechanism is turned on in the bypass mode. In this case, the accessory microcomputer 210 sets the polarity of the third port AP3 of the accessory microcomputer input and output port 216 thereof to the LOW level. Accordingly, the third FET 240 as the switch is turned off.

On the other hand, in the case where the third FET 240 as the switch is turned off, the gate contacts of the first FET 234 and the second FET 236 are respectively set to the HIGH level. Accordingly, the first FET 234 and the second FET 236 as the switch are turned on. As a result, the bypass signal line 230 is conductive, and the bypass mechanism is turned on.

Accordingly, the setting is made that the camera microcomputer 34 and the lens microcomputer 114 can directly communicate without passing through the accessory microcomputer 210.

<<Electric Connection Relationship of Camera, Lens, and Accessory>>

<Electric Connection Relationship in Case where Lens is Directly Attached to Camera>

Figure 16:
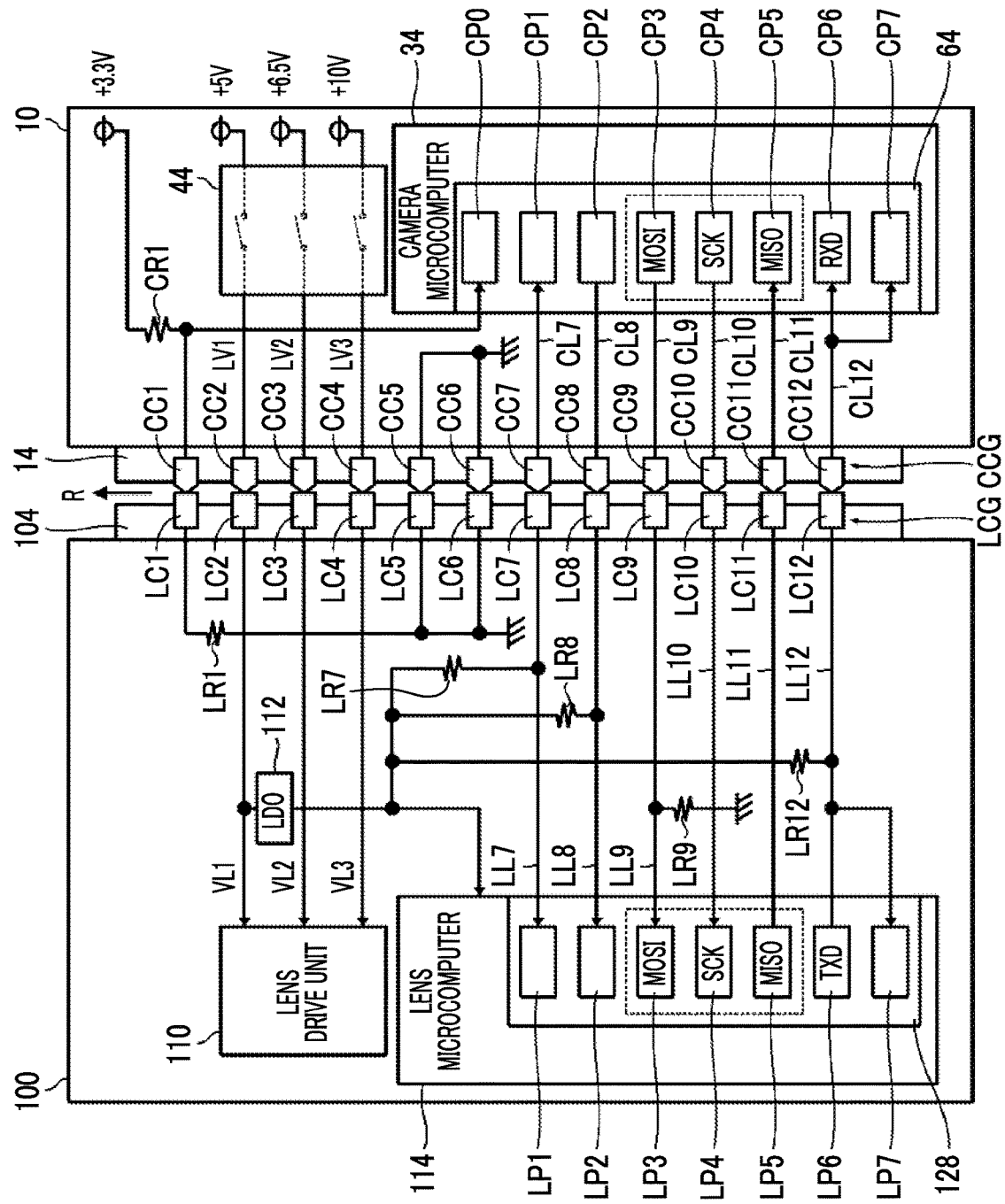
FIG. 16 is a diagram showing an electric connection relationship in a case where the lens is directly attached to the camera.

FIG. 16 is a diagram showing an electric connection relationship in a case where the lens is directly attached to the camera.

As shown in FIG. 16, in the case where the lens 100 is directly attached to the camera 10, each of the contacts LC1 to LC12 of the lens-side contact group LCG is connected to the corresponding contacts CC1 to CC12 of the camera-side contact group CCG. That is, the first contact LC1 of the lens-side contact group LCG is connected to the first contact CC1 of the camera-side contact group CCG, the second contact LC2 of the lens-side contact group LCG is connected to the second contact CC2 of the camera-side contact group CCG, . . . , and the twelfth contact LC12 of the lens-side contact group LCG is connected to the twelfth contact CC12 of the camera-side contact group CCG.

<Electric Connection Relationship in Case where Accessory is Attached between Camera and Lens>

Figure 17:
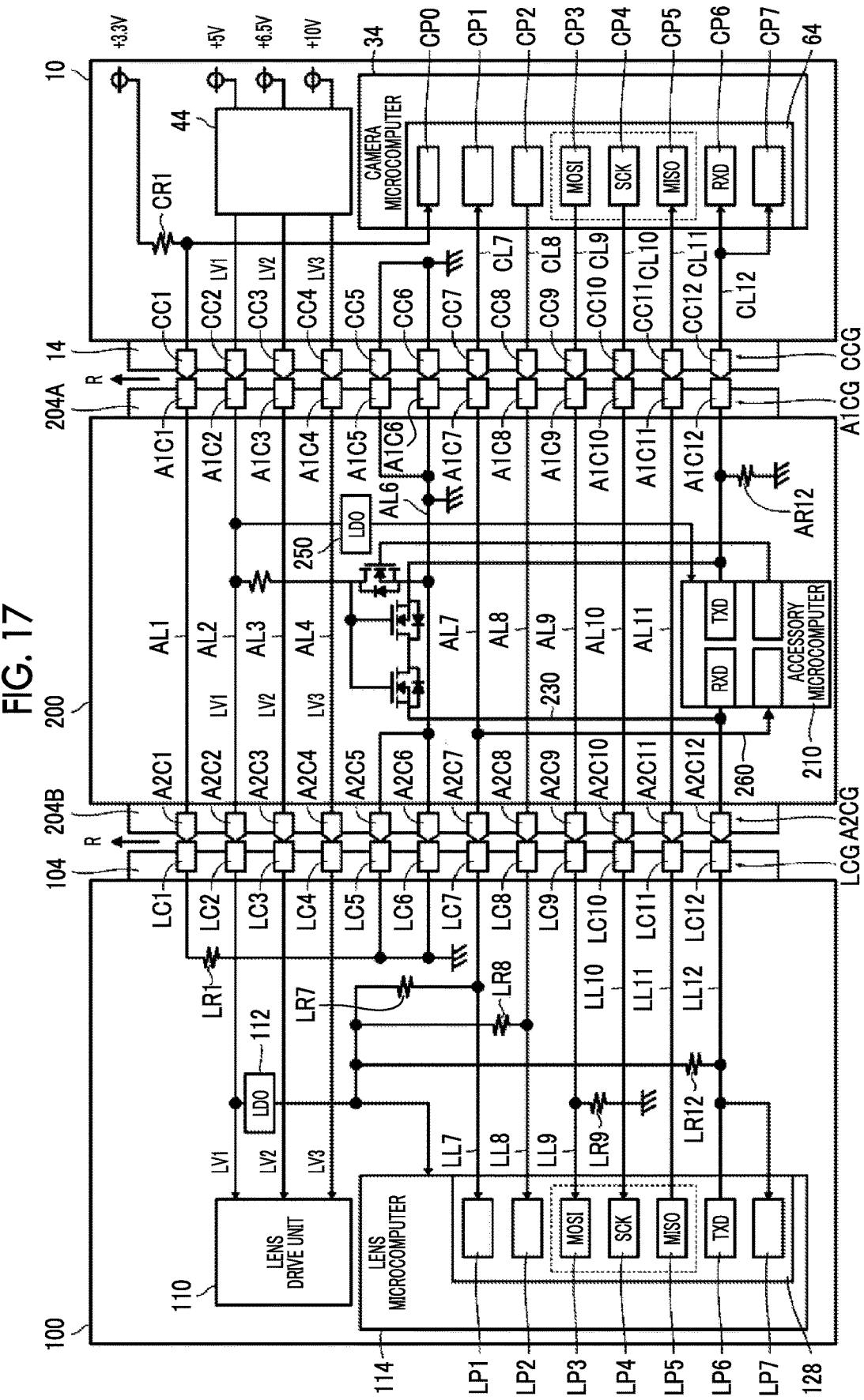
FIG. 17 is a diagram showing an electric connection relationship in a case where the accessory is attached between the camera and the lens.

FIG. 17 is a diagram showing an electric connection relationship in a case where the accessory is attached between the camera and the lens.

As shown in FIG. 17, in the case where the accessory 200 is attached to the camera 10, each of the contacts A1C1 to A1C12 of the accessory-side first contact group A1CG is connected to the corresponding contacts CC1 to CC12 of the camera-side contact group CCG. That is, the first contact A1C1 of the accessory-side first contact group A1CG is connected to the first contact CC1 of the camera-side contact group CCG, the second contact A1C2 of the accessory-side first contact group A1CG is connected to the second contact CC2 of the camera-side contact group CCG, . . . , and the twelfth contact A1C12 of the accessory-side first contact group A1CG is connected to the twelfth contact CC12 of the camera-side contact group CCG.

Further, in the case where the lens 100 is attached to the accessory 200, each of the contacts LC1 to LC12 of the lens-side contact group LCG is connected to the corresponding contacts A2C1 to A2C12 of the accessory-side second contact group A2CG. That is, the first contact LC1 of the lens-side contact group LCG is connected to the first contact A2C1 of the accessory-side second contact group A2CG, the second contact LC2 of the lens-side contact group LCG is connected to the second contact A2C2 of the accessory-side second contact group A2CG, . . . , and the twelfth contact LC12 of the lens-side contact group LCG is connected to the twelfth contact A2C12 of the accessory-side second contact group A2CG.

In a case where a plurality of accessories 200 are attached, the accessory-side first contact group A1CG of one accessory 200 is connected to the accessory-side second contact group A2CG of the other accessory 200.

[Action of Camera System]

<<Attachment of Lens and Accessory>>

<Case where Accessory is not Attached>

The lens-side mount 104 provided in the lens 100 is attached to the camera-side mount 14 provided in the camera 10 to attach the lens 100 to the camera 10. In this case, the lens 100 is rotated with respect to the camera 10 for the attachment.

The lens 100 is attached to the camera 10 to connect the lens-side contact group LCG provided in the lens-side mount 104 to the camera-side contact group CCG provided in the camera-side mount 14.

In the case where the lens 100 is attached to the camera 10, the lens-side contact group LCG is disposed in an order of the lens detection contact (first contact LC1), the plurality of power contacts (second contact LC2 to fourth contact LC4), the plurality of ground contacts (fifth contact LC5 and sixth contact LC6), and the plurality of communication contacts (seventh contact LC7 to twelfth contact LC12) along the rotation direction. Therefore, it is possible for the power contacts (second contact LC2 to fourth contact LC4) to touch more contacts of the camera-side contact group CCG. Accordingly, it is possible to improve a self-cleaning effect of the plurality of power contacts (second contact LC2 to fourth contact LC4) of the lens-side contact group LCG. As a result, it is possible to reduce touch resistance of the plurality of power contacts (second contact LC2 to fourth contact LC4) of the lens-side contact group LCG and thus to efficiently supply the power.

<Case where Accessory is Attached>

The accessory-side first mount 204A provided in the accessory 200 is attached to the camera-side mount 14 provided in the camera 10 to attach the accessory 200 to the camera 10. In this case, the accessory 200 is rotated with respect to the camera 10 for the attachment.

In the case where the plurality of accessories 200 are attached, the accessory-side first mount 204A of an accessory 200 to be attached additionally is attached to the accessory-side second mount 204B of an accessory 200 already attached to the camera 10. Accordingly, the accessory 200 is additionally attached.

In the case where the lens 100 is attached, the lens-side mount 104 provided in the lens 100 is attached to the accessory-side second mount 204B of the accessory 200 already attached to the camera 10. Accordingly, the lens 100 is attached to the accessory 200.

<<Detection of Lens Attachment>>

The camera microcomputer 34 detects the presence or absence of the attachment of the lens 100 based on the polarity of the first contact (lens detection contact) CC1 of the camera-side contact group CCG.

In a case where the lens 100 is not attached, the first contact CC1 on the camera-side is pulled up by the pull-up resistor CR1 and thus is at the HIGH level (high potential).

On the other hand, in the case where the lens 100 is attached to the camera 10, the first contact (lens detection contact) LC1 on the lens side is connected to the first contact CC1 on the camera-side as shown in FIG. 16. Since the first contact LC1 on the lens side is grounded, in a case where the first contact LC1 on the lens side is connected to the first contact CC1 on the camera-side, the first contact CC1 on the camera-side is at the LOW level (low potential).

The camera microcomputer 34 detects the presence or absence of the attachment of the lens 100 based on the polarity (HIGH level or LOW level) of the lens detection port CP0 connected to the first contact CC1 on the camera-side. That is, it is determined that the lens 100 is not attached in a case where potential of the lens detection port CP0 is at the HIGH level, and it is discriminated that the lens 100 is attached in a case where potential of the lens detection port CP0 is at the LOW level to detect the presence or absence of the attachment of the lens 100.

The first contact CC1 which is the lens detection contact is disposed at a head of the rotation direction R of the lens 100 in the case where the lens 100 is attached to the camera 10. Accordingly, it is possible to prevent the contact other than the first contact LC1 on the lens side from touching the first contact CC1 on the camera-side in a case where the lens 100 is attached and detached. Accordingly, it is possible to prevent erroneous detection.

<<Detection of Accessory Attachment>>

The camera microcomputer 34 can detect that the accessory 200 is attached to the camera 10 by detecting that the twelfth contact CC12 is at the LOW level (second polarity). However, the camera microcomputer 34 can detect only the presence or absence of the attachment of the accessory 200.

The presence or absence of the attachment of the accessory 200 is performed by the detection processing of the accessory 200 described below. In the detection processing of the accessory 200, the presence or absence of the attachment of the accessory 200 and the number of attachments of the accessory 200 are detected, and a type of the attached accessory is also detected.

<<Activation of Lens Microcomputer>>

In a case where the attachment of the lens 100 is detected, the camera microcomputer 34 starts the supplying of the lens-drive power to the power supply unit 42. That is, the camera microcomputer 34 controls the power supply unit 42 and the lens-drive power switch unit 44 such that the pieces of lens-drive power LV1, LV2, and LV3 are supplied to the plurality of power contacts (second contact CC2, third contact CC3, and fourth contact CC4) on the camera-side. Accordingly, the pieces of lens-drive power LV1, LV2, and LV3 are respectively supplied to the plurality of power contacts (second contact CC2, third contact CC3, and fourth contact CC4) on the camera-side.

Further, in a case where the pieces of lens-drive power LV1, LV2, and LV3 are supplied to the plurality of power contacts (second contact CC2, third contact CC3, and fourth contact CC4) on the camera-side, the pieces of lens-drive power LV1, LV2, and LV3 are supplied to the lens 100 through the plurality of power contacts (second contact LC2, third contact LC3, and fourth contact LC4) on the lens side connected to the plurality of power contacts (second contact CC2, third contact CC3, and fourth contact CC4) on the camera-side.

In a case where the pieces of lens-drive power LV1, LV2, and LV3 are supplied to the lens 100, the system power of the lens microcomputer 114 is generated by using one of the pieces of lens-drive power LV1, LV2, and LV3. The system power of the lens microcomputer 114 is generated by the lens-side system power generation unit 112. The lens-side system power generation unit 112 generates the system power (+3.3 V) by using the first lens-drive power LV1 (+5 V) having the lowest voltage among the plurality of pieces of lens-drive power LV1, LV2, and LV3 supplied from the camera-side, and supplies the generated system power to the lens microcomputer 114.

In a case where the system power is normally supplied to the lens microcomputer 114, the lens microcomputer 114 is activated.

In the case where the accessory 200 is attached, the system power is supplied to the accessory microcomputer 210 by the same procedure, and then the accessory microcomputer 210 is activated. That is, the accessory-side system power generation unit 250 generates the system power (+3.3 V) by using the lens-drive power LV1 (+5 V) having the lowest voltage, and supplies the generated system power to the accessory microcomputer 210. Accordingly, the accessory microcomputer 210 is activated.

<<Detection of Normal Supplying of System Power to Lens Microcomputer>>

The camera microcomputer 34 detects that the system power is normally supplied to the lens microcomputer 114 based on the polarity of a specific contact of the camera-side contact group CCG. The specific contact herein refers to a contact to be connected to the contact to which the pull-up resistor is connected on the lens side.

On the lens-side, the contacts to which the pull-up resistors LR7, LR8, and LR12 are connected are the seventh contact LC7, the eighth contact LC8, and the twelfth contact LC12. The contacts on the camera-side to be connected to these contacts are the seventh contact CC7, the eighth contact CC8, and the twelfth contact CC12.

The camera microcomputer 34 discriminates the polarities (HIGH level or LOW level) of the first communication port CP1 to be connected to the seventh contact CC7 of the camera-side contact group CCG, the second communication port CP2 to be connected to the eighth contact CC8 of the camera-side contact group CCG, and the sixth communication port CP6 to be connected to the twelfth contact CC12 of the camera-side contact group CCG to detect that the system power is normally supplied to the lens microcomputer 114. Specifically, in a case where it is detected that the polarities of the first communication port CP1, the second communication port CP2, and the sixth communication port CP6 are at the HIGH level, it is determined that the system power is normally supplied to the lens microcomputer 114. Accordingly, it is possible to appropriately detect that the system power is normally supplied to the lens microcomputer 114 on the camera-side even in the case where the system power of the lens microcomputer 114 is generated on the lens side. In particular, more accurate detection is possible by discriminating the polarities of the plurality of contacts as in the camera system 1 of the embodiment.

In a case where the system power is normally supplied to the lens microcomputer 114 and the lens microcomputer 114 is normally activated, the lens microcomputer 114 switches the polarity of the first communication port LP1 to the LOW level. As a result, the polarities of the seventh contact LC7 on the lens side and the seventh contact CC7 on the camera-side are switched from the HIGH level to the LOW level. The camera microcomputer 34 detects that the seventh contact CC7 is switched to the LOW level to detect that the lens microcomputer 114 is activated. That is, the lens microcomputer 114 switches the polarity of the first communication port LP1 to the LOW level to notify the camera microcomputer 34 of the normal activation. The lens microcomputer 114 switches the polarity of the first communication port LP1 to the LOW level after the lapse of a certain period of time from the activation.

<<Discrimination whether Lens is Regular Product>>

The camera microcomputer 34 discriminates whether the attached lens 100 is a regular lens based on the polarities of the specific contacts of the camera-side contact group CCG. The specific contacts herein are the contacts to be connected to the contacts to which the pull-up resistors LR7, LR8, and LR12 are connected, and the contact to which the pull-down resistor LR9 is connected on the lens side.

On the lens-side, the contacts to which the pull-up resistors LR7, LR8, and LR12 are connected are the seventh contact LC7, the eighth contact LC8, and the twelfth contact LC12. The contacts on the camera-side to be connected to these contacts are the seventh contact CC7, the eighth contact CC8, and the twelfth contact CC12.

Further, the contact to which the pull-down resistor LR9 is connected is the ninth contact LC9 on the lens side. The contact on the camera-side to be connected to this contact is the ninth contact CC9.

The camera microcomputer 34 discriminates the polarities (HIGH level or LOW level) of the first communication port CP1 to be connected to the seventh contact CC7 of the camera-side contact group CCG, the second communication port CP2 to be connected to the eighth contact CC8 of the camera-side contact group CCG, the third communication port CP3 to be connected to the ninth contact CC9 of the camera-side contact group CCG, and the sixth communication port CP6 to be connected to the twelfth contact CC12 of the camera-side contact group CCG to discriminate whether the attached lens 100 is the regular lens. Specifically, in a case where it is detected that the polarities of the first communication port CP1, the second communication port CP2, and the sixth communication port CP6 are at the HIGH level and the polarity of the third communication port CP3 is at the LOW level, the camera microcomputer 34 discriminates that the attached lens 100 is the regular lens.

In this manner, it is possible to easily discriminate whether the attached lens 100 is the regular lens by discriminating the polarities of the specific contacts at the time of attaching the lens 100.

<<Detection of Accessory (Accessory Detection Method)>>

In the case where the lens microcomputer 114 is normally activated, the detection processing of the accessory 200 is performed. The detection processing of the accessory 200 is processing of detecting the presence or absence of the attachment of the accessory 200 and the number of attachments of the accessory 200. In the case where the attachment is detected, processing of acquiring information on the attached accessory 200 is also performed.

Figure 18:
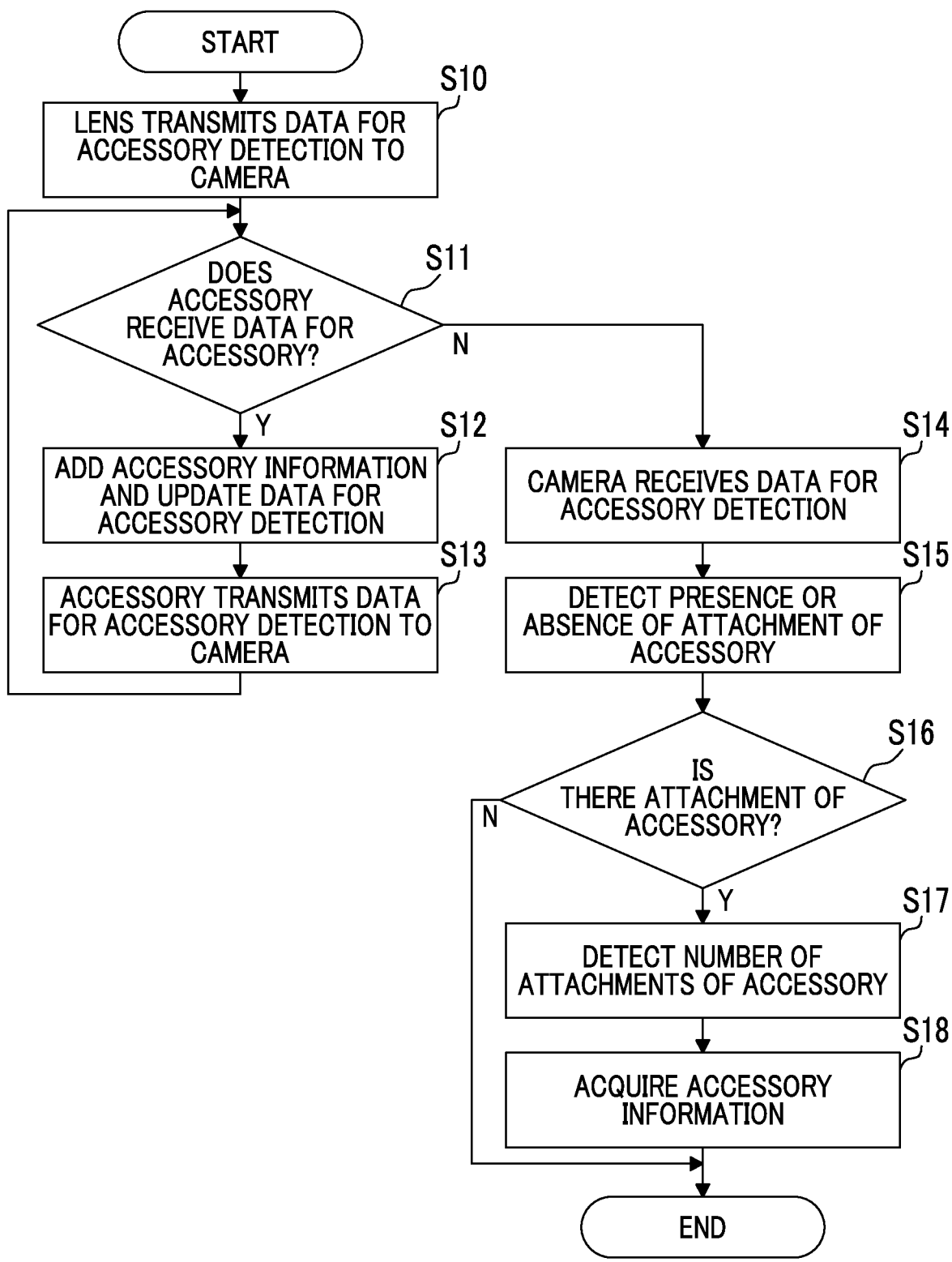
FIG. 18 is a flowchart showing a procedure of detection processing of the accessory.

FIG. 18 is a flowchart showing a procedure of the detection processing of the accessory.

The lens microcomputer 114 notifies the camera microcomputer 34 of the normal activation and then transmits data for accessory detection to the camera microcomputer 34 (step S10). The data for accessory detection is transmitted through the twelfth contact LC12. The twelfth contact LC12 is a contact for performing the single-line serial communication between the camera 10 and the accessory 200. Therefore, the data for accessory detection is transmitted to the camera-side by unidirectional single-line serial communication.

In the case where the accessory 200 is attached, the data for accessory detection transmitted from the lens microcomputer 114 is received by the accessory microcomputer 210. In the case where the data for accessory detection is received, the accessory microcomputer 210 transmits the received data for accessory detection to the camera 10. That is, the data for accessory detection is transmitted to the camera 10 by being relayed by the accessory 200.

In order to relay the data for accessory detection by the accessory 200, the communication mode of the accessory 200 is set to the normal communication mode.

In the case where the data for accessory detection is relayed, the accessory microcomputer 210 adds own accessory information to the received data for accessory detection to update the data for accessory detection. The updated data for accessory detection is transmitted to the camera 10. Therefore, processing after the data for accessory detection is transmitted from the lens 100 is as follows.

First, it is determined whether the data for accessory detection is received by the accessory microcomputer 210 (step S11).

A case where the data for accessory detection is not received by the accessory microcomputer 210 refers to the case where the accessory 200 is not attached. In this case, the data for accessory detection is received by the camera microcomputer 34 (step S14).

On the other hand, a case where the data for accessory detection is received by the accessory microcomputer 210 refers to the case where the accessory 200 is attached. In this case, the accessory microcomputer 210 adds the own accessory information to the received data for accessory detection to update the data for accessory detection (step S12). In this case, the accessory microcomputer 210 adds the accessory information after existing information included in the data for accessory detection to update the data for accessory detection. Therefore, in the case where the plurality of accessories 200 are attached, the accessory information is sequentially added after the existing information.

Here, the accessory information refers to information indicating a specification of the accessory 200. The accessory information includes, for example, accessory model information, accessory attachment position information, optical correction information, and the like. The accessory model information includes, for example, an accessory model name, an accessory type, a maker name, a product ID, and the like. Here, the product identification (ID) is a unique identification number assigned to a product and is also referred to as a serial number. Further, the accessory attachment position information is information on a valid attachment position of the accessory. For example, in a case where a position to which the accessory is required to be attached is limited to right after the lens, right before the camera, or the like, the limited position information is recorded as the accessory attachment position information. Further, similarly, in a case where a position where the optical correction is valid is limited, the limited position information is recorded as the accessory attachment position information. The optical correction information includes correction information on an image in the case where the accessory is attached and the like. The accessory information is stored in the ROM of the accessory microcomputer 210. The accessory 200 communicates with the camera microcomputer 34 and transmits the accessory information to the camera microcomputer 34.

The accessory microcomputer 210 updates the data for accessory detection and then transmits the updated data for accessory detection to the camera 10 (step S13).

In a case where the data for accessory detection is transmitted from the accessory microcomputer 210, it is determined whether the transmitted data for accessory detection is received by the accessory microcomputer 210 (step S11). In a case where the data for accessory detection is received by the accessory microcomputer 210, the pieces of processing of steps S12 and step S13 described above are implemented.

In a case where the data for accessory detection is not received by the accessory microcomputer 210 and is received by the camera microcomputer 34 (step S14), the camera microcomputer 34 detects the presence or absence of the attachment of the accessory 200 based on the received data for accessory detection (step S15). The detection is performed as follows.

In the case where the accessory 200 is attached, the data for accessory detection includes the accessory information. Therefore, in a case where the presence or absence of the accessory information is checked, it is possible to detect the presence or absence of the attachment of the accessory 200. The camera microcomputer 34 analyzes the received data for accessory detection to detect the presence or absence of the accessory information. In a case where the accessory information is not included in the received data for accessory detection, the camera microcomputer 34 determines that the accessory 200 is not attached. On the other hand, in a case where the accessory information is included in the received data for accessory detection, the camera microcomputer 34 determines that the accessory 200 is attached.

In this manner, the camera microcomputer 34 analyzes the received data for accessory detection, detects the presence or absence of the accessory information, and detects the presence or absence of the attachment of the accessory 200.

Thereafter, the camera microcomputer 34 determines the presence or absence of the attachment of the accessory 200 based on a detection result (step S16).

In a case where it is determined that the accessory 200 is not attached, the detection processing of the accessory 200 ends.

On the other hand, in a case where it is determined that the accessory 200 is attached, the camera microcomputer 34 detects the number of attachments of the accessory 200 based on the received data for accessory detection (step S17). The number of attachments of the accessory 200 is detected as follows.

As described above, the accessory information is added to the data for accessory detection every time the data for accessory detection is relayed by the accessory 200. Therefore, in a case where the number of pieces of accessory information included in the data for accessory detection is detected, it is possible to detect the number of attached accessories 200. The camera microcomputer 34 analyzes the data for accessory detection, counts the number of pieces of accessory information included in the data for accessory detection, and detects the number of attachments of the accessory 200.

Thereafter, the camera microcomputer 34 extracts the accessory information of individual accessory 200 from the data for accessory detection to acquire the information on the attached accessory 200 (step S18). In this case, the camera microcomputer 34 acquires information on an attachment order of the accessory 200. The information on the attachment order of the accessory 200 is acquired as follows.

As described above, in the case where the data for accessory detection is updated, the accessory information is added after the existing information and the update of the data for accessory detection is performed. Therefore, the accessory information of each accessory 200 is recorded to the data for accessory detection in the same order as the attached order. That is, the accessory information positioned at the head among the pieces of accessory information included in the data for accessory detection is accessory information of an accessory (=accessory most attached to the lens-side) attached at the head. The accessory information positioned at the end among the pieces of accessory information included in the data for accessory detection is accessory information of an accessory (=accessory most attached to the camera-side) attached at the end. Accordingly, it is possible to acquire the information on the attachment order of the accessory from an order of the accessory information included in the data for accessory detection.

With the series of steps, the detection processing of the accessory 200 ends.

In a case where the attachment of the accessory 200 is detected, the camera microcomputer 34 implements an imaging control in consideration of the information on the attached accessory 200. That is, since the focal length, an F-number, and the like are changed due to the attachment of the accessory 200, the camera microcomputer 34 implements the imaging control such as automatic exposure (AE) and auto focus (AF) in consideration of these pieces of information.

Further, in the case where the attachment of the accessory 200 is detected, the camera microcomputer 34 displays the information on the attached accessory 200 on the display unit 26 as necessary.

<Detection Example>

Figure 19:
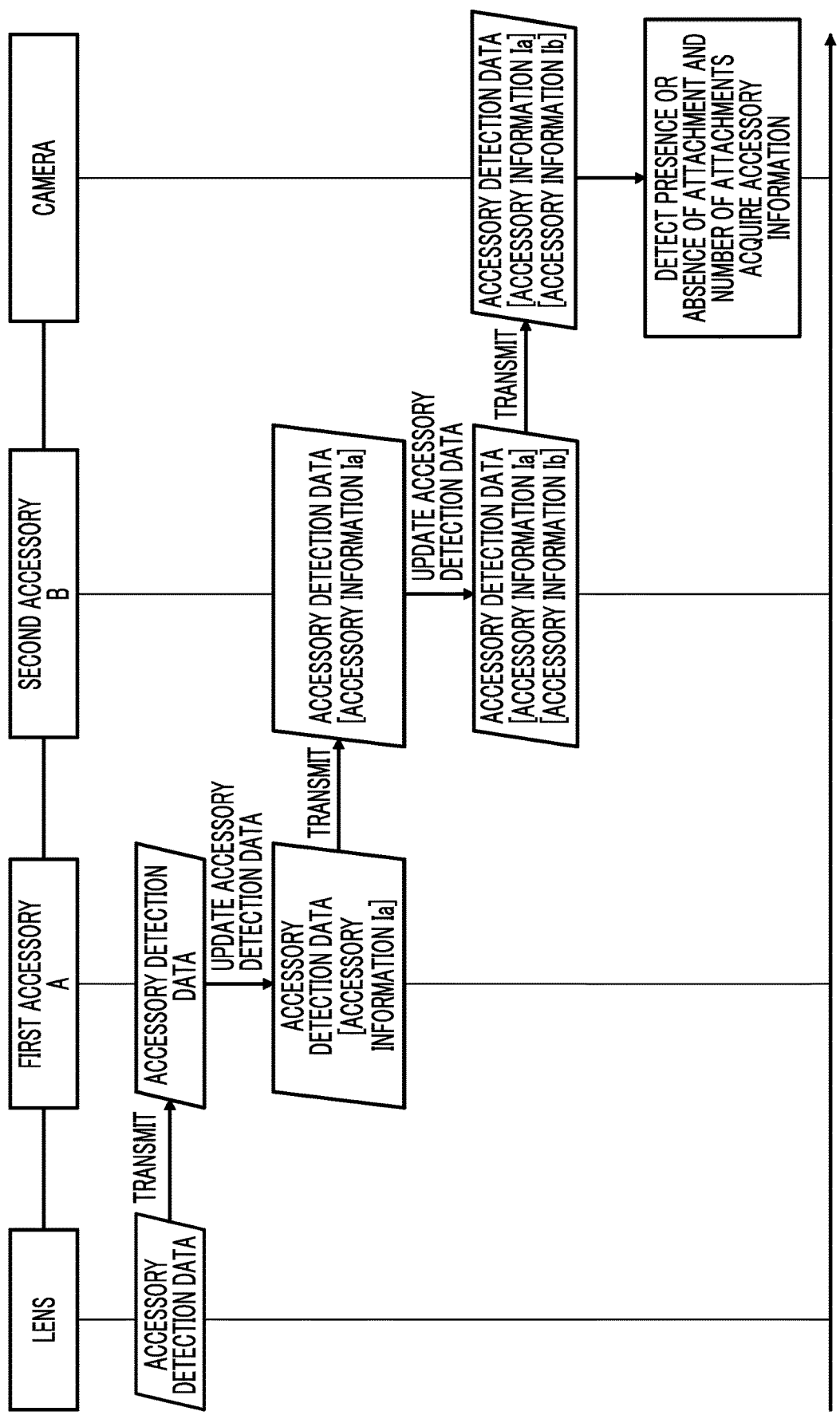
FIG. 19 is a diagram showing a flow of processing of data for accessory detection in a case where the accessory is attached.

FIG. 19 is a diagram showing a flow of the processing of the data for accessory detection in a case where the accessory is attached. FIG. 19 shows an example of a case where two accessories are attached. The two accessories are set as a first accessory A and a second accessory B. It is assumed that the first accessory A and the second accessory B are attached from the lens to the camera in an order of the first accessory A and the second accessory B.

First, data for accessory detection is transmitted from the lens microcomputer 114 to the camera.

The data for accessory detection transmitted from the lens microcomputer 114 is received by the accessory microcomputer 210 of the first accessory A. The accessory microcomputer 210 of the first accessory A adds own accessory information Ia to the received data for accessory detection to update the data for accessory detection. The updated data for accessory detection is transmitted to the camera.

Next, the data for accessory detection transmitted from the accessory microcomputer 210 of the first accessory A is received by the accessory microcomputer 210 of the second accessory B. The accessory microcomputer 210 of the second accessory B adds own accessory information Ib to the received data for accessory detection to update the data for accessory detection. As a result, the data for accessory detection includes the accessory information Ia of the first accessory A and the accessory information Ib of the second accessory B. The accessory microcomputer 210 of the second accessory B transmits the updated data for accessory detection to the camera.

Next, the data for accessory detection transmitted from the accessory microcomputer 210 of the second accessory B is received by the camera microcomputer 34 of the camera. The camera microcomputer 34 detects the presence or absence of the attachment of the accessory and the number of attachments of the accessory based on the received data for accessory detection, and acquires the information on the attached accessory.

In this manner, in the camera system 1 of the embodiment, the data for accessory detection is transmitted from the lens 100 to the camera 10, and the information on the accessory 200 is added in a process of relaying the data for accessory detection by the intermediate accessory 200. Accordingly, it is possible to simply and quickly detect the presence or absence of the attachment of the accessory 200 and the number of attachments of the accessory 200. Further, in the case where the accessory 200 is attached, it is possible to simply acquire the information on the accessory.

<<Switching of Communication Mode>>

In a case where the detection processing of the accessory 200 ends, the communication mode of each accessory 200 is switched to the bypass mode. Accordingly, the direct communication between the lens 100 and the camera 10 is possible without passing through the accessory microcomputer 210 even in the case where the accessory 200 is attached.

In the case where the data for accessory detection is transmitted, the accessory microcomputer 210 of each accessory 200 causes the communication path switching switch 232 to conduct the bypass signal line 230 to turn on the bypass mechanism. Accordingly, the communication mode of the accessory 200 is switched to the bypass mode, and thus the direct communication between the camera 10 and the lens 100 is possible without passing through the accessory microcomputer 210.

Hereinafter, the communication through the twelfth contact (=communication by sub-signal line) is used for transmitting operation information of the lens 100. The lens microcomputer 114 transmits the operation information of the lens 100 to the camera 10 by the unidirectional single-line serial communication. For example, information indicating that the specific function of the lens 100 is in operation such as information indicating that the focus motor is in operation is transmitted.

In this manner, it is possible to effectively use the contact (twelfth contact) and the signal line (sub-signal line) which are used for the accessory detection by switching the communication mode of the accessory 200.

<<Communication Setting>>

As described above, in the case where the lens microcomputer 114 is activated, the detection processing of the accessory 200 is implemented. The detection processing of the accessory 200 is performed by transmitting and receiving the data for accessory detection between the lens 100 and the camera 10 while the data for accessory detection is relayed by the accessory 200. An initial setting of the communication is performed in parallel with the detection processing of the accessory 200. Specifically, various settings for performing the three-line serial communication between the camera 10 and the lens 100 are performed. The communication setting is sequentially implemented, and the communication setting of the lens-side is performed and then the communication setting of the camera-side is performed. More specifically, in a case where a certain period of time (for example, 2.5 ms) elapses after the determination of the presence or absence of the compatibility, the communication setting of the lens-side is performed. In a case where a certain period of time (for example, 2.5 ms) further elapses, the communication setting of the camera-side is performed.

It is possible to speed up the activation by performing the initial setting of the communication in parallel with the detection processing of the accessory 200.

<<Acquisition of Lens Information>>

In a case where the setting of the three-line serial communication is completed, acquisition processing of lens information is performed by the three-line serial communication.

Here, the lens information refers to information indicating a specification of the lens 100. The lens information includes, for example, lens model data, lens characteristic data, lens characteristic correction data, and the like. The lens model data includes a lens model name, a focal length, a maximum F-number, a maker name, and the like. The lens characteristic data includes brightness shading data, color shading data, distortion data, aberration data, and the like. The lens characteristic correction data includes brightness shading correction data, color shading correction data, distortion correction data, aberration correction data, and the like. The lens information is stored in the ROM of the lens microcomputer 114.

The acquisition processing of the lens information is performed by the following procedure. First, the camera microcomputer 34 transmits a transmission request of the lens information to the lens microcomputer 114. The lens microcomputer 114 transmits the lens information to the camera microcomputer 34 in response to the transmission request. Accordingly, the lens information is acquired.

The camera microcomputer 34 implements the imaging control of AE, AF, and the like based on the acquired lens information. Further, the camera microcomputer 34 displays the information on the attached lens 100 on the display unit 26 as necessary.

<<Lens Drive>>

In a case where the communication is established between the camera microcomputer 34 and the lens microcomputer 114, the lens 100 is at a standby state. Hereinafter, the operation is possible in response to the instruction from the camera 10.

The lens microcomputer 114 communicates with the camera microcomputer 34 using the contacts for the three-line serial communication to receive an instruction of the drive from the camera microcomputer 34. The lens microcomputer 114 controls the lens drive unit 110 in response to the received instruction to operate the lens 100.

In this case, the lens drive unit 110 operates by receiving the supplying of the power from the camera 10. The plurality of pieces of lens-drive power are supplied through the plurality of power contacts (second contact CC2 to fourth contact CC4 on camera-side and second contact LC2 to fourth contact LC4 on lens-side). Each of the pieces of lens-drive power LV1, LV2, and LV3 has different voltage and is supplied to the corresponding drive unit. For example, in the lens 100 provided with the focus drive unit 110A and the stop drive unit 110C, the first lens-drive power LV1 (+5 V) having the lowest voltage is supplied to the stop drive unit 110C. Further, the third lens-drive power LV3 (+10 V) having the highest voltage is supplied to the focus drive unit 110A.

In this manner, since the power having the voltage corresponding to each drive unit is supplied from the camera-side, there is no need to generate the power on the lens side and thus it is possible to simplify the configuration of the lens 100. Further, since noise countermeasure is also unnecessary, it is possible to further simplify the configuration of the lens 100.

Furthermore, it is possible to efficiently supply the pieces of power to the lens by supplying the pieces of power to the lens through the plurality of power contacts. For example, in a case where large power is required on the lens side, a loss in a contact portion becomes large in a case where the power is supplied from one power contact. However, it is possible to reduce the loss in the contact portion by employing the configuration of supplying the pieces of power to the lens through the plurality of power contacts and thus to efficiently supply the pieces of power. That is, it is possible to obtain a large contact area by employing the configuration of supplying the pieces of power to the lens through the plurality of power contacts and thus to efficiently supply the pieces of power due to the reduction of the loss.

In the camera system 1 of the embodiment, the contacts for the system power can be removed whereas the number of the power contacts increases. Therefore, it is also possible to suppress the increase in the number of contacts.

<<Individual on and Off of Lens-Drive Power>>

As described above, the plurality of pieces of lens-drive power having different voltages are supplied from the camera 10 to the lens 100.

However, not all of the pieces of lens-drive power are always used depending on the lens 100, and there is a case where only a part of the pieces of lens-drive power is used. For example, in a case where each drive unit operates at the same operation voltage or the like, pieces of lens-drive power having operation voltages other than the operation voltage are not used.

The supplying of the pieces of lens-drive power having the voltages unused on the lens side is stopped. Accordingly, it is possible to achieve power saving.

Which voltage lens-drive power is required is different for each lens. The camera microcomputer 34 discriminates the lens-drive power having the required voltage based on the lens information acquired from the lens 100 to supply only the lens-drive power having the required voltage from the power supply unit 42 to the lens. Specifically, the processing is performed as follows.

First, lens-drive power having a voltage required for the attached lens 100 is discriminated based on the lens information acquired from the lens 100. The ROM provided in the camera microcomputer 34 stores a determination table, and the camera microcomputer 34 discriminates the lens-drive power having the voltage required for the attached lens 100 with reference to the determination table. Information on the lens-drive power having the required voltage is associated with each lens (lens model name) constituting the camera system 1 and is recorded in the determination table.

Next, the camera microcomputer 34 controls the lens-drive power switch unit 44 based on a discrimination result to stop the supplying of the lens-drive power unused on the lens side. For example, in a case where the second lens-drive power LV2 having the intermediate voltage is unused on the lens side, the supplying of the second lens-drive power LV2 is stopped. Accordingly, only required lens-drive power is supplied.

Since the first lens-drive power LV1 having the lowest voltage is used for the system power of the lens microcomputer 114, the first lens-drive power LV1 having the lowest voltage is lens-drive power that is always used. Therefore, the power whose supplying is actually stopped is the second lens-drive power LV2 having the intermediate voltage or the third lens-drive power LV3 having the highest voltage.

In this manner, it is possible to efficiently supply the power and thus to achieve power saving by stopping the supplying of the lens-drive power unused on the lens side.

The lens-drive power having the required voltage is discriminated with reference to the determination table provided on the camera-side in this example, but the lens information transmitted from the lens may include the lens-drive power having the required voltage.

<<Detachment of Lens and Accessory>>
<Detachment of Lens>

In a case where the lens 100 is detached from the camera 10, the lens 100 is rotated in a direction opposite to the direction in which the lens 100 is attached to detach the lens 100 from the camera 10. In this case, it is possible to safely detach the lens 100 by disposing the power contacts of the lens 100 (second contact LC2, third contact LC3, and fourth contact LC4) on the rear side in the rotation direction (front side with respect to rotation direction R at the time of attaching lens 100) with respect to the ground contacts of the lens 100 (fifth contact LC5 and sixth contact LC6).

That is, the power contacts of the lens 100 touch the ground contacts of the camera 10 immediately after the lens 100 is rotated in the detached direction by disposing the power contacts adjacent to the rear side of the ground contacts with respect to the rotation direction at the time of detaching the lens 100. That is, the power contacts of the lens 100 touch the ground contacts of the camera 10 without touching other contacts. Accordingly, it is possible to appropriately process charges remaining in the power contacts and the lines of the power contacts and thus to safely detach the lens 100.

Further, it is possible to appropriately process charges remaining on the lens side even in a case where the power contacts touch each other by disposing the plurality of power contacts in the descending order of the voltage with respect to the rotation direction at the time of detaching the lens 100 (ascending order with respect to rotation direction R at the time of attaching lens 100). That is, in the case where the lens 100 is rotated to be detached, the power contacts on the lens side always touch the power contacts on the camera-side that supply the pieces of power having the voltages higher than the power contacts on the lens side or the ground contacts. Therefore, even in the case where the charges remain in the power contacts on the lens side and in the lines thereof, it is possible to appropriately process the charges. Accordingly, it is possible to safely detach the lens 100.

<Case where Accessory is Detached>

In a case where the accessory 200 is detached from the camera 10, the accessory 200 is rotated and detached in a direction opposite to the direction in which the accessory 200 is attached. Similarly, in a case where the lens 100 is detached from the accessory 200, the lens 100 is rotated and detached in a direction opposite to the direction in which the lens 100 is attached. The same effect as the lens 100 is obtained also in the case where the accessory 200 is detached.

Second Embodiment

In a camera system of this embodiment, the attachment appropriateness of the accessory is determined based on the acquired information on the accessory.

A method of detecting the presence or absence of the attachment of the accessory and the number of attachments of the accessory and a method of acquiring the information on the attached accessory in the case where the accessory is attached are the same as the first embodiment described above. Therefore, only a method of determining the attachment appropriateness of the accessory will be described herein.

<<Determination of Attachment Appropriateness Based on Number of Attachments>>

As described above, in the case where the camera 10 receives the data for accessory detection, it is possible to detect the presence or absence of the attachment of the accessory and the number of attachments of the accessory from the received data for accessory detection.

The camera microcomputer 34 acquires information on an upper limit of the number of attachments of the accessory in advance and compares the presence or absence of the attachment of the accessory and the number of attachments of the accessory with the upper limit of the number of attachments of the accessory to determine the attachment appropriateness. Specifically, in a case where it is determined whether the detected number of attachments exceeds the upper limit of the number of attachments thereof set in advance and the detected number of attachments exceeds the upper limit of the number of attachments thereof, it is determined that there is an inappropriate attachment.

<<Determination of Attachment Appropriateness Based on Product Regularity>>

The camera microcomputer 34 determines validity of the attached accessory 200 based on the acquired information on the accessory. In this case, a product ID is included in the accessory information to be added to the data for accessory detection by each accessory 200. The camera microcomputer 34 extracts information on the product ID from the accessory information to determine whether the attached accessory 200 is a regular product. In a case where the attached accessory 200 is not a regular product, it is determined that there is the inappropriate attachment.

<<Determination of Attachment Appropriateness Based on Attachment Order>>

As described above, in the case where the camera 10 receives the data for accessory detection, it is possible to acquire the information on the attachment order of the accessory 200 from the received data for accessory detection.

The camera microcomputer 34 determines the attachment appropriateness of the accessory 200 based on the acquired information on the attachment order of the accessory 200. In this case, the accessory attachment position information is included in the accessory information to be added to the data for accessory detection by each accessory 200.

As described above, the accessory attachment position information is the information on the valid attachment position of the accessory. The camera microcomputer 34 acquires the accessory attachment position information from the acquired accessory information to determine whether each accessory 200 is attached at a designated attachment position. For example, in a case where right after the lens is designated as a valid attachment position, it is determined whether the accessory 200 is attached right after the lens 100. The determination is performed for each accessory to determine whether all the accessories 200 are attached at appropriate positions. In a case where even any one of the accessories 200 is attached at an inappropriate position, it is determined that there is the inappropriate attachment.

<<Determination Example>>

Figure 20:
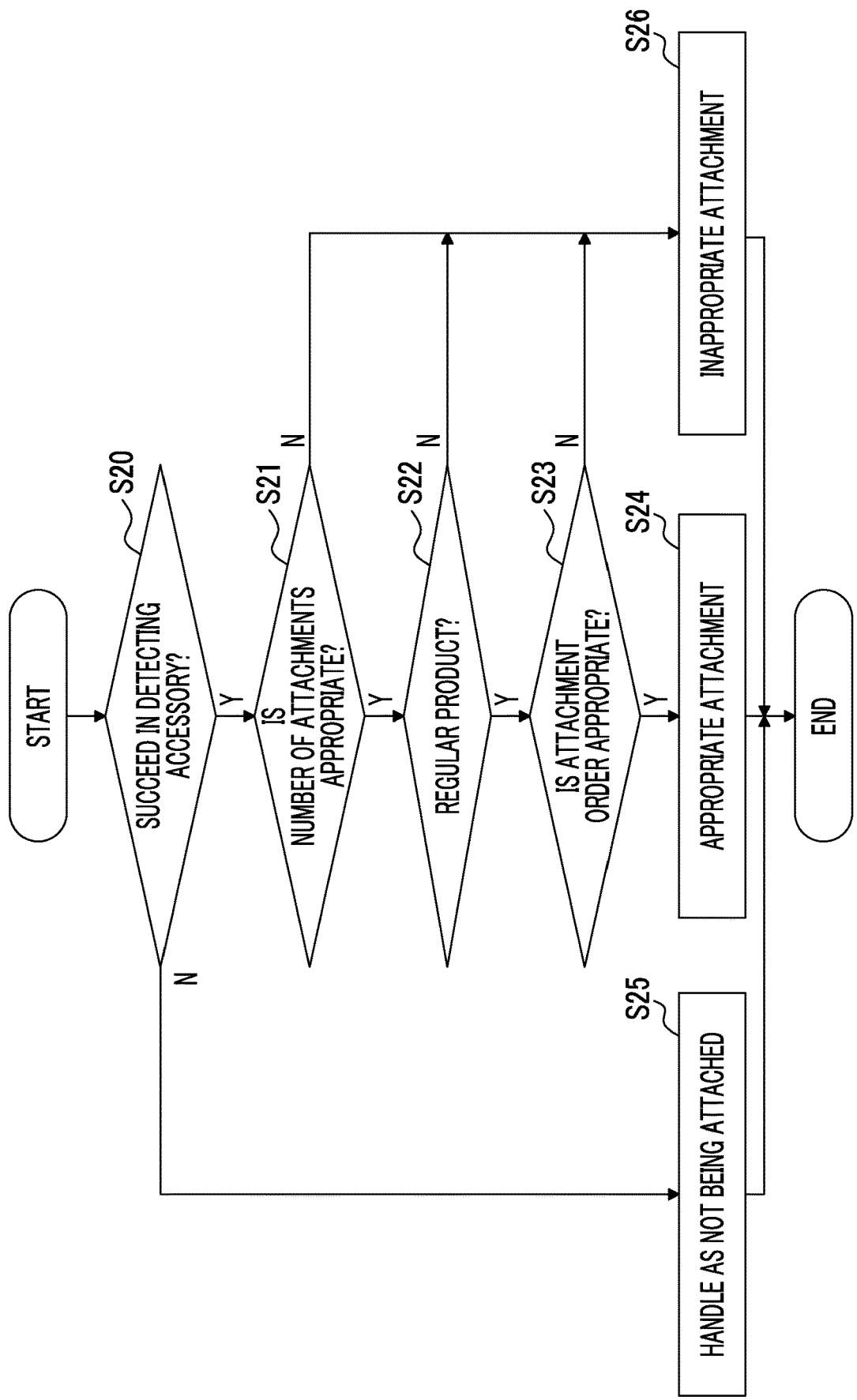
FIG. 20 is a flowchart showing an example of a procedure of determining attachment appropriateness of the accessory.

FIG. 20 is a flowchart showing an example of a procedure of determining the attachment appropriateness of the accessory.

First, the camera microcomputer 34 determines whether the accessory is detected (step S20). That is, it is determined whether the detection processing of the accessory 200 succeeds. Whether the accessory detection succeeds is determined depending on whether the data for accessory detection can be acquired. For example, in a case where the data for accessory detection cannot be acquired within a certain period of time from the activation of the lens microcomputer 114, the camera microcomputer 34 determines that the detection processing of the accessory 200 fails. In a case where there is a communication error or the like, there are cases where the data for accessory detection cannot be acquired within a certain period of time. Such a case, the camera microcomputer 34 determines that the detection processing of the accessory 200 fails.

In a case where the detection processing of the accessory 200 fails, the camera microcomputer 34 recognizes that the accessory 200 is not attached (step S25).

On the other hand, in a case where the detection processing of the accessory 200 succeeds, the camera microcomputer 34 determines the appropriateness of the number of attachments (step S21). That is, it is determined whether the detected number of attachments of the accessory 200 exceeds the upper limit. In a case where it is determined that the number of attachments is inappropriate, the camera microcomputer 34 recognizes that there is the inappropriate attachment of the accessory 200 (step S26).

On the other hand, in a case where it is determined that the number of attachments of the accessory 200 is appropriate, then the camera microcomputer 34 determines the regularity of the accessory 200 (step S22). That is, it is determined whether each attached accessory 200 is the regular product. In a case where it is determined that the attached accessory 200 is not the regular product, the camera microcomputer 34 recognizes that there is the inappropriate attachment of the accessory 200 (step S26).

On the other hand, in a case where it is determined that the attached accessory 200 is the regular product, then the camera microcomputer 34 determines the appropriateness of the attachment order (step S23). That is, it is determined whether the order of the attached accessories 200 is a correct attachment order. In a case where it is determined that the order of the attached accessories 200 is an incorrect attachment order, the camera microcomputer 34 recognizes that there is the inappropriate attachment of the accessory 200 (step S26).

On the other hand, in a case where it is determined that the order of the attached accessories 200 is the correct attachment order, the camera microcomputer 34 recognizes that the accessory 200 is appropriately attached (step S24).

In this manner, the attachment appropriateness of the attached accessory 200 is determined from viewpoints of the number of attachments, the regularity, and the attachment order.

<<Processing after Determination>>

<Notification of Warning>

In a case where it is determined that there is the inappropriate attachment as a determination result of the attachment appropriateness of the accessory 200, the camera microcomputer 34 performs processing of notifying a warning. This processing is performed by displaying a predetermined message on the display unit 26. In this case, the display unit 26 functions as a notification unit.

In addition, in a case where the camera 10 comprises sound notification means such as a speaker or a buzzer, it is possible to give the notification of the warning by sound.

Accordingly, it is possible to prompt the user to use the appropriate accessory 200.

It is preferable to give the notification of the warning in the same manner also in the case where the detection processing of the accessory 200 fails due to the communication error or the like.

<Stop of Control>

In the case where it is determined that there is the inappropriate attachment as a determination result of the attachment appropriateness of the accessory 200, the camera microcomputer 34 stops the control with respect to the lens 100.

In the case where the accessory 200 is not appropriately attached, an appropriate imaging control may not be implemented. In order to prevent such a situation in advance, in a case where the inappropriate attachment of the accessory 200 becomes clear, the control with respect to the lens 100 is stopped. That is, the imaging is impossible.

Accordingly, it is possible to prevent normal imaging from being impossible in advance.

The control with respect to the lens 100 may not be stopped but may be changed under a certain condition. For example, the control with respect to the lens 100 may be changed so as to operate manually.

Third Embodiment

[Configuration of Camera System]

In the lens-interchangeable camera system, various new and old cameras and lenses are used in combination. Therefore, there are cases where the accessory 200 cannot be detected depending on a combination. For example, in a case where the lens-side is compatible but the camera-side is incompatible, even in a case where the lens-side transmits the data for accessory detection, the camera-side cannot receive the data for accessory detection. Alternatively, even in a case where the camera-side can receive the data for accessory detection, it is impossible to detect the accessory 200 using the received data.

Therefore, it is preferable that it is previously determined whether counterparts of both the camera 10 and the lens 100 support a detection function (hereinafter referred to as accessory detection function) of the accessory 200 and the detection processing of the accessory 200 is implemented only in a case where both the camera 10 and the lens 100 support the detection function of the accessory 200.

The camera system of the embodiment comprises a function of determining whether the counterpart supports the accessory detection function, that is, whether there is the compatibility. Hereinafter, a configuration related to the function of determining the presence or absence of the compatibility will be described.

<<Configuration Related to Function of Determining Presence or Absence of Compatibility>>

Figure 21:
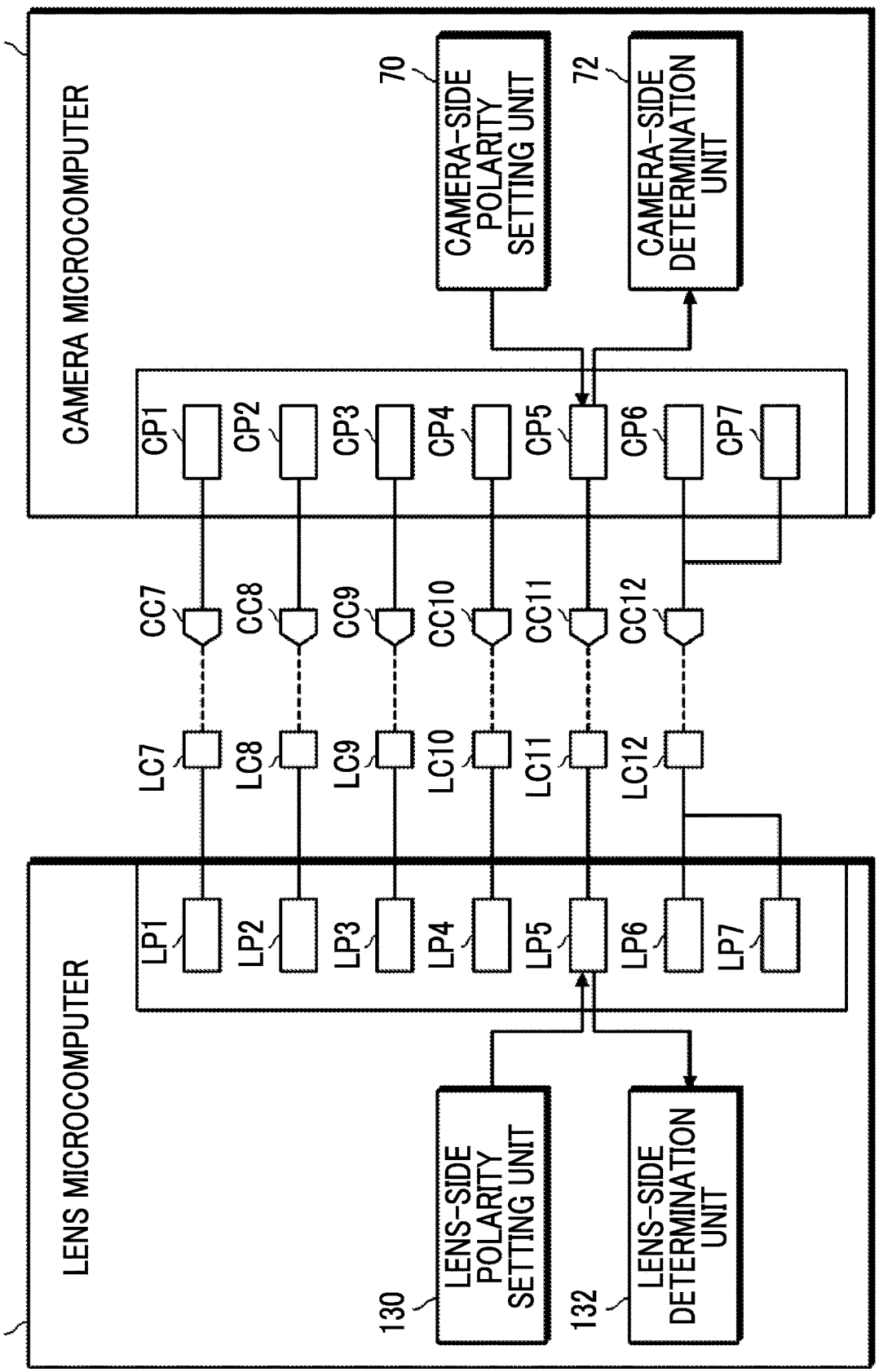
FIG. 21 is a block diagram of a function related to compatibility determination provided in the camera and the lens.

FIG. 21 is a block diagram of the function related to compatibility determination provided in the camera and the lens.

In the camera system of the embodiment, the polarities of the specific contacts are detected to determine whether both the camera 10 and the lens 100 support the accessory detection function. That is, it is determined that both the camera 10 and the lens 100 support the accessory detection function in a case where the polarities of the specific contacts are at a first polarity, and it is determined that both the camera 10 and the lens 100 do not support the accessory detection function in a case where the polarities of the specific contacts are at the second polarity. Here, the corresponding contacts are composed of contacts that operate as follows. That is, the operation is performed such that the contacts have the first polarity only in a case where both the camera 10 and the lens 100 set the polarities of the corresponding contacts to the first polarity and the contacts have the second polarity in a case where at least one of the camera 10 or the lens 100 sets the polarity of the corresponding contact to the second polarity. Such contacts can be realized by contacts in which an open drain output or an open collector output is possible. The camera 10 sets the polarity of the corresponding contact to the first polarity in a case where the camera 10 itself supports the accessory detection function, and the camera 10 sets the polarity of the corresponding contact to the second polarity in a case where the camera 10 does not support the accessory detection function. The same is with the lens 100, and the lens 100 sets the polarity of the corresponding contact to the first polarity in a case where the lens 100 supports the accessory detection function, and the lens 100 also sets the polarity of the corresponding contact to the second polarity in a case where the lens 100 does not support the accessory detection function. Accordingly, it is possible to determine whether both the camera 10 and the lens 100 support the accessory detection function from the polarities of the corresponding contacts.

In the camera system of the embodiment, the presence or absence of the compatibility is determined using one contact among the three contacts for performing the three-line serial communication. Specifically, the presence or absence of the compatibility is determined using the eleventh contacts CC11 and LC11. Hereinafter, the function will be described by being divided into the camera-side and the lens-side.

<Compatibility Determination Function Provided on Camera Side>

The camera 10 determines the presence or absence of the compatibility based on the polarity of the eleventh contact CC11. That is, the camera 10 determines whether the counterpart lens 100 supports the accessory detection function.

The eleventh contact CC11 is one of the contacts to be used in the case where the three-line serial communication is performed and is connected to the fifth communication port CP5 (MISO port) of the camera microcomputer 34. The fifth communication port CP5 is composed of a port in which the open drain output is possible.

The camera microcomputer 34 has a function of setting the polarity of the fifth communication port CP5 to the HIGH level which is the first polarity or the LOW level which is the second polarity. This function is provided by a camera-side polarity setting unit 70. The camera microcomputer 34 executes a predetermined program to function as the camera-side polarity setting unit 70. In a case where the camera 10 supports the accessory detection function, the camera-side polarity setting unit 70 sets the polarity of the fifth communication port CP5 to the HIGH level which is the first polarity. On the other hand, in a case where the camera 10 does not support the accessory detection function, the camera-side polarity setting unit 70 sets the polarity of the fifth communication port CP5 to the LOW level which is the second polarity.

The fifth communication port CP5 of the camera microcomputer 34 is set to the HIGH level (first polarity) to set the eleventh contact CC11 to the HIGH level (first polarity). Further, the fifth communication port CP5 of the camera microcomputer 34 is set to the LOW level (second polarity) to set the eleventh contact CC11 to the LOW level (second polarity).

Further, the camera microcomputer 34 has a function of detecting the polarity of the fifth communication port CP5 and of determining whether the lens 100 attached to the camera 10 supports the accessory detection function based on the detected polarity. This function is provided by a camera-side determination unit 72. The camera microcomputer 34 executes a predetermined program to function as the camera-side determination unit 72. The camera-side determination unit 72 detects the polarity of the fifth communication port CP5 and determines that the lens 100 attached to the camera 10 supports the accessory detection function only in a case where the detected polarity is at the HIGH level (first polarity).

The eleventh contact CC11 is set to the HIGH level (first polarity) to set the fifth communication port CP5 of the camera microcomputer 34 to the HIGH level (first polarity). Further, the eleventh contact CC11 is set to the LOW level (second polarity) to set the fifth communication port CP5 of the camera microcomputer 34 to the LOW level (second polarity).

<Compatibility Determination Function Provided on Lens Side>

The lens 100 determines the presence or absence of the compatibility based on the polarity of the eleventh contact LC11. That is, the lens 100 determines whether the counterpart camera 10 supports the accessory detection function.

The eleventh contact LC11 is one of the contacts to be used in the case where the three-line serial communication is performed and is connected to the fifth communication port LP5 (MISO port) of the lens microcomputer 114. The fifth communication port LP5 is composed of a port in which the open drain output is possible.

The lens microcomputer 114 has a function of setting the polarity of the fifth communication port LP5 to the HIGH level which is the first polarity or the LOW level which is the second polarity. This function is provided by a lens-side polarity setting unit 130. The lens microcomputer 114 executes a predetermined program to function as the lens-side polarity setting unit 130. In a case where the lens 100 supports the accessory detection function, the lens-side polarity setting unit 130 sets the polarity of the fifth communication port LP5 to the HIGH level which is the first polarity. On the other hand, in a case where the lens 100 does not support the accessory detection function, the lens-side polarity setting unit 130 sets the polarity of the fifth communication port LP5 to the LOW level which is the second polarity.

The fifth communication port LP5 of the lens microcomputer 114 is set to the HIGH level (first polarity) to set the eleventh contact LC11 to the HIGH level (first polarity). Further, the fifth communication port LP5 of the lens microcomputer 114 is set to the LOW level (second polarity) to set the eleventh contact LC11 to the LOW level (second polarity).

Further, the lens microcomputer 114 has a function of detecting the polarity of the fifth communication port LP5 and of determining whether the camera 10 which is an attachment destination supports the accessory detection function based on the detected polarity. This function is provided by a lens-side determination unit 132. The lens microcomputer 114 executes a predetermined program to function as the lens-side determination unit 132. The lens-side determination unit 132 detects the polarity of the fifth communication port LP5 and determines that the camera 10 which is the attachment destination supports the accessory detection function only in a case where the detected polarity is at the HIGH level (first polarity).

The eleventh contact LC11 is set to the HIGH level (first polarity) to set the fifth communication port LP5 of the lens microcomputer 114 to the HIGH level (first polarity). Further, the eleventh contact LC11 is set to the LOW level (second polarity) to set the fifth communication port LP5 of the lens microcomputer 114 to the LOW level (second polarity).

<Polarity Setting>

In the case where the lens 100 is attached to the camera 10, the eleventh contact CC11 on the camera-side is connected to the eleventh contact LC11 on the lens side. As a result, the fifth communication port CP5 of the camera microcomputer 34 is connected to the fifth communication port LP5 of the lens microcomputer 114.

Here, as described above, the open drain output is possible in the fifth communication port CP5 of the camera microcomputer 34 and the fifth communication port LP5 of the lens microcomputer 114. In a case where the fifth communication port CP5 and the fifth communication port LP5 are respectively set to the HIGH level (first polarity) or the LOW level (second polarity), the polarities thereof are set as follows. That is, the polarities of both the fifth communication port CP5 and the fifth communication port LP5 are at the HIGH level (first polarity) only in a case where both the fifth communication port CP5 and the fifth communication port LP5 are set to the HIGH level (first polarity). The polarities of both the fifth communication port CP5 and the fifth communication port LP5 are at the LOW level (second polarity) in a case where at least one of the fifth communication port CP5 or the fifth communication port LP5 is set to the LOW level (second polarity). Therefore, in a case where the polarities of the fifth communication port CP5 of the camera microcomputer 34 and the fifth communication port LP5 of the lens microcomputer 114 after the output setting are detected, it is possible to determine whether both the camera 10 and the lens 100 support the accessory detection function, that is, whether there is the compatibility.

The camera-side determination unit 72 detects the polarity of the fifth communication port CP5 (=polarity of eleventh contact CC11) after the output setting and determines that the attached lens 100 supports the accessory detection function only in a case where the detected polarity is at the HIGH level (first polarity). That is, the camera-side determination unit 72 determines that there is the lens 100 having the compatibility.

Similarly, the lens-side determination unit 132 detects the polarity of the fifth communication port LP5 (=polarity of eleventh contact LC11) after the output setting and determines that the camera 10 which is the attachment destination supports the accessory detection function only in a case where the detected polarity is at the HIGH level (first polarity). That is, the lens-side determination unit 132 determines that there is the camera 10 having the compatibility.

FIG. 22 is a table showing a relationship between output settings of eleventh contacts of the camera and the lens according to a support situation to an accessory detection function and detected polarities.

As shown in FIG. 22, in a case where the camera 10 and the lens 100 support the accessory detection function, the output settings of the eleventh contacts CC11 and LC11 of the camera 10 and the lens 100 are set to the HIGH level (first polarity). On the other hand, in a case where the camera 10 and the lens 100 do not support the accessory detection function, the output settings of the eleventh contacts CC11 and LC11 of the camera 10 and the lens 100 are set to the LOW level (second polarity).

Further, both of the eleventh contacts CC11 and LC11 after the output settings are at the HIGH level (first polarity) only in a case where both of the eleventh contacts CC11 and LC11 after the output settings are set to the HIGH level (first polarity). Both of the eleventh contacts CC11 and LC11 after the output settings are at the LOW level (second polarity) in a case where at least one of the eleventh contact CC11 or the eleventh contact LC11 after the output settings is set to the LOW level (second polarity).

In this manner, in the camera system 1 of the embodiment, in a case where the polarities of the eleventh contacts CC11 and LC11 are detected in both the camera 10 and the lens 100, it is possible to determine whether the counterpart supports the accessory detection function in both the camera 10 and the lens 100.

[Action of Camera System]

The camera system of the embodiment differs from the camera system of the first embodiment described above in that the function of determining the presence or absence of the compatibility is included. Therefore, only the action of the function of determining the presence or absence of the compatibility will be described herein.

In the camera system of the embodiment, processing of determining the presence or absence of the compatibility is performed before the detection processing of the accessory 200 is implemented. The processing of determining the presence or absence of the compatibility is implemented by the following procedure.

<<Polarity Setting on Camera Side>>

The camera microcomputer 34 functioning as the camera-side polarity setting unit 70 sets the polarity of the fifth communication port CP5 at a timing of starting the supplying of the lens-drive power to the lens 100.

Here, in a case where the camera 10 supports a lens information acquisition function, the camera microcomputer 34 sets the polarity of the fifth communication port CP5 to the HIGH level which is the first polarity. On the other hand, in a case where the camera 10 does not support the lens information acquisition function, the camera microcomputer 34 sets the polarity of the fifth communication port CP5 to the LOW level which is the second polarity.

The polarity of the fifth communication port CP5 is set to the HIGH level (first polarity) to set the eleventh contact CC11 to the HIGH level (first polarity). Further, the polarity of the fifth communication port CP5 is set to the LOW level (second polarity) to set the eleventh contact CC11 to the LOW level (second polarity).

<<Polarity Setting on Lens Side>>

The lens microcomputer 114 functioning as the lens-side polarity setting unit 130 sets the polarity of the fifth communication port LP5 at a timing of the activation thereof. As described above, since the lens microcomputer 114 is activated by normally supplying the power, the polarity of the fifth communication port LP5 is set at the timing of the activation thereof. More specifically, the polarity of the fifth communication port LP5 is set after the activation thereof and before notifying the camera side of the activation thereof.

Here, in a case where the lens 100 supports the lens information acquisition function, the lens microcomputer 114 sets the polarity of the fifth communication port LP5 to the HIGH level which is the first polarity. On the other hand, in a case where the lens 100 does not support the lens information acquisition function, the lens microcomputer 114 sets the polarity of the fifth communication port LP5 to the LOW level which is the second polarity.

The polarity of the fifth communication port LP5 is set to the HIGH level (first polarity) to set the eleventh contact LC11 to the HIGH level (first polarity). Further, the polarity of the fifth communication port LP5 is set to the LOW level (second polarity) to set the eleventh contact LC11 to the LOW level (second polarity).

<<Compatibility Determination on Camera Side>>

The camera microcomputer 34 functioning as the camera-side determination unit 72 detects the polarity of the fifth communication port CP5 (eleventh contact CC11) at a timing of detecting that the lens microcomputer 114 is activated to determine the presence or absence of the compatibility. Specifically, the camera microcomputer 34 detects the polarity of the fifth communication port CP5 at a timing of detecting that the first communication port CP1 is switched to the LOW level to determine the presence or absence of the compatibility.

As described above, the fifth communication port CP5 is at the HIGH level only in the case where the fifth communication ports CP5 and LP5 are set to the HIGH level in both the camera 10 and the lens 100. The case where the fifth communication ports CP5 and LP5 are set to the HIGH level in both the camera 10 and the lens 100 refers to the case where both the camera 10 and the lens 100 support the lens information acquisition function. Accordingly, in the case where the polarity of the fifth communication port CP5 is at the HIGH level, the camera microcomputer 34 determines that the attached lens 100 supports the lens information acquisition function. On the other hand, in the case where the polarity of the fifth communication port CP5 is at the LOW level, the camera microcomputer 34 determines that there is no compatibility. The case where there is no compatibility refers to the case where the camera-side does not support the lens information acquisition function, the lens-side does not support the lens information acquisition function, or both the camera-side and the lens-side do not support the lens information acquisition function.

<<Compatibility Determination on Lens Side>>

The lens microcomputer 114 functioning as the lens-side determination unit 132 detects the polarity of the fifth communication port LP5 (eleventh contact LC11) at a timing of giving a notification of the activation of the lens microcomputer 114 to determine the presence or absence of the compatibility. Specifically, the lens microcomputer 114 detects the polarity of the fifth communication port LP5 at a timing of switching the first communication port LP1 to the LOW level to determine the presence or absence of the compatibility.

Similarly to the camera-side, the fifth communication port LP5 on the lens side is at the HIGH level only in the case where the fifth communication ports CP5 and LP5 are set to the HIGH level in both the camera 10 and the lens 100. As described above, the case where the fifth communication ports CP5 and LP5 are set to the HIGH level in both the camera 10 and the lens 100 refers to the case where both the camera 10 and the lens 100 support the lens information acquisition function. Accordingly, in the case where the polarity of the fifth communication port LP5 is at the HIGH level, the lens microcomputer 114 determines that the camera 10 which is the attachment destination supports the lens information acquisition function. On the other hand, in the case where the polarity of the fifth communication port LP5 is at the LOW level, the lens microcomputer 114 determines that there is no compatibility. The case where there is no compatibility refers to the case where the camera-side does not support the lens information acquisition function, the lens-side does not support the lens information acquisition function, or both the camera-side and the lens-side do not support the lens information acquisition function.

In this manner, it is possible to determine the presence or absence of the compatibility in both the camera 10 and the lens 100 by detecting the polarities of the fifth communication port CP5 (eleventh contact CC11) on the camera-side and the fifth communication port LP5 (eleventh contact LC11) on the lens side.

<<Determination Example>>

A case where the camera system 1 is composed of three cameras and three lenses is considered. The three cameras are set as a first camera, a second camera, and the third camera, and the three lenses are set as a first lens, a second lens, and a third lens. For the cameras, it is assumed that only the first camera supports the accessory detection function, and others do not support the accessory detection function. Further, for the lenses, it is assumed that only the first lens supports the accessory detection function, and others do not support the accessory detection function.

In this case, only in a case where the first camera and the first lens are combined, the polarities of the fifth communication ports CP5 and LP5 are at the HIGH level. In other combinations, that is, in the combinations of the first camera and the second lens, the first camera and the third lens, the second camera and the first lens, the second camera and the second lens, the second camera and the third lens, the third camera and the first lens, the third camera and the second lens, and the third camera and the third lens, the polarities of the fifth communication ports CP5 and LP5 are at the LOW level.

Therefore, in the case where the polarities of the fifth communication ports CP5 and LP5 are detected in both the camera and the lens, it is possible to determine the presence or absence of the compatibility in both the camera 10 and the lens 100. Specifically, in the case where the polarities of the fifth communication ports CP5 and LP5 are at the HIGH level in both the camera and the lens, it is possible to determine that both the camera and the lens support the accessory detection function. On the other hand, in the case where the polarities of the fifth communication ports CP5 and LP5 are at the LOW level in both the camera and the lens, it is possible to determine that at least any one of the fifth communication port CP5 or the fifth communication port LP5 does not support the accessory detection function. That is, it is possible to determine that there is no compatibility.

<<Processing after Determination of Presence or Absence of Compatibility>>

In the case where both the camera 10 and the lens 100 support the accessory detection function as a result of the determination of the presence or absence of the compatibility, the detection processing of the accessory 200 is implemented.

In the case where it is determined that there is no compatibility since at least any one of the camera 10 or the lens 100 does not support the accessory detection function, the detection processing of the accessory 200 is not implemented. In this case, for example, the information on the attached accessory 200 is acquired by the three-line serial communication.

As described above, the camera 10 can detect at least the presence or absence of the attachment of the accessory 200 by detecting the polarity of the twelfth contact A1C12.

In a case where the processing of determining the presence or absence of the compatibility ends, the camera 10 and the lens 100 perform the initial setting for performing the three-line serial communication. This processing is performed in parallel with the detection processing of the accessory 200 in the case where the detection processing of the accessory 200 is executed.

In this manner, according to the camera system of the embodiment, since the presence or absence of the compatibility can be detected, it is possible to appropriately implement the detection processing of the accessory.

Another Embodiment

[Acquisition of Lens Information]

The lens information is acquired from the lens 100 by the three-line serial communication in the embodiment described above, but the lens information also can be acquired by the following method. That is, in the case where the detection processing of the accessory is implemented, the data for accessory detection is transmitted from the lens by including the lens information in the data for accessory detection to be transmitted from the lens. Accordingly, it is also possible to acquire the lens information simultaneously with the accessory detection. In this case, accessory information of an intermediate accessory is sequentially added after the lens information.

[Detection of Number of Attachments of Accessory]

The number of pieces of accessory information included in the data for accessory detection is counted to detect the number of attached accessories in the embodiment described above, the method of detecting the number of attachments of the accessory is not limited thereto. In addition, for example, the information on the number of attachments thereof may be included in the data for accessory detection, and the number of attachments thereof may be added by one every time each accessory updates the data for accessory detection. Accordingly, it is possible to directly acquire the information on the number of attachments from the data for accessory detection.

[Handling in Case where Accessories Exceeding Upper Limit are Attached]

In a case where it is detected that the number of attachments of the accessory exceeds the upper limit in the process of relaying the data for accessory detection, a further accessory may transfer the data for accessory detection without adding the accessory information. Accordingly, it is possible to prevent a data length of the data for accessory detection from becoming unlimitedly long. In this case, the information on the number of attachments thereof may be included in the data for accessory detection, and the information on the number of attachments thereof may be updated (added by one) every time the accessory relays the data for accessory detection. Further, in this case, it is preferable that the further accessory exceeding the upper limit updates only the information on the number of attachments.

[Switching of Communication Mode of Accessory]

In the embodiment described above, in the case where the accessory transmits the data for accessory detection, the communication mode thereof is automatically switched to the bypass mode. However, the communication mode thereof may be switched in response to the instruction from the camera.

Further, the communication mode of the accessory may be switched according to the determination result of the attachment appropriateness of the accessory.

Figure 23:
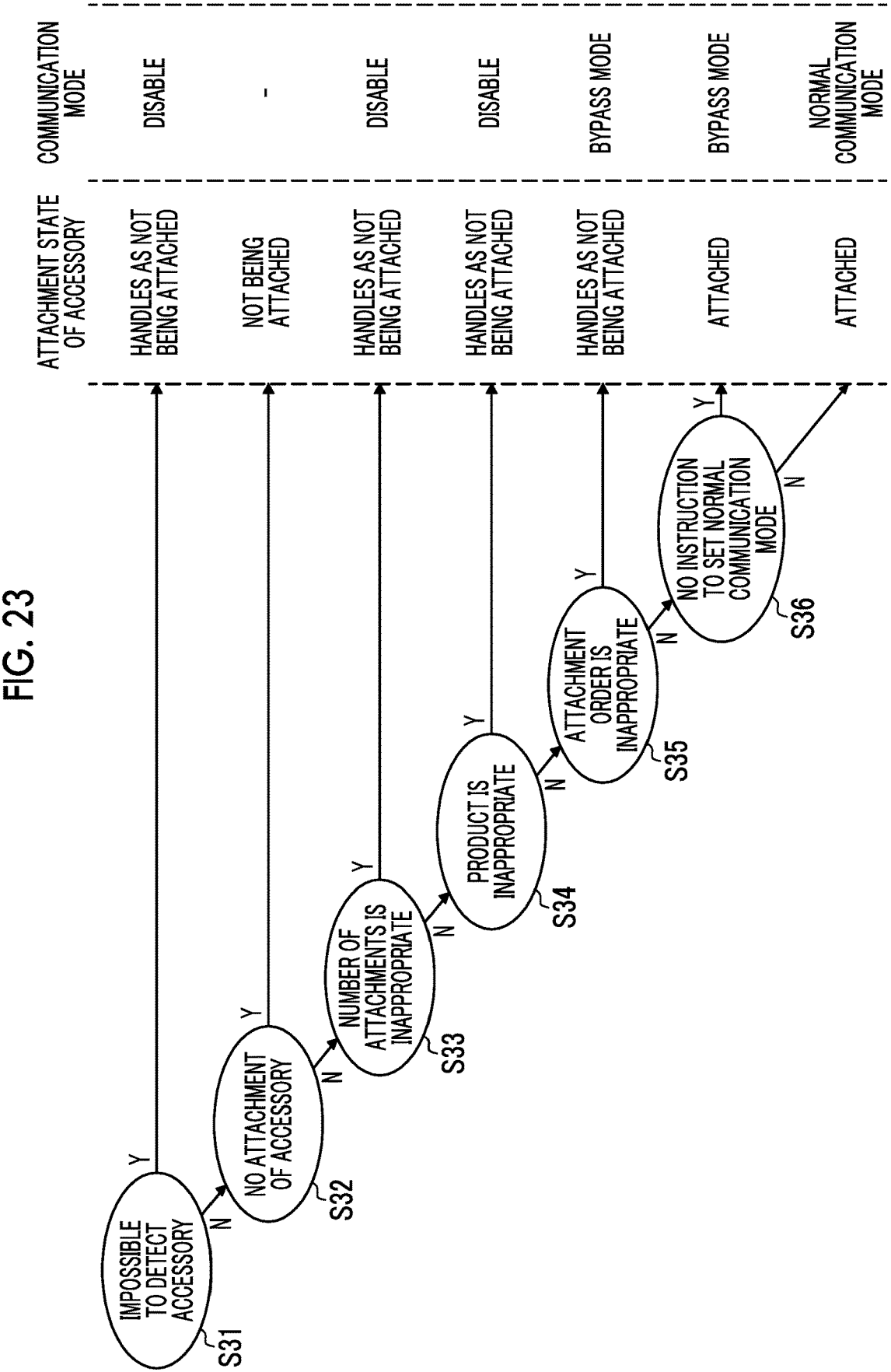
FIG. 23 is a flowchart showing an example of a procedure of switching a communication mode of the accessory according to a determination result of the attachment appropriateness of the accessory.

FIG. 23 is a flowchart showing an example of a procedure of switching the communication mode of the accessory according to the determination result of the attachment appropriateness of the accessory.

First, it is determined whether the detection processing of the accessory is possible (step S31). In the cases where the camera and/or the lens do not support the accessory detection function, the accessory does not comprise a communication function, the communication error occurs, and the like, the detection processing of the accessory is impossible. In this case, the camera microcomputer 34 handles the accessory as not being attached. The communication through the twelfth contact (communication by sub-signal line) is set to be disabled.

On the other hand, in a case where the detection processing of the accessory is possible and the detection processing of the accessory is actually performed, a setting of the communication mode is performed by the following procedure.

First, the presence or absence of the attachment of the accessory is determined (step S32). In a case where there is no attachment of the accessory, the setting of the communication mode is not performed. In this case, the twelfth contact is used for the single-line serial communication between the lens and the camera.

In a case where it is determined that there is the attachment of the accessory, then the appropriateness of the number of attachments thereof is determined (step S33). In a case where the number of attachments of the accessory exceeds the upper limit of the number of attachments thereof set in advance and it is determined that the number of attachments is inappropriate, the camera microcomputer 34 handles the accessory as not being attached. The communication through the twelfth contact (communication by sub-signal line) is set to be disabled.

In a case where it is determined that the number of attachments is appropriate, then the validity of the accessory is determined (step S34), that is, it is determined whether the attached accessory is the regular product. In a case where it is determined that the attached accessory is not the regular product, the camera microcomputer 34 handles the accessory as not being attached. The communication through the twelfth contact (communication by sub-signal line) is set to be disabled.

In a case where it is determined that the attached accessory is the regular product, then the appropriateness of the attachment order of the accessory is determined (step S35). In a case where it is determined that the attachment order of the accessory is inappropriate, the camera microcomputer 34 determines that there is the attachment of the accessory and sets the communication mode to the bypass mode.

In a case where it is determined that the attachment order of the attached accessories is appropriate, then the presence or absence of an instruction to set the communication mode to the normal communication mode is determined (step S36). That is, in a case where there is an instruction that the communication mode is required to be set to the normal communication mode, the communication mode is set to the normal communication mode in response to the instruction. On the other hand, in a case where there is no instruction to set the communication mode to the normal communication mode, the normal communication mode is set to the bypass mode.

In this case, the instruction to set the communication mode to the normal communication mode is included in the accessory information. The camera microcomputer 34 sets the communication mode based on the accessory information acquired from the data for accessory detection.

In this manner, it is possible to more appropriately implement the communication using the twelfth contact (communication by using sub-signal line) by switching the communication mode of the accessory according to the determination result of the attachment appropriateness of the accessory.

[Enhancement of Lens-Drive Power]

The power supply unit 42 may comprise a function of enhancing a supplying capacity of specific power (supplying capacity enhancement function) so as to be able to enhance the supplying capacity of the lens-drive power. In this case, the power supply unit 42 enhances the supplying capacity of the lens-drive power having the highest voltage among the plurality of pieces of lens-drive power to be supplied.

It may be adopted a form of increasing the voltage to be supplied and/or a form of increasing a current amount to be supplied as a form for enhancing the supplying capacity.

The camera microcomputer 34 enhances the supplying capacity of the lens-drive power having the highest voltage as necessary. For example, in a case where a lens whose drive performance is improved by enhancing the supplying capacity of the lens-drive power is attached, the supplying capacity of the lens-drive power having the highest voltage is enhanced.

Whether a lens is the lens whose drive performance is improved by enhancing the supplying capacity of the lens-drive power is different for each lens. Information on the lens whose drive performance is improved by enhancing the supplying capacity of the lens-drive power is stored in the ROM of the lens microcomputer 114 and is transmitted to the camera 10 including the lens information.

The camera microcomputer 34 determines whether an attached lens is the lens whose drive performance is improved by enhancing the supplying capacity of the lens-drive power based on the acquired lens information. That is, it is discriminated whether the supplying of the lens-drive power with enhanced supplying capacity is necessary. In a case where it is discriminated that the supplying of the lens-drive power with enhanced supplying capacity is necessary, the supplying capacity enhancement function of the power supply unit 42 is operated. Accordingly, the lens-drive power with enhanced supplying capacity is supplied from the power supply unit 42. In this case, as described above, the supplying capacity of the lens-drive power having the highest voltage is enhanced and supplied.

In this manner, it is possible to appropriately supply the power required for each lens by enhancing the supplying capacity of the lens-drive power as necessary. Further, accordingly, it is possible to achieve high performance of the lens.

[Configuration of Camera System]

The camera system may be composed of at least one camera, at least one lens, and at least one accessory.

Further, the camera is composed of the digital camera in the embodiment described above, but the invention may also be employed for a so-called silver salt camera.

The lens provided with the AF function and the stop is described as an example of the lens in the embodiment described above, the function provided in the lens is not limited thereto. In addition, for example, an electric zoom function and the like may be provided. In a lens provided with the electric zoom function, a zoom drive unit that drives a zoom lens which is an optical member for zoom is provided.

As described above, a known accessory such as the extender or the extension tube the accessory may be adopted as the accessory. In a case where the accessory is provided with the drive unit, the drive unit is driven by using the lens-drive power.

[Type of Lens-Drive Power]

A type of the lens-drive power to be supplied from the camera to the lens is set as appropriate depending on a lens constituting the camera system. For example, in a case where one of the lenses constituting the camera system comprises four optical member drive units (for example, focus drive unit, camera shake correction mechanism drive unit, stop drive unit, and zoom drive unit) and each optical member drive unit operates at a different operation voltage, four types of the lens-drive power are supplied from the camera. In this case, four contacts as the power contacts are provided in the camera-side contact group and the lens-side contact group.

[Ground Contact]

The two ground contacts are provided in the embodiment described above, but one ground contact may be provided. As in the camera system of the embodiment described above, it is possible to more stably supply the power by comprising the plurality of ground contacts.

The independent two ground contacts are provided in the embodiment described above, the two ground contacts may be connected to each other. Accordingly, it is possible to enlarge the area of the contact and thus to more stably supply the power.

[Detection of Normal Supplying of System Power to Lens Microcomputer]

In the embodiment described above, the polarities of the specific contacts are discriminated and the normal supplying of the system power to the lens microcomputer is detected. However, at least one contact for discriminating the polarity may be used. That is, at least one contact may be pulled up to the potential of the system power through the pull-up resistor on the lens side. In this case, at least one contact excluding the power contact and the ground contact is used as the contact for detection.

As in the camera system 1 of the embodiment described above, it is possible to more accurately detect that the system power is normally supplied to the lens microcomputer by discriminating the polarities of the plurality of contacts.

[Configuration of Performing Various Pieces of Processing]

The camera control unit performing the various pieces of processing is composed of the microcomputer (camera microcomputer) in the embodiment described above, but a hardware configuration for performing the various pieces of processing is not limited thereto. The hardware configuration may be composed of various processors. The various processors include a CPU which is a general processor functioning as a processing unit that performs various pieces of processing by executing software (program), a programmable logic device (PLD) which is a processor whose circuit configuration can be changed after manufacturing such as a field programmable gate array (FPGA), an exclusive electric circuit which is a processor having a circuit configuration that is exclusively designed for executing specific processing such as an application specific integrated circuit (ASIC), and the like.

One processing unit may be composed of one of these various processors or may be composed of two processors or more having the same type or different types. For example, one processing unit may be composed of a plurality of FPGAs or may be composed of a combination of the CPU and the FPGA.

Further, a plurality of processing units may be composed as one processor. A first example of constituting the plurality of processing units as one processor is a form in which one processor is composed of a combination of one or more CPUs, as represented by computers such as a client and a server, and software, and this processor functions as the plurality of processing units. A second example thereof is a form in which a processor, as represented by a system on chip (SoC) or the like, that realizes the functions of the entire system including the plurality of processing units by one integrated circuit (IC) chip is used. In this manner, the various processing units are composed by using one or more processors of the various processors described above as the hardware configuration.

Furthermore, more specifically, the hardware configuration of these various processors is an electric circuit that combines circuit elements such as semiconductor elements.

EXAMPLES

[One Example of Data for Accessory Detection]

FIGS. 24A to 24D are diagrams showing an example of a data structure of the data for accessory detection.

Here, FIG. 24A shows an example of the data for accessory detection to be transmitted from the lens. Further, FIG. 24B shows an example of the data for accessory detection in a case where one accessory is attached. Further, FIG. 24C shows an example of the data for accessory detection in a case where two accessories are attached. Further, FIG. 24D shows an example of the data for accessory detection in a case where five accessories are attached.

In this example, in a case where the upper limit is set for the number of attachments of the accessory and accessories exceeding the upper limit are attached, it is handled as follows. That is, the data for accessory detection is updated with no addition of the accessory information for the accessory exceeding the upper limit. The upper limit of the number of attachments thereof in this example is four. Therefore, in the case where five or more accessories are attached, the data for accessory detection is updated with no addition of the accessory information for the fifth and subsequent accessories.

<<Data for Accessory Detection to be Transmitted from Lens>>

As shown in FIG. 24A, in this example, the data for accessory detection to be transmitted from the lens is composed of four-byte data, pieces of information on the data length, Command, the number of attachments, and Check Sum are stored in order from the head. Each of the pieces of information is composed of one-byte data. The data length is set to one as an initial value. The number of attachments thereof is information on the number of attached accessories and the initial value thereof is set to zero.

In the case where there is no attachment of the accessory, the data for accessory detection shown in FIG. 24A is received by the camera as it is.

<<Case where One Accessory is Attached>>

In the case where one accessory is attached, the accessory information is added as shown in FIG. 24B. The accessory information is composed of 40-byte data and is stored between the information on the number of attachments and the information on Check Sum. The number of attachments thereof is added by one due to the attachment of one accessory and is "1". Further, the data length is added by 40 due to the addition of the accessory information of 40-byte and is "1+40".

<<Case where Two Accessories are Attached>>

In the case where two accessories are attached, one more piece of accessory information is added as shown in FIG. 24C. The accessory information is stored right after the existing accessory information (first accessory information). The number of attachments thereof is added by one due to the attachment of one more accessory and is "2". Further, the data length is further added by 40 due to the addition of the accessory information of 40-byte and is "1+40 ×2".

<<Case where Accessories Exceeding Upper Limit are Attached>>

FIG. 24D is an example of the data for accessory detection in the case where five accessories are attached. As described above, since the upper limit of the number of attachments of the accessory is four in this example, FIG. 24D is an example of a case where accessories exceeding the upper limit are attached.

In the case where the accessories exceeding the upper limit are attached, the accessory information is not added for the accessories exceeding the upper limit. Therefore, the pieces of accessory information up to fourth accessory information are stored.

On the other hand, the information on the number of attachments thereof is updated and is "5". Therefore, the camera receiving the data for accessory detection can detect at least the number of attachments thereof.

The data length is the same as the data length up to fourth data length since the accessory information is not added. That is, the data length is "1+40×4".

[One Example of Data for Accessory Detection]

Figure 25:
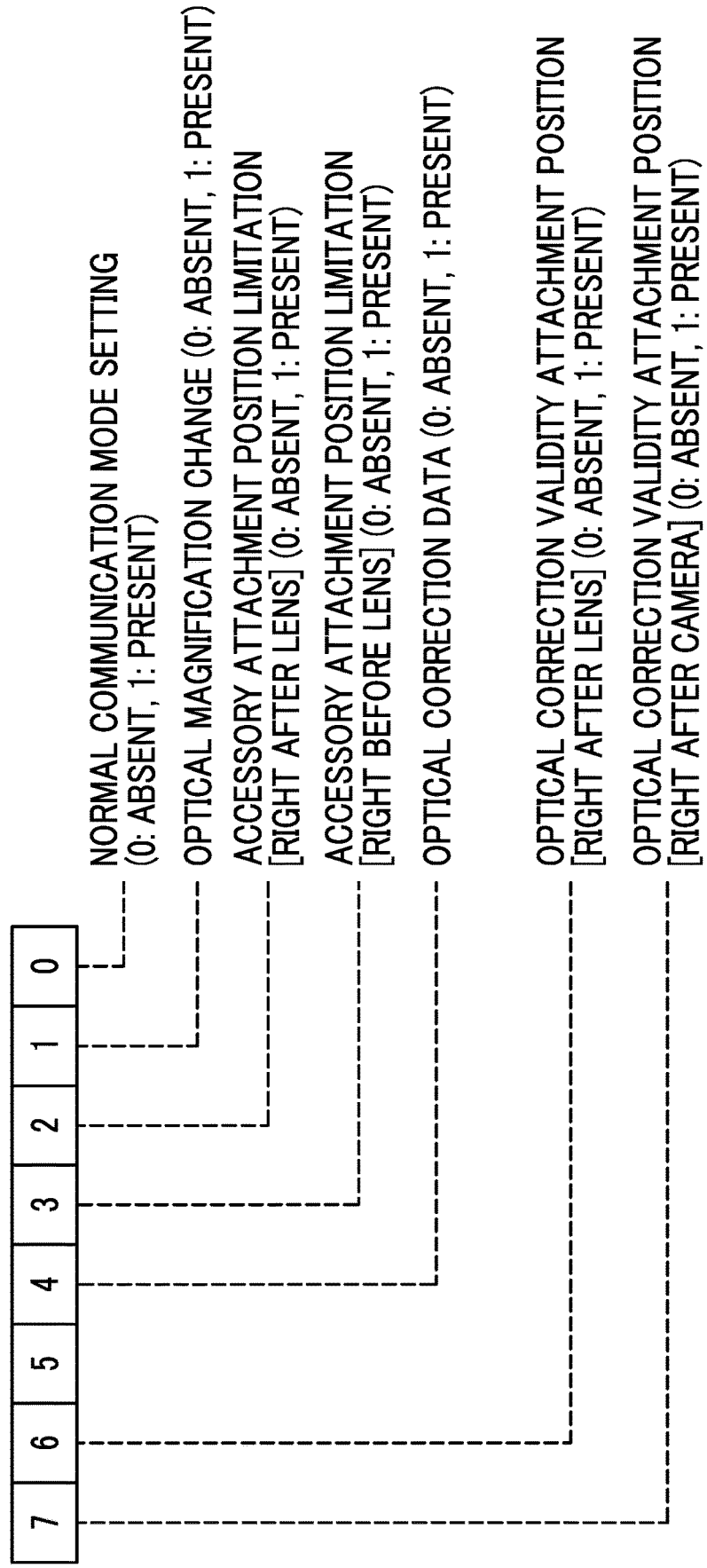
FIG. 25 is a diagram showing an example of data included in accessory information.

FIG. 25 is a diagram showing an example of data included in the accessory information.

The accessory information includes one-byte data as accessory characteristic data. In the accessory characteristic data, a zeroth bit indicates the presence or absence of a normal communication mode setting, a first bit indicates the presence or absence of an optical magnification change, a second bit indicates the presence or absence of accessory attachment position limitation (right after lens), a third bit indicates the presence or absence of accessory attachment position limitation (right before camera), a fourth bit indicates the presence or absence of optical correction data, a sixth bit indicates the presence or absence of an optical correction validity attachment position (right after lens), and a seventh bit indicates the presence or absence of optical correction validity attachment position (right before camera).

The presence or absence of the normal communication mode setting of the zeroth bit indicates information on the communication mode of the accessory to be set after the accessory detection processing. In a case where the communication mode of the accessory is set to the normal communication mode after the accessory detection processing, "1" is set as "present". In a case where the communication mode of the accessory may not be set to the normal communication mode after the accessory detection processing, "0" is set as "absent". Therefore, in a case where a state of the zeroth bit is detected, it is possible to determine whether the communication mode of the accessory is required to be set to the normal communication mode after the accessory detection processing.

The presence or absence of the optical magnification change of the first bit indicates whether the optical magnification changes due to the attachment of the accessory. In a case where the optical magnification changes, "1" is set as "present". In a case where the optical magnification does not change, "0" is set as "absent". Therefore, in a case where a state of the first bit is detected, it is possible to determine the presence or absence of the change in the optical magnification.

The presence or absence of the accessory attachment position limitation (right after lens) of the second bit indicates whether the accessory is required to be attached right after the lens as the attachment position of the accessory. In a case where the accessory is required to be attached right after the lens, "1" is set as "present" of the limitation of the attachment position. In a case where the accessory may not be attached right after the lens, "0" is set as "absent" of the limitation of the attachment position. Therefore, in a case where a state of the second bit is detected, it is possible to determine whether the accessory is required to be attached right after the lens.

The presence or absence of the accessory attachment position limitation (right before camera) of the third bit indicates whether the accessory is required to be attached right before the camera as the attachment position of the accessory. In a case where the accessory is required to be attached right before the camera, "1" is set as "present" of the limitation of the attachment position. In a case where the accessory may not be attached right before the camera, "0" is set as "absent" of the limitation of the attachment position. Therefore, in a case where a state of the third bit is detected, it is possible to determine whether the accessory is required to be attached right before the camera.

The presence or absence of the optical correction data of the fourth bit indicates the presence or absence of the optical correction data. In a case where there is the optical correction data, "1" is set as "present". In a case where there is no optical correction data, "0" is set as "absent". Therefore, in a case where a state of the fourth bit is detected, it is possible to determine the presence or absence of the optical correction data.

The presence or absence of the optical correction validity attachment position (right after lens) of the sixth bit indicates whether the accessory is required to be attached right after the lens as the attachment position where the optical correction is valid. In a case where the accessory is required to be attached right after the lens, "1" is set as "present" of the limitation of the attachment position. In a case where the accessory may not be attached right after the lens, "0" is set as "absent" of the limitation of the attachment position. Therefore, in a case where a state of the sixth bit is detected, it is possible to determine whether the accessory is required to be attached right after the lens in order to validate the optical correction.

The presence or absence of the optical correction validity attachment position (right before camera) of the seventh bit indicates whether the accessory is required to be attached right before the camera as the attachment position where the optical correction is valid. In a case where the accessory is required to be attached right before the camera, "1" is set as "present" of the limitation of the attachment position. In a case where the accessory may not be attached right before the camera, "0" is set as "absent" of the limitation of the attachment position. Therefore, in a case where a state of the seventh bit is detected, it is possible to determine whether the accessory is required to be attached right before the camera in order to validate the optical correction.

EXPLANATION OF REFERENCES

1: camera system
10: camera
12: camera body
14: camera-side mount
16: image sensor
18: shutter
20: image sensor drive unit
22: shutter drive unit
24: analog signal processing unit
26: display unit
28: image data storage unit
30: camera operation unit
32: power source unit
34: camera microcomputer
40: battery
42: power supply unit
44: lens-drive power switch unit
50: digital signal processing unit
52: display control unit
54: recording control unit
56: power control unit
58: lens-drive power switch control unit
60: lens attachment detection unit
62: camera communication unit
64: camera microcomputer input and output port
70: camera-side polarity setting unit
72: camera-side determination unit
100: lens
102: lens barrel
104: lens-side mount
106A: focus lens
106C: stop
110: lens drive unit
110A: focus drive unit
110C: stop drive unit
112: lens-side system power generation unit
114: lens microcomputer
120: focus drive control unit
124: stop drive control unit
126: lens communication unit
128: lens microcomputer input and output port
130: lens-side polarity setting unit
132: lens-side determination unit
200: accessory
202: barrel
204A: accessory-side first mount
204B: accessory-side second mount
210: accessory microcomputer
212: accessory communication unit
214: bypass control unit
216: accessory microcomputer input and output port 230: bypass signal line
232: communication path switching switch
234: first FET
236: second FET
238: line
240: third FET
242: pull-up resistor
244: line
250: accessory-side system power generation unit
260: line
A: first accessory
B: second accessory
Ia: accessory information of first accessory A
Ib: accessory information of second accessory B
A1CG: accessory-side first contact group
A1C1: first contact of accessory-side first contact group
A1C2: second contact of accessory-side first contact group
A1C3: third contact of accessory-side first contact group
A1C4: fourth contact of accessory-side first contact group
A1C5: fifth contact of accessory-side first contact group
A1C6: sixth contact of accessory-side first contact group
A1C7: seventh contact of accessory-side first contact group
A1C8: eighth contact of accessory-side first contact group
A1C9: ninth contact of accessory-side first contact group
A1C10: tenth contact of accessory-side first contact group
A1C11: eleventh contact of accessory-side first contact group
A1C12: twelfth contact of accessory-side first contact group
A2CG: accessory-side second contact group
A2C1: first contact of accessory-side second contact group
A2C2: second contact of accessory-side second contact group
A2C3: third contact of accessory-side second contact group
A2C4: fourth contact of accessory-side second contact group
A2C5: fifth contact of accessory-side second contact group
A2C6: sixth contact of accessory-side second contact group
A2C7: seventh contact of accessory-side second contact group
A2C8: eighth contact of accessory-side second contact group
A2C9: ninth contact of accessory-side second contact group
A2C10: tenth contact of accessory-side second contact group
A2C11: eleventh contact of accessory-side second contact group
A2C12: twelfth contact of accessory-side second contact group
AL1: first connection line of accessory
AL2: second connection line of accessory
AL3: third connection line of accessory
AL4: fourth connection line of accessory
AL5A: fifth connection line of accessory
AL5B: fifth connection line of accessory
AL6: sixth connection line of accessory
AL7: seventh connection line of accessory
AL8: eighth connection line of accessory
AL9: ninth connection line of accessory
AL10: tenth connection line of accessory
AL11: eleventh connection line of accessory
AL12A: accessory-side first sub-signal line
AL12B: accessory-side second sub-signal line
AP1: first port of accessory microcomputer
AP2: second port of accessory microcomputer
AP3: third port of accessory microcomputer
AP4: fourth port of accessory microcomputer
AR12: pull-down resistor
CCG: camera-side contact group
CC1: first contact of camera-side contact group
CC2: second contact of camera-side contact group
CC3: third contact of camera-side contact group
CC4: fourth contact of camera-side contact group
CC5: fifth contact of camera-side contact group
CC6: sixth contact of camera-side contact group
CC7: seventh contact of camera-side contact group
CC8: eighth contact of camera-side contact group
CC9: ninth contact of camera-side contact group
CC10: tenth contact of camera-side contact group
CC11: eleventh contact of camera-side contact group
CC12: twelfth contact of camera-side contact group
CL7: seventh signal line of camera
CL8: eighth signal line of camera
CL9: ninth signal line of camera
CL10: tenth signal line of camera
CL11: eleventh signal line of camera
CL12: twelfth signal line of camera
CP0: lens detection port of camera microcomputer
CP1: first communication port of camera microcomputer
CP2: second communication port of camera microcomputer
CP3: third communication port of camera microcomputer
CP4: fourth communication port of camera microcomputer
CP5: fifth communication port of camera microcomputer
CP6: sixth communication port of camera microcomputer
CP7: seventh communication port of camera microcomputer
CR1: pull-up resistor
LCG: lens-side contact group
LC1: first contact of lens-side contact group
LC2: second contact of lens-side contact group
LC3: third contact of lens-side contact group
LC4: fourth contact of lens-side contact group
LC5: fifth contact of lens-side contact group
LC6: sixth contact of lens-side contact group
LC7: seventh contact of lens-side contact group
LC8: eighth contact of lens-side contact group
LC9: ninth contact of lens-side contact group
LC10: tenth contact of lens-side contact group
LC11: eleventh contact of lens-side contact group
LC12: twelfth contact of lens-side contact group
LL7: seventh signal line of lens
LL8: eighth signal line of lens
LL9: ninth signal line of lens
LL10: tenth signal line of lens
LL11: eleventh signal line of lens
LL12: twelfth signal line of lens
LL11: eleventh signal line of lens
LP1: first communication port of lens microcomputer
LP2: second communication port of lens microcomputer
LP3: third communication port of lens microcomputer
LP4: fourth communication port of lens microcomputer
LP5: fifth communication port of lens microcomputer
LP6: sixth communication port of lens microcomputer
LP7: seventh communication port of lens microcomputer
LR1: pull-down resistor LR12: pull-up resistor
LR7: pull-up resistor
LR8: pull-up resistor
LR9: pull-down resistor
LV1: first lens-drive power
LV2: second lens-drive power
LV3: third lens-drive power
R: rotation direction of lens in case where lens is attached to camera
S10 to S18: procedure of detection processing of accessory
S20 to S26: procedure of determining attachment appropriateness of accessory
S31 to S36: procedure of switching communication mode of accessory according to determination result of attachment appropriateness of accessory

What is claimed is:

1. A camera system comprising:
a camera;
a lens to be attachably and detachably attached to the camera; and
an accessory to be attachably and detachably attached between the camera and the lens,
wherein the camera comprises
a camera control unit,
a single-line camera-side main signal line to be connected to the camera control unit, and
a camera-side sub-signal line to be connected to the camera control unit,
wherein the lens comprises
a lens control unit,
a lens-side main signal line to be connected to the lens control unit and to be connected to the camera-side main signal line in a case where the lens is attached to the camera, and
a single-line lens-side sub-signal line to be connected to the lens control unit and to be connected to the camera-side sub-signal line in the case where the lens is attached to the camera,
wherein the accessory comprises
an accessory control unit,
an accessory-side main signal line to be connected to the camera-side main signal line and the lens-side main signal line in a case where the accessory is attached between the camera and the lens,
a single-line accessory-side first sub-signal line to be connected to the accessory control unit and to be connected to the camera-side sub-signal line in a case where the accessory is attached to the camera, and
a single-line accessory-side second sub-signal line to be connected to the accessory control unit and to be connected to the lens-side sub-signal line in a case where the lens is attached to the accessory,
wherein the lens control unit transmits data for accessory detection to the camera by unidirectional serial communication through the lens-side sub-signal line,
wherein in a case where the data for accessory detection is received by unidirectional serial communication through the accessory-side second sub-signal line, the accessory control unit adds accessory information to the received data for accessory detection to update the data for accessory detection and transmits the updated data for accessory detection to the camera by unidirectional serial communication through the accessory-side first sub-signal line,
wherein in a case where the data for accessory detection is received by unidirectional serial communication through the camera-side sub-signal line, the camera control unit detects presence or absence of the attachment of the accessory and the number of attachments of the accessory and acquires information on the attached accessory based on the received data for accessory detection, and
wherein the camera control unit and the lens control unit perform an initial setting of synchronous serial communication by using the camera-side main signal line and the lens-side main signal line in parallel with processing of transmitting and receiving the data for accessory detection.

2. The camera system according to claim 1,
wherein the data for accessory detection to be transmitted from the lens control unit includes lens information.

3. The camera system according to claim 1,
wherein the camera-side main signal line and the lens-side main signal line are composed of a plurality number of signal lines, and
wherein the camera control unit and the lens control unit perform the synchronous serial communication by using the camera-side main signal lines and the lens-side main signal lines.

4. The camera system according to claim 1,
wherein, in a case where the lens control unit is activated, the lens control unit transmits data for accessory detection to the camera by unidirectional serial communication through the lens-side sub-signal line.

5. The camera system according to claim 1,
wherein in a case where a plurality of the accessories are attached,
the accessory control unit adds the accessory information after existing information included in the data for accessory detection to update the data for accessory detection in the case where the data for accessory detection is received, and
the camera control unit acquires information on an attachment order of the accessory based on an order of the accessory information included in the data for accessory detection.

6. The camera system according to claim 5,
wherein the camera control unit further determines validity of the accessory based on the accessory information included in the data for accessory detection to determine attachment appropriateness of the accessory.

7. The camera system according to claim 5,
wherein the camera control unit further determines appropriateness of the number of attachments of the accessory based on the detected number of attachments of the accessory to determine attachment appropriateness of the accessory.

8. The camera system according to claim 5,
wherein the camera control unit further determines appropriateness of an attachment order of the accessory based on the acquired information on the attachment order of the accessory to determine attachment appropriateness of the accessory.

9. The camera system according to claim 6,
wherein the camera further comprises a notification unit that gives a notification of a warning, and
wherein in a case where the attachment of the accessory is determined to be inappropriate, the camera control unit causes the notification unit to give a notification of the warning.

10. The camera system according to claim 6,
wherein in the case where the attachment of the accessory is determined to be inappropriate, the camera control unit stops or changes a control with respect to the lens.

11. The camera system according to claim 1,
wherein the accessory further comprises
a bypass signal line that bypasses the accessory control unit and directly connects the accessory-side first sub-signal line and the accessory-side second sub-signal line, and
a communication path switching switch that switches a communication path to the bypass signal line.

12. The camera system according to claim 11,
wherein the accessory control unit transmits the data for accessory detection and then switches the communication path to the bypass signal line by the communication path switching switch.

13. The camera system according to claim 12,
wherein in a case where the communication path of the accessory is switched to the bypass signal line, the lens control unit transmits operation information of the lens by using the camera-side sub-signal line and the lens-side sub-signal line.

14. The camera system according to claim 1, wherein the lens control unit asynchronously transmits data for accessory detection to the camera by unidirectional serial communication through the lens-side sub-signal line.

15. A camera for which an accessory is attachable between the camera and a lens, the camera comprising:
a camera control unit;
a camera-side main signal line to be connected to the camera control unit; and
a single-line camera-side sub-signal line to be connected to the camera control unit,
wherein the lens comprises a lens control unit, a lens-side main signal line to be connected to the lens control unit and to be connected to the camera-side main signal line in a case where the lens is attached to the camera, and a single-line lens-side sub-signal line to be connected to the lens control unit and to be connected to the camera-side sub-signal line in the case where the lens is attached to the camera,
wherein the accessory comprises an accessory control unit, an accessory-side main signal line to be connected to the camera-side main signal line and the lens-side main signal line in a case where the accessory is attached between the camera and the lens, a single-line accessory-side first sub-signal line to be connected to the accessory control unit and to be connected to the camera-side sub-signal line in a case where the accessory is attached to the camera, and a single-line accessory-side second sub-signal line to be connected to the accessory control unit and to be connected to the lens-side sub-signal line in a case where the lens is attached to the accessory,
wherein the lens control unit transmits data for accessory detection to the camera by unidirectional serial communication through the lens-side sub-signal line,
wherein in a case where the data for accessory detection is received by unidirectional serial communication through the accessory-side second sub-signal line, the accessory control unit adds accessory information to the received data for accessory detection to update the data for accessory detection and transmits the updated data for accessory detection to the camera by unidirectional serial communication through the accessory-side first sub-signal line,
wherein in a case where the data for accessory detection is received by unidirectional serial communication through the camera-side sub-signal line, the camera control unit detects presence or absence of the attachment of the accessory and the number of attachments of the accessory and acquires information on the attached accessory based on the received data for accessory detection, and
wherein the camera control unit and the lens control unit perform an initial setting of synchronous serial communication by using the camera-side main signal line and the lens-side main signal line in parallel with processing of transmitting and receiving the data for accessory detection.

16. A lens for which an accessory is attachable between the lens and a camera, the lens comprising:
a lens control unit;
a lens-side main signal line to be connected to the lens control unit and to be connected to a camera-side main signal line provided in the camera in a case where the lens is attached to the camera; and
a single-line lens-side sub-signal line to be connected to the lens control unit and to be connected to a single-line camera-side sub-signal line provided in the camera in the case where the lens is attached to the camera,
wherein the camera comprises a camera control unit to which the camera-side main signal line and the camera-side sub-signal line are connected,
wherein the accessory comprises an accessory control unit, an accessory-side main signal line to be connected to the camera-side main signal line and the lens-side main signal line in a case where the accessory is attached between the camera and the lens, a single-line accessory-side first sub-signal line to be connected to the accessory control unit and to be connected to the single-line camera-side sub-signal line in a case where the accessory is attached to the camera, and a single-line accessory-side second sub-signal line to be connected to the accessory control unit and to be connected to the single-line lens-side sub-signal line in a case where the lens is attached to the accessory,
wherein the lens control unit transmits data for accessory detection to the camera by unidirectional serial communication through the lens-side sub-signal line,
wherein in a case where the data for accessory detection is received by unidirectional serial communication through the accessory-side second sub-signal line, the accessory control unit adds accessory information to the received data for accessory detection to update the data for accessory detection and transmits the updated data for accessory detection to the camera by unidirectional serial communication through the accessory-side first sub-signal line,
wherein in a case where the data for accessory detection is received by unidirectional serial communication through the camera-side sub-signal line, the camera control unit provided in the camera detects presence or absence of the attachment of the accessory and the number of attachments of the accessory and acquires information on the attached accessory based on the received data for accessory detection,
wherein the camera control unit and the lens control unit perform an initial setting of synchronous serial communication by using the camera-side main signal line and the lens-side main signal line in parallel with processing of transmitting and receiving the data for accessory detection.

17. An accessory to be attachably and detachably attached between a camera and a lens, the accessory comprising:
an accessory control unit;
an accessory-side main signal line to be connected to a camera-side main signal line provided in the camera and a lens-side main signal line provided in the lens in a case where the accessory is attached between the camera and the lens;
a single-line accessory-side first sub-signal line to be connected to the accessory control unit and to be connected to a single-line camera-side sub-signal line provided in the camera in a case where the accessory is attached to the camera; and
a single-line accessory-side second sub-signal line to be connected to the accessory control unit and to be connected to a single-line lens-side sub-signal line provided in the lens in a case where the lens is attached to the accessory,
wherein the camera comprises a camera control unit to which the camera-side main signal line and the camera-side sub-signal line are connected,
wherein the lens comprises a lens control unit to which the lens-side main signal line and the lens-side sub-signal line are connected,
wherein the lens control unit transmits data for accessory detection to the camera by unidirectional serial communication through the lens-side sub-signal line,
wherein in a case where the data for accessory detection is received by unidirectional serial communication through the accessory-side second sub-signal line, the accessory control unit adds accessory information to the received data for accessory detection to update the data for accessory detection and transmits the updated data for accessory detection to the camera by unidirectional serial communication through the accessory-side first sub-signal line,
wherein in a case where the data for accessory detection is received by unidirectional serial communication through the camera-side sub-signal line, the camera control unit detects presence or absence of the attachment of the accessory and the number of attachments of the accessory and acquires information on the attached accessory based on the received data for accessory detection, and
wherein the camera control unit and the lens control unit perform an initial setting of synchronous serial communication by using the camera-side main signal line and the lens-side main signal line in parallel with processing of transmitting and receiving the data for accessory detection.

18. An accessory detection method that detects an accessory attached between a camera and a lens in a camera system comprising the camera, the lens to be attachably and detachably attached to the camera, and the accessory to be attachably and detachably attached between the camera and the lens, the accessory detection method of a camera system comprising:
a step of transmitting data for accessory detection from the lens to the camera by unidirectional single-line serial communication;
a step of relaying the data for accessory detection in a case where the accessory is attached between the camera and the lens;
a step of adding accessory information to the data for accessory detection and of updating the data for accessory detection in the case where the accessory relays the data for accessory detection; and
a step of detecting presence or absence of the attachment of the accessory and the number of attachments of the accessory and of acquiring information on the attached accessory based on the data for accessory detection in a case where the camera receives the data for accessory detection,
wherein a main signal line for performing synchronous serial communication and a sub-signal line for performing start-stop synchronous serial communication are provided,
wherein the data for accessory detection is transmitted through the sub-signal line, and
wherein the accessory detection method further comprises a step of performing an initial setting of the synchronous serial communication by using the main signal line in parallel with processing of transmitting and receiving the data for accessory detection.

19. The accessory detection method of a camera system according to claim 18, wherein in the step of transmitting the data for accessory detection from the lens to the camera, the data for accessory detection is transmitted by including lens information.

20. The accessory detection method of a camera system according to claim 18,
wherein in the step of updating the data for accessory detection, the accessory information is added after existing information and the data for accessory detection is updated, and
wherein in the step of detecting the presence or absence of the attachment of the accessory and the number of attachments of the accessory and of acquiring the information on the attached accessory, information on an attachment order of the accessory is acquired based on an order of the accessory information included in the data for accessory detection.

21. The accessory detection method of a camera system according to claim 20, further comprising:
a step of determining validity of the accessory based on the accessory information included in the data for accessory detection to determine attachment appropriateness of the accessory.

22. The accessory detection method of a camera system according to claim 20, further comprising:
a step of determining the appropriateness of the number of attachments of the accessory based on the detected number of attachments of the accessory to determine the attachment appropriateness of the accessory.

23. The accessory detection method of a camera system according to claim 20, further comprising:
a step of determining the appropriateness of the attachment order of the accessory based on the acquired information on the attachment order of the accessory to determine the attachment appropriateness of the accessory.

24. The accessory detection method of a camera system according to claim 21, further comprising:
a step of warning in a case where the attachment of the accessory is determined to be inappropriate.

25. The accessory detection method of a camera system according to claim 21, further comprising:
a step of stopping or changing a control with respect to the lens in the case where the attachment of the accessory is determined to be inappropriate.

26. The accessory detection method of a camera system according to claim 18,
wherein the step of transmitting data for accessory detection from the lens to the camera by unidirectional single-line serial communication, includes transmitting data for accessory detection to the camera by unidirectional single-line serial communication when a lens control unit provided in the lens is activated.

* * * * *